(12) United States Patent
Roy

(10) Patent No.: US 6,289,434 B1
(45) Date of Patent: *Sep. 11, 2001

(54) APPARATUS AND METHOD OF IMPLEMENTING SYSTEMS ON SILICON USING DYNAMIC-ADAPTIVE RUN-TIME RECONFIGURABLE CIRCUITS FOR PROCESSING MULTIPLE, INDEPENDENT DATA AND CONTROL STREAMS OF VARYING RATES

(75) Inventor: Rupan Roy, Fremont, CA (US)

(73) Assignee: Cognigine Corporation, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,530

(22) Filed: Feb. 27, 1998

Related U.S. Application Data

(60) Provisional application No. 60/039,237, filed on Feb. 28, 1997.

(51) Int. Cl.[7] ....................................... G06F 15/80
(52) U.S. Cl. .................... 712/32; 712/22; 712/34
(58) Field of Search ................... 395/800.11; 712/34, 712/32, 22, 21, 9; 709/221; 713/100

(56) References Cited

U.S. PATENT DOCUMENTS

| | | | | |
|---|---|---|---|---|
| 5,517,436 | * | 5/1996 | Andreas | 364/736 |
| 5,652,903 | * | 7/1997 | Weng | 712/35 |
| 5,752,071 | * | 5/1998 | Tubbs | 712/34 |
| 5,784,636 | * | 7/1998 | Rupp | 712/37 |
| 5,822,606 | * | 10/1998 | Morton | 712/16 |
| 5,933,624 | * | 8/1999 | Balmer | 709/400 |
| 5,956,518 | * | 9/1999 | Detlon | 712/15 |
| 6,049,859 | * | 4/2000 | Gliese | 712/17 |

* cited by examiner

Primary Examiner—Eric Coleman

(57) ABSTRACT

An apparatus and method processes data in series or in parallel. Each of the processors operating may perform arithmetic-type functions, logic functions and bit manipulation functions. The processors can operate under control of a stored program, which configures each processor before or during operation of the apparatus and method to perform a specific function or set of functions. The configuration of each processor allows each individual processor to optimize itself to perform the function or functions as directed by the stored program, while providing maximum flexibility of the apparatus to perform any function according to the needs of the stored program or other stored programs. Communication between processors is facilitated for example, via a memory under control of memory management. Communication between the processors and external devices is facilitated by the memory management and units capable of performing specialized or general interface functions.

1 Claim, 64 Drawing Sheets

| | | |
|---|---|---|
| 0x3FFFFFF<br>0x3800000 | 8 MBYTE ROM SPACE | ↑<br>32 MB<br>OFF-CHIP<br>MEMORY<br>SPACE<br>↓ |
| 0x37FFFFF<br>0x3000000 | RESERVED | |
| 0x2FFFFFF<br>0x2000000 | 16 MBYTE LOCAL BUFFER<br>MEMORY SPACE | |
| 0x1FFFFFF<br>0x1800000 | RESERVED | ↑<br>16 MB<br>ON-CHIP<br>MEMORY<br>SPACE<br>↓ |
| 0x17FFFFF<br>0x1700000 | MEDIA PROCESSING<br>UNIT #7 (MPU7) | |
| 0x16FFFFF<br>0x1600000 | MEDIA PROCESSING<br>UNIT #6 (MPU6) | |
| 0x15FFFFF<br>0x1500000 | MEDIA PROCESSING<br>UNIT #5 (MPU5) | |
| 0x14FFFFF<br>0x1400000 | MEDIA PROCESSING<br>UNIT #4 (MPU4) | |
| 0x13FFFFF<br>0x1300000 | MEDIA PROCESSING<br>UNIT #3 (MPU3) | |
| 0x12FFFFF<br>0x1200000 | MEDIA PROCESSING<br>UNIT #2 (MPU2) | |
| 0x11FFFFF<br>0x1100000 | MEDIA PROCESSING<br>UNIT #1 (MPU1) | |
| 0x10FFFFF<br>0x1000000 | MEDIA PROCESSING<br>UNIT #0 (MPU0) | |
| 0x0FFFFFF<br>0x0800000 | RESERVED | |
| 0x07FFFFF<br>0x0700000 | EVENT TIMER UNIT (ETU) | |
| 0x06FFFFF<br>0x0600000 | VIDEO CAPTURE INTERFACE (VCI) | |
| 0x05FFFFF<br>0x0500000 | AUXILIARY SERIAL/PARALLEL<br>INTERFACE (ASI) | |
| 0x04FFFFF<br>0x0400000 | CRT DISPLAY INTERFACE (CDI) | |

FIG. 4A

| 31 | 30 29 | 28  24 | 23                              0 |
|----|-------|--------|-----------------------------------|
| rw | acc.  | b.cnt. | 24 Bit Transfer Dword Address     | rw       : read/write,     0 = read transfer,   1 = write transfer
acc      : access priority,  00 = lowest,       11 = highest
b. cnt.   : burst count - 1,  00000 = 1 Dword   11111 = 32 Dwords

| 33 | 2 | 2 | 2 | 2 | 2 | 2 | 2 | 2 | 2 | 1 | 1 | 1 | 1 | 1 | 1 | 1 | 1 | 1 | 1 | 9 | 8 | 7 | 6 | 5 | 4 | 3 | 2 | 1 | 0 |
|----|---|---|---|---|---|---|---|---|---|---|---|---|---|---|---|---|---|---|---|---|---|---|---|---|---|---|---|---|---|
| 10 | 9 | 8 | 7 | 6 | 5 | 4 | 3 | 2 | 1 | 0 | 9 | 8 | 7 | 6 | 5 | 4 | 3 | 2 | 1 | 0 |   |   |   |   |   |   |   |   |   |
|    |   |   |   |   |   |   |   |   |   | U | I |   | A | P | E | I | S | R | L | L | L | L | V | Z | N | C | V | Z | N | C |
|    |   |   |   |   |   |   |   |   |   | S | C |   |   |   | m | m | l | e | S | S | S | S | a | a | a | a | m | m | m | m |
|    |   |   |   |   |   |   |   |   |   |   | P |   |   |   | v | v | p | s | B | B | B | B |   |   |   |   |   |   |   |   |
|    |   |   |   |   |   |   |   |   |   |   |   |   |   |   |   |   |   |   | 3 | 2 | 1 | 0 |   |   |   |   |   |   |   |   |

Bits:

| | | |
|---|---|---|
| 0 | : Cm | - Carry flag of the MAU |
| 1 | : Nm | - Negative flag of the MAU |
| 2 | : Zm | - Zero flag of the MAU |
| 3 | : Vm | - Overflow flag of the MAU |
| 4 | : Ca | - Carry flag of the ALU |
| 5 | : Na | - Negative flag of the ALU |
| 6 | : Za | - Zero flag of the ALU |
| 7 | : Va | - Overflow flag of the ALU |
| 8 | : LSB0 | - Bit 0 of the BMU result |
| 9 | : LSB1 | - Bit 8 of the BMU result |
| 10 | : LSB2 | - Bit 16 of the BMU result |
| 11 | : LSB3 | - Bit 24 of the BMU result |
| 13 | : Slp | - Sleep bit. |

0 = Puts MPU into sleep mode
        1 = Puts MPU in normal operation mode (wake)

14    : Imv    - Internal move bit.
        0 = No MPU initiated move in progress
        1 = MPU initiated move in progress, MPU DMA busy 15    : Emv    - External move bit.
        0 = No externally initiated move to/from MPU in progress
        1 = Externally initiated move to/from MPU in progress 17-16 : AP    - Access Priority for MPU (set by supervisor).
        00 = lowest priority
        11 = highest priority 18    : ICP    - Instruction Cache Pre-fetch.
        0 = No prefetch
        1 = Pre-fetch the next instuction cache block 19    : US    - User/Supervisor bit.
        0 = User, 1 = Supervisor

*FIG. 89B*

| *FIG. 89A* |
|---|
| *FIG. 89B* |

*FIG. 89*

| 31 28 | 27 24 | 23 20 | 19 16 | 15 12 | 11 8 | 7 4 | 3 0 |
|---|---|---|---|---|---|---|---|
| Va(3:0) | Za(3:0) | Na(3:0) | Ca(3:0) | Vm(3:0) | Zm(3:0) | Nm(3:0) | Cm(3:0) |
| ALU Carry, Negative, Zero and Overflow |||| MAU Carry, Negative, Zero and Overflow ||||

FIG. 90

| 33 32 31 30 29 28 27 26 25 24 23 22 21 20 19 18 17 16 | 15 14 13 | 12 | 11 10 | 9 8 | 7 6 5 4 3 2 1 0 | | | | | | |
|---|---|---|---|---|---|---|---|---|---|---|---|
| Reserved | TF SF VF | VIDF | HF PCF | IEU IES | Reserved | TE | SE | VIE | VIDE | HE | PCIE |
| Interrupt Flags |||||| Interrupt Mask and Control ||||||

FIG. 91A

Bits:
- 0 : PCIE — PCI Interrupt Enable (from PCI)
  - 0 = Disable
  - 1 = Enable
- 1 : HE — Hsync Interrupt Enable (from CDI)
  - 0 = Disable
  - 1 = Enable
- 2 : VE — Vsync Interrupt Enable (from CDI)
  - 0 = Disable
  - 1 = Enable
- 3 : VIDE — Video Capture Data Available Enable (from VCI)
  - 0 = Disable
  - 1 = Enable
- 4 : SE — Software Interrupt Enable
  - 0 = Disable
  - 1 = Enable
- 5 : TE — Timer Interrupt Enable
  - 0 = Disable
  - 1 = Enable
- 13-6 : Reserved
- 14 : IES — Enable Supervisor Interrupts
  - 0 = Disable
  - 1 = Enable
- 15 : IEU — Enable User Interrupts.
  - 0 = Disable
  - 1 = Enable
- 16 : PCIF — PCI Interrupt Flag
  - 0 = No Interrupt
  - 1 = Interrupt
- 17 : HF — Hsync Interrupt Flag
  - 0 = No interrupt
  - 1 = Interrupt
- 18 : VF — Vsync Interrupt Flag
  - 0 = No interrupt
  - 1 = Interrupt

*FIG. 91B*

19   : VIDF            - Video Capture Interrupt Flag
                              0 = No interrupt
                              1 = Interrupt
20   : SF              - Software Interrupt Flag
                              0 = No interrupt
                              1 = Interrupt
21   : TF              - Timer Interrupt Flag
                              0 = No interrupt
                              1 = Interrupt
31-22: Reserved

*FIG. 91C*

| *FIG. 91A* |
| --- |
| *FIG. 91B* |
| *FIG. 91C* |

*FIG. 91*

| 31 | 24 | 23 | 16 | 15 | 0 |
|---|---|---|---|---|---|
| Reserved | | MS Dword Addr. | | Lower 16 Bits of Dword Address | |

*FIG. 92*

| 31 | 24 | 23 | 16 | 15 | 0 |
|---|---|---|---|---|---|
| Reserved | | MS Dword Addr. | | Lower 16 Bits of Dword Address | |

*FIG. 93*

| 31 | 24 | 23 | 16 | 15 | 0 |
|---|---|---|---|---|---|
| Reserved | | MS Dword Addr. | | Lower 16 Bits of Dword Address | |

*FIG. 94*

| 31 | 30 | 24 | 23 | 16 | 15 | 0 |
|---|---|---|---|---|---|---|
| E | R | Reserved | MS Dword Addr. | | Lower 16 Bits of Dword Address | |

Bits:
15-0 : LS - Least significant bits of Dword address
23-16 : MS- Most Significant 8 bits of Dword Address
39-24 : Reserved. For future compatibility, these bits should be set to zero
30 : R - Direct access (offset addressing mode) address range
  0 = 31 Dwords range (offset 01h to 1Fh). Offset 00h specifies an indirect pointer access with no post-increment.
  1 = 27 Dwords addressable range for memory access at offsets 01h thru 1Bh. Offset 00h specifies an indirect pointer access with no post-increment while offsets 1Ch-1Fh specify an indirect pointer access with post-increment by the specified index.
31 : E - Access target
  0 = MPU memory space
  1 = external (UMP) memory space

*FIG. 95*

| 31 | 24 | 23 | 16 | 15 | 8 | 7 | 0 |
|---|---|---|---|---|---|---|---|
| INDX*n*(3) | | INDX*n*(2) | | INDX*n*(1) | | INDX*n*(0) | |

Note. 1000h is the base address for short (128 Dword access) direct addresses in the branch and loop instructions. It is also the <u>upper</u> base address in the <u>immediate data</u> move instruction.

| | | |
|---|---|---|
| 0x0FFF | Reserved | |
| 0x0FFC | | |
| 0x0FFB | MAU Previous Output Access Location | |
| 0x0FFA | BMU Previous Output Access Location | |
| 0x0FF9 | ALU Previous Output Access Location | |
| 0x0FF8 | Reserved | |
| 0x0FF7 | MEM3 | |
| 0x0FF6 | MEM2 | |
| 0x0FF5 | MEM1 | |
| 0x0FF4 | MEM0 | |
| 0x0FF3 | INDX3(3:0) | |
| 0x0FF2 | INDX2(3:0) | 32 Dwords |
| 0x0FF1 | INDX1(3:0) | |
| 0x0FF0 | INDX0(3:0) | |
| 0x0FEF | Reserved | |
| 0x0FE6 | | |
| 0x0FE5 | Interrupt Vector Register (IVR) | |
| 0x0FE4 | Interrupt Register (INT) | |
| 0x0FE3 | Extended Processor Status Word (EPSW) | |
| 0x0FE2 | Processor Status Word (PSW) | |
| 0x0FE1 | Stack Pointer (SP) | |
| 0x0FE0 | Program Counter (PC) | |

*FIG. 97B*

| | | |
|---|---|---|
| 0x0FDF<br>0x0FD0 | Reserved for Instruction Dictionaries | ▲<br>│<br>64<br>Dwords |
| 0x0FCF<br>0x0FC0 | MAU Dictionary | |
| 0x0FBF<br>0x0FB0 | BMU Dictionary | |
| 0x0FAF<br>0x0FA0 | ALU Dictionary | |
| 0x0F9F<br>0x0F98 | Reserved for Routing Dictionaries | ▼ |
| 0x0F97<br>0x0F94 | MAU/BMU/ALU Four Port Routing Dictionary | ▲<br>│<br>32<br>Dwords |
| 0x0F93<br>0x0F90 | MAU/BMU/ALU Three Port Routing Dictionary | |
| 0x0F8F<br>0x0F8C | ALU/MAU Four Port Routing Dictionary | |
| 0x0F8B<br>0x0F88 | ALU/MAU Three Port Routing Dictionary | |
| 0x0F87<br>0x0F84 | ALU/BMU Four Port Routing Dictionary | |
| 0x0F83<br>0x0F80 | ALU/BMU Three Port Routing Dictionary | ▼ |

Note. F80h is the base address for short (128 Dword access) and long (1K Dwords) direct addresses in the <u>direct address</u> move instruction. It is also the <u>lower</u> base address of the <u>immediate data</u> move instruction.

*FIG. 97C*

| | |
|---|---|
| 0x0F7F <br><br> 0x0840 | Reserved |
| 0x083F <br><br> 0x0808 | Reserved for Hardware Operation Registers (eg. Icache tags, LRU bits, FFs, etc) |
| 0x0807 | LADR_ABuffer (LAB) |
| 0x0806 | P3WR_ABuffer (WR3) |
| 0x0805 | P2WR_ABuffer (WR2) |
| 0x0804 | MV_Buffer (MVB) |
| 0x0803 | PC_Buffer (PCB) |
| 0x0802 | Loop Count Register (LCR) |
| 0x0801 | Link Register (LNK) |
| 0x0800 | Top of Stack Cache Register (TOS) |
| 0x07FF <br><br> 0x0100 | Reserved for Cache Extension |
| 0x00FF <br><br> 0x0000 | Instruction Cache (256 Dwords) |

2K Dwords

*FIG. 97D*

| 3 1 | 3 0 | 2 9 | 2 8 | 2 7 | 2 6 | 2 5 | 2 4 | 2 3 | 2 2 | 2 1 | 2 0 | 19 15 | 14 10 | 9 5 | 4 0 |
|---|---|---|---|---|---|---|---|---|---|---|---|---|---|---|---|
| GO | | Ma | | | Al | | Bs | | | Oper. | | Port(3)/Ptr. | Port(2) | Port(1) | Port(0) |

*FIG. 98*

| GO | MA | AB | Oper. | Port(3)/Ptr. | Port(2) | Port(1) | Port(0) |
|---|---|---|---|---|---|---|---|

*FIG. 99*

| GO | MAB | Or. | I | Port(3)/Ptr. | Port(2) | Port(1) | Port(0) |
|---|---|---|---|---|---|---|---|

*FIG. 100A*

Bits:

| | | |
|---|---|---|
| 4-0 | : Port(0) | - Least significant 5 bits of memory port 0 address |
| 9-5 | : Port(1) | - Least significatn 5 bits of memory port 1 address |
| 14-10 | : Port(2) | - Least significant 5 bits of memory port 2 address |
| 19-15 | : Port(3)/Ptr. | - Least signifcant 5 bits of memory port 3 address |

(4 port mode; all ports are tied to the mem0 pointer)

or

- Memory port to memory pointer map
(3 port mode; allows different pointers per port)

Bits:

```
16-15      :Port(0) map
           00 = mem0
           01 = mem1
           10 = mem2
           11 = mem3
18-17      :Port(1) map
           00 = mem0
           01 = mem1
           10 = mem2
           11 = mem3
19         :Port(2) map
           0 = mem0
           1 = mem3
```

Note.    If mem$n$(30) = 0,

Bits:

| | |
|---|---|
| 19-15,: | 00000 = pointer indirect access |
| 14-10, | through mem$n$ with no post increment |
| 9-5, | 00001 - |
| 4-0 | 11111 = pointer direct (offset) access range with no post-increment |

FIG. 100B

If mem*n*(30) = 1,

Bits:
- 19-15,:   00000 = pointer indirect access
- 14-10,          through mem*n* with no post-increment
- 9-5,         00001 -
- 4-0          11011 = pointer direct (offset) access range with no post-increment
  - 11100 = post increment mem*n* by i*n*0
  - 11101 = post increment mem*n* by i*n*1
  - 11110 = post increment mem*n* by i*n*2
  - 11111 = post increment mem*n* by i*n*3

22-20: Opr.    - 3 bit Routing dictionary address (8 locations). Defined as follows.

In two and three operation mode:
    22-20: Opr    - 3 bit routing dictionary address.

In one operation mode:
    22-20: Or. - I    - Operand definitions.
- 000 = ports 0,1 and 2 are defined by pointer map in field 3
- 001 = ports 0 and 2 are defined by pointer map in field 3 and port field 1 is a 5 bit unsigned immediate value.
- 010 = reserved
- 011 = port fields 0 and 1 form a 10 bit unsigned immediate value input, port 2 is the second input and port 3 is the output (all ports are mem0).

*FIG. 100C*

11x = port 3 is a mem0 input and bits 14 to 0 represent the least significant 15 bits of 16 bit signed immediate data while bit 20 is the most significant bit (16th bit), where the output goes to the execution unit's register, ie, alu, bmu or mau.

28-23:     - Operation dictionary addresses. Defined as follows.

In three operation mode:
- 24-23: Bs   - 2 bit BMU dictionary address (lower 4 locations)
- 26-25: Al   - 2 bit ALU dictionary address (lower 4 locations)
- 28-27: Ma   - 2 bit MAU dictionary address (lower 4 locations)

In two operation mode:
- 25-23: AB   - 3 bit ALU or BMU dictionary address (all 8 locations)
- 28-26: MA   - 3 bit MAU or ALU dictionary address (all 8 locations)

In one operations mode:
- 28-23: MAB   - Defines extended MAU, ALU and BMU dictionary access
  - 28-27: Unit   - Execution unit
    - 00 = reserved
    - 01 = ALU
    - 10 = BMU
    - 11 = MAU
  - 26-23: Addr.   -Dictionary address of execution unit (16 locations)

*FIG. 100D*

31-29:GO — Group Opcode.
000 = Non-computational Instruction
001 = 2 operation mode, ALU and BMU (4 ports)
010 = 2 operation mode, ALU and MAU (4 ports)
011 = 3 operation mode, MAU, BMU and ALU (4 ports)
100 = 1 operation mode
101 = 2 operation mode, ALU and BMU (3 mapped ports)
110 = 2 operation mode, ALU and MAU (3 mapped ports)
111 = 3 operation mode, MAU, BMU and ALU (3 mapped ports)

*FIG. 100E*

| *FIG. 100A* |
| *FIG. 100B* |
| *FIG. 100C* |
| *FIG. 100D* |
| *FIG. 100E* |

*FIG. 100*

| 31 | 16 | 15        8 | 7  6 | 5        1 | 0 |
|----|----|----|----|----|----|
| Reserved | | Opcode | Pre | CCode | C |

Bits:

0 : C — Conditional (use condition code) or Unconditional Operation
0 = Unconditional
1 = Conditional N.B. During a SIMD conditional execution instruction, if the result is to be written to memory, than a write is performed only if all the conditions are true. Eg. In 16 bit SIMD precision both words have to have true conditions for a write to be peformed. On the other hand, the output register is updated on a byte, word or dword basis.

5-1 : CCode — 5 bit Condition Code (check condition code table)

N.B. In 32 bit mode, all four byte flags are set the same as the most significant byte. In the 16 bit SIMD mode, flags for bytes 3 and 2 are set the same as that for byte 3 and flags for byte 1 and 0 are set the same as the flag for byte 1.

7-6 : Pre. — Precision of the operation
00 = 32 bit precision
01 = 16 bit SIMD precision
10 = 08 bit SIMD precision
11 = Reserved 15-8 : Opcode — Operation Opcode (defined below)
Note. All opcodes are based on input operands to the MAU of A and B with an output Z.
Eg.
     Z = A <opmau> B

FIG. 101A

Bits:
15  : Basic/Extended Instructions
    0 = Basic Instructions

Bits:
8   : input A data format
    0 = unsigned
    1 = signed
9   : input B data format
    0 = unsigned
    1 = signed
10  : carry (from previous operation)
    0 = do not include carry
    1 = include carry
13  : Multiply switch
    0 = No multiply

Bits:
12-11   : Absolute value
        11 = absolute value 00,01,10 = negate input switch

Bits:
11  : input A sign operation
    0 = A
    1 = -A
12  : input B sign operation
    0 = B
    1 = -B
1 = multiply

*FIG. 101B*

Bits:
12-11    : Multiply-Accumulation operation
         00 = multiply + accummulator
         01 = multiply - accummulator
         10 = accummulator - multiply
         11 = multiply only
14   : Output Saturation control
         0 = No output saturation
         1 = output saturated 1 = Extended Instructions
Bits:
10-8 : Reserved

*FIG. 101C*

| *FIG. 101A* |
|---|
| *FIG. 101B* |
| *FIG. 101C* |

*FIG. 101*

| 31 | | 16 | 15 | 8 | 7 | 6 | 5 | 1 | 0 |
|---|---|---|---|---|---|---|---|---|---|
| Reserved | | | Opcode | | Pre | | CCode | | C |

Bits:
0   : C     —Conditional (use condition code) or Unconditional Operation
            0 = Unconditional
            1 = Conditional
5-1 : CCode - 5 bit Condition Code (check condition code table)
7-6 : Pre.  - Precision of the operation
            00 = 32 bit precision
            01 = 16 bit SIMD precision
            10 = 08 bit SIMD precision
            11 = Reserved
15-8 : Opcode - Operation Opcode (see following table)
            <u>Note</u>. All opcodes are based on input operands to the ALU of A and B with an output Z.
            Eg.
                Z = A <opalu> B Bits:
15   : Basic/Extended Instructions 0 = Basic Instructions Bits:
13   : Logical or Arithmetic Operations on ALU 1 = Logical Bits:
8    : reserved
9    : OR type
       0 = OR
       1 = XOR
10   : Logical operation
       0 = AND
       1 = OR/XOR

FIG. 102A

11   : Complement bit for input A
     0 = A
     1 = .NOT.A

12   : Complement bit for input B
     0 = B
     1 = .NOT.B

0 = Arithmetic

Bits:
8    : input A data format
     0 = unsigned
     1 = signed
9    : input B data format
     0 = unsigned
     1 = signed
10   : Carry (from previous operation)
     0 = do not include carry
     1 = include carry
12-11: Negate/Absolute value
     11 = absolute value of result at output
     00,01,10 = negate bits for inputs A and B Bits:
11   : input A sign operation
     0 = A
     1 = -A
12   : input B sign operation
     0 = B
     1 = -B 14   : Output Saturation control
     0 = No output saturation
     1 = output saturated 1 = Extended Instructions Bits:

*FIG. 102B*

| *FIG. 102A* |
|---|
| *FIG. 102B* |

*FIG. 102*

| 31 | | 16 | 15 | 8 | 7 | 6 | 5 | 1 | 0 |
|---|---|---|---|---|---|---|---|---|---|
| Reserved | | | Opcode | | Pre | | CCode | | C |

Bits:

0    : C    -Conditional (use condition code) or Unconditional Operation
                    0 = Unconditional
                    1 = Conditional 5-1  : CCode    - 5 bit Condition Code (check condition code table)

7-6  : Pre.        - Precision of the operation
                    00 = 32 bit precision
                    01 = 16 bit SIMD precision
                    10 = 08 bit SIMD precision
                    11 = Reserved 15-8 : Opcode  - Operation Opcode (see following table)
                  Note. All opcodes are based on input operands to the BMU of A and B with an output Z.
                  Eg.
                      Z = A <opbmu> B Bits:
        8     : Left/Right for shifts and rotates
              0 = Left
              1 = Right 9     : Shift/Rotate
              0 = Shift
              1 = Rotate 10    : Arithmetic/Logical
              0 = Logical
              1 = Arithmetic (sign extension)

12-11: Input Data Type
              00 = 32 bit data
              01 = 16 bit data
              10 = 08 bit data
              11 = Reserved 13    : Insert Switch
              0 = Off
              1 = On

*FIG. 103*

| 31 29 | 28 | 24 | 23 21 | 20 | 16 | 15 13 | 12 | 8 | 7 | 5 | 4 | 0 |
|---|---|---|---|---|---|---|---|---|---|---|---|---|
| Width | Shift | | Width | Shift | | Width | Shift | | Width | Shift | | |
| SIMD Byte 3 | | | SIMD Byte 2 | | | SIMD Byte 1 | | | SIMD Byte 0 | | | |

*FIG. 104*

| 31 | 24 | 23 20 | 19 | 16 | 15 | 8 | 7 | 4 | 3 | 0 |
|---|---|---|---|---|---|---|---|---|---|---|
| Reserved | | Width | Shift | | Reserved | | Width | Shift | | |
| | | SIMD Word 1 | | | | | SIMD Word 0 | | | |

14  : Output Saturation control
      0 = No output saturation
      1 = output saturated 15  : Extended Instructions

*FIG. 105*

| 3 | 3 | 2 | 2 | 2 | 2 | 2 | 2 | 2 | 2 | 2 | 2 | 1 | 1 | 1 | 1 | 1 | 1 | 1 | 1 | 1 | 1 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 0 | 9 | 8 | 7 | 6 | 5 | 4 | 3 | 2 | 1 | 0 | 9 | 8 | 7 | 6 | 5 | 4 | 3 | 2 | 1 | 0 | | | | | | | | | | |
| I10 | ES | MAU | | | BMU | | | ALU | | | | I10 | ES | MAU | | | BMU | | | ALU | | | | | | | | | | | |
| Routing dictionary odd address entry | | | | | | | | | | | | Routing dictionary even address entry | | | | | | | | | | | | | | | | | | | |

Bits:

15-0 : Defines an <u>even</u> address routing dictionary entry.

2-0,  : ALU      -Input/output port and register route encoding for each unit
6-4,  : BMU[7]                    Encoding A[1]
10-8  : MAU[8]   000 = Inputs: port (0),port (1)   Output: port[4](3)/*reg*[2,3]
                 001 = Inputs: port (0),alu        Output: port[4](3)/*reg*
                 010 = Inputs: port (0),bmu        Output: port[4](3)/*reg*
                 011 = Inputs: port (0),mau        Output: port[4](3)/*reg*
                 100[5] = Inputs: port (0),port (3)   Output: port(2)/*reg*
                 101 = Inputs: bmu,alu             Output: port[4](3)/*reg*
                 110 = Inputs: mau,bmu             Output: port[4](3)/*reg*
                 111 = Inputs: alu,mau             Output: port[4](3)/*reg*

*FIG. 106A*

Encoding B[1]

000 = Inputs: port (0),port (1)   Output: port (2)/*reg*
001 = Inputs: bmu,port (1)        Output: port (2)/*reg*
010 = Inputs: mau,port (1)        Output: port (2)/*reg*
011 = Inputs: alu,port (1)        Output: port (2)/*reg*
100 = Inputs: port (2),port (1)   Output: port[6](3)/*reg*
101 = Inputs: bmu,alu             Output: port (2)/*reg*
110 = Inputs: mau,bmu             Output: port (2)/*reg*
111 = Inputs: alu,mau             Output: port (2)/*reg*

Encoding C[1]

000 = Inputs: port (0),port (1)   Output: port[4](3)/*reg*
001 = Inputs: port (2),alu        Output: port[6](3)/*reg*
010 = Inputs: port (2),bmu        Output: port[6](3)/*reg*
011 = Inputs: port (2),mau        Output: port[6](3)/*reg*
100[5] = Inputs: port (2),port (3)   Output: *reg*
101 = Inputs: bmu,alu             Output: port[4](3)/*reg*
110 = Inputs: mau,bmu             Output: port[4](3)/*reg*
111 = Inputs: alu,mau             Output: port[4](3)/*reg*

3,   : AS   - Output selectors for the various execution units
7,   : BS[7]   1 = Output is to the respective execution unit's output register
11   : MS[8]        0 = Output is to a port 13-12: ES[9]     - Encoding Selector LSBs for ALU-BMU-MAU
<u>Two Operation Mode (ALU-BMU)</u>
x0 = ALU - Encoding A, BMU - Encoding B
x1 = ALU - Encoding B, BMU - Encoding A
<u>Two Operation Mode (ALU-MAU)</u>
x0 = ALU - Encoding A, MAU - Encoding B
x1 = ALU - Encoding B, MAU - Encoding A
<u>Three Operation Mode (ALU-BMU-MAU)</u>
00 = ALU - Encoding A, BMU - Encoding B,
     MAU - Encoding C
01 = ALU - Encoding B, BMU - Encoding C,
     MAU - Encoding A
10 = ALU - Encoding C, BMU - Encoding B,
     MAU - Encoding A
11 = ALU - Encoding B, BMU - Encoding A,
     MAU - Encoding B

FIG. 106B

| | | |
|---|---|---|
| 14 | :10 | -Immediate field indicator for port (0)<br>0 = port operand is from memory<br>1 = port operand is 5 bit unsigned immediate value |
| 15 | :11 | -Immediate field indicator for port (1)<br>0 = port operand is from memory<br>1 = port operand is 5 bit unsigned immediate value |

[1] In *two operation mode*, encoding A or B for each unit is selected through bit 12, whereas in *three operation mode*, encoding A, B or C (valid only in three op. mode) is selected through bits 14-12.

[2] Output to *port* or *register* is selected through bits 3, 7 and 11 for execution units ALU, BMU and MAU respectively.

[3] *reg* = alu, for the ALU route bit field (bits 2-0)
    = bmu, for the BMU route bit field (bits 6-4)
    = mau, for the MAU route bit field (bits 10-8)

[4] Port (3) replaced by Port (2) in *three port* mode.

[5] Reserved in *three port* mode.

[6] Output is always to a register in *three port* mode.

[7] These bits are reserved in the ALU-MAU *two operation* mode.

[8] These bits are reserved in the ALU-BMU *two operation* mode.

[9] Bit 13 is reserved in the two operation mode.

| | |
|---|---|
| 31-16 | :Defines an *odd* address routing dictionary entry. The encoding is the same as bits 15-0 defined above. |

*FIG. 106C*

| *FIG. 106A* |
|---|
| *FIG. 106B* |
| *FIG. 106C* |

*FIG. 106*

| 31 | 25 | 0 |
|---|---|---|
| Reserved | 26 Bit Source Byte Address | |

*FIG. 107*

| 31 | 25 | 0 |
|---|---|---|
| Reserved | 26 Bit Destination Byte Address | |

*FIG. 108*

| 31 | 24 | 23 | 16 | 15 | 12 | 11 | 0 |
|---|---|---|---|---|---|---|---|
| Reserved | | Height (bytes) | | Res. | | Width (bytes) | |

*FIG. 109*

| 31 | 24 | 23 | 16 | 15 | 12 | 11 | 0 |
|---|---|---|---|---|---|---|---|
| Reserved | | Destination Warp (bytes) | | Res. | | Source Warp (bytes) | |

*FIG. 110*

| 31 | 8 | 7 | 4 | 3 | 0 |
|---|---|---|---|---|---|
| Reserved | | D | Comm. | | Byte En. |

Bits:
3-0 :Byte Enables
4 :Horizontal address increment direction
 0 = Left to Right
 1 = Right to Left
5 :Vertical address increment direction
 0 = Left to Right
 1 = Right to Left
6 :External address space
 0 = Source is External
 1 = Destination is External

*FIG. 111A*

7 : DMA address space
    0 = Source and destination are within UMP space
    1 = Either source or destination is outside UMP space
8 : DMA transfer complete (this bit is set by hardware)
    0 = Transfer complete
    1 = Transfer in progress

*FIG. 111B*

| FIG. 111A |
| --- |
| FIG. 111B |

*FIG. 111*

| 0x04 | DMA Command Register (DMAC) |
| --- | --- |
| 0x03 | Source and Destination 2-D Warp Factor Register (WARP) |
| 0x02 | Transfer Size Register (TSR) |
| 0x01 | Destination Byte Address Register (DAR) |
| 0x00 | Source Byte Address Register (SAR) |

*FIG. 112*

| 31 30 29 28 27 26 25 24 23 22 21 20 | 19 | 18 | 17 | 16 | 15 | 14 | 13 | 12 | 11 | 10 | 9 | 8 | 7 | 6 | 5 | 4 | 3 | 2 | 1 | 0 |
| --- | --- | --- | --- | --- | --- | --- | --- | --- | --- | --- | --- | --- | --- | --- | --- | --- | --- | --- | --- | --- |
| Reserved | T3L | T2L | T1L | T0L | Re | T2S | T0S | T3I | T2I | T1I | T0I | T3C | T2C | T1C | T0C | T3E | T2E | T1E | T0E |

Bits:

3-0 : TxE      - Timer 0/1/2/3 Enable Bits
                    0 = Start timer
                    1 = Stop timer 7-4 : TxC      - Timer 0/1/2/3 Continuous loop Bits
                    0 = Single loop
                    1 = Continuous loop

*FIG. 113A*

11-8  : TxI        - Timer 0/1/2/3 Generate Interrupt Bits
                   0 = No Interrupt Generated
                   1 = Generate Interrupt
12    : T0S        -Timer 0 Scale/Timer Switch
                   0 = Independent timer
                   1 = Scaling counter for Timer 1 (32 bit mode)
13    : T2S        - Timer 2 Scale/Timer Switch
                   0 = Independent timer
                   1 = Scaling counter for Timer 3 (32 bit mode)
15-14 : Reserved
19-16 : TxL        -Timer 0/1/2/3 Lock Bits
                   0 = Timer Unlocked (timer not in use)
                   1 = Timer Locked (timer in use)
31-20 : Reserved

FIG. 113B

| FIG. 113A |
|-----------|
| FIG. 113B |

FIG. 113

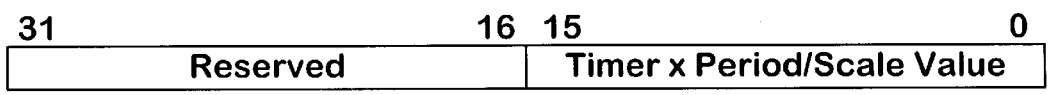
FIG. 114
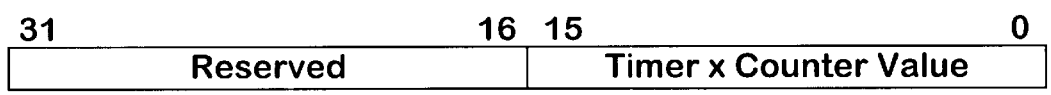
FIG. 115
| 0x08 | Timer 3 Period Register (TP3) |
| --- | --- |
| 0x07 | Timer 2 Period/Scale Register (TPS2) |
| 0x06 | Timer 1 Period Register (TP1) |
| 0x05 | Timer 0 Period/Scale Register (TPS0) |
| 0x04 | Timer 3  Counter 3 (TC3) |
| 0x03 | Timer 2  Counter 2 (TC2) |
| 0x02 | Timer 1  Counter 1 (TC1) |
| 0x01 | Timer 0  Counter 0 (TC0) |
| 0x00 | Timer Status and Control Register (TSCR) |
FIG. 116

APPARATUS AND METHOD OF IMPLEMENTING SYSTEMS ON SILICON USING DYNAMIC-ADAPTIVE RUN-TIME RECONFIGURABLE CIRCUITS FOR PROCESSING MULTIPLE, INDEPENDENT DATA AND CONTROL STREAMS OF VARYING RATES

RELATED APPLICATION

This application claims the benefit of U.S. Provisional Application No. 60/039,237 entitled, "APPARATUS AND METHOD OF IMPLEMENTING SYSTEMS ON SILICON USING DYNAMIC-ADAPTIVE RUN-TIME RECONFIGURABLE CIRCUITS FOR PROCESSING MULTIPLE, INDEPENDENT DATA AND CONTROL STREAMS OF VARYING RATES" filed on Feb. 28, 1997 by Rupan Roy and is hereby incorporated herein by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention pertains to the field of runtime reconfigurable dynamic-adaptive digital circuits which can implement a myriad of digital processing functions related to systems control, digital signal processing, communications, image processing, speech and voice recognition or synthesis, three-dimensional graphics rendering, video processing. High definition television, cellular and broadcast radio, neural networks, etc.

BACKGROUND OF THE INVENTION

To date, the most common method of implementing various functions on an integrated circuit is by specifically designing the function or functions to be performed by placing on silicon an interconnected group of digital circuits in a non-modifiable manner (hard-wired or fixed function implementation.) These circuits are designed to provide the fastest possible operation of the circuit in the least amount of silicon area. In general these circuits are made up of an interconnection of various amounts of random-access memory and logic circuits. Complex systems on silicon are broken up into separate blocks and each block is designed separately to only perform the function that it was intended to do. In such systems, each block has to be individually tested and validated, and then the whole system has to be tested to make sure that the constituent parts work together. This process is becoming increasingly complex as we move into future generations of single-chip system implementations. Systems implemented in this way generally tend to be the highest performing systems since each block in the system has been individually tuned to provide the expected level of performance. This method of implementation may be the smallest (cheapest in terms of silicon area) method when compared to three other distinct ways of implementing such systems today. Each of these other three have their problems and generally do not tend to be the most cost-effective solution. These other methods are explained below.

Any system can be functionally implemented in software using a microprocessor and associated computing system. Such systems would however, not be able to deliver real-time performance in a cost-effective manner for the class of applications that was described above. Today such systems are used to model the subsequent hard-wired/fixed-function system before considerable design effort is put into the system design.

The second method of implementing such systems is by using a digital signal processor or DSP. This class of computing machines is useful for real-time processing of certain speech, audio, video and image processing problems. They may also be effective in certain control functions but are not cost-effective when it comes to performing certain real time tasks which do not have a high degree of parallelism in them or tasks that require multiple parallel threads of operation such as three-dimensional graphics.

The third method of implementing such systems is by using field programmable gate arrays or FPGAs. These devices are made up of a two-dimensional array of fine grained logic and storage elements which can be connected together in the field by downloading a configuration stream which essentially routes signals between these elements. This routing of the data is performed by pass-transistor logic. FPGAs are by far the most flexible of the three methods mentioned. The problem with trying to implement complex real-time systems with FPGAs is that although there is a greater flexibility for optimizing the silicon usage in such devices, the designer has to trade it off for increase in cost and decrease in performance. The performance may (in some cases) be increased considerably at a significant cost, but still would not match the performance of hard-wired fixed function devices.

It can be seen that the above mentioned systems do not reduce the cost or increase the performance over fixed-function silicon systems. In fact, as far as performance is concerned fixed-function systems still out perform the above mentioned systems for the same cost.

The three systems mentioned can theoretically reduce cost by removing redundancy from the system. Redundancy is removed by re-using computational blocks and memory. The only problem is that these systems themselves are increasingly complex, and therefore, their computational density when compared with fixed-function devices is very high.

Most systems on silicon are built up of complex blocks of functions that have varying data bandwidth and computational requirements. As data and control information moves through the system, the processing bandwidth varies enormously. Regardless of the fact that the bandwidth varies, fixed-function systems have logic blocks that exhibit a "temporal redundancy" that can be exploited to drastically reduce the cost of the system. This is true, because in fixed function implementations all possible functional requirements of the necessary data processing has to be implemented on the silicon regardless of the final application of the device or the nature of the data to be processed. Therefore, if a fixed function device has to adaptively process data, then it has to commit silicon resources to process all possible flavors of the data. Furthermore, state-variable storage in all fixed function systems are implemented using area inefficient storage elements such as latches and flip-flops.

It is the object of the present invention to provide a new method and apparatus for implementing systems on silicon or other material which will enable the user a means for achieving the performance of fixed-function implementations at a lower cost. The lower cost is achieved by removing redundancy from the system. The redundancy is removed by re-using groups of computational and storage elements in different configurations. The cost is further reduced by employing only static or dynamic ram as a means for holding the state of the system. This invention provides a means of effectively adapting the configuration of the circuit to varying input data and processing requirements. All of this reconfiguration can take place dynamically in run-time without any degradation of performance over fixed function implementations.

SUMMARY OF THE INVENTION

According to the present invention, apparatus and method are provided for adaptively dynamically reconfiguring groups of computational and storage elements in run-time to process multiple separate streams of data and control at varying rates. The aggregate of the dynamically reconfigurable computational and storage elements will heretofore be referred to as a "media processing unit". In one embodiment a plurality of said media processing units are interconnected in a matrix using a reconfigurable memory mapped pipelined communication/data transfer protocol.

BRIEF DESCRIPTION OF THE INVENTION

FIG. 1 depicts an integrated circuit comprising a plurality of media processing units. Furthermore, a plurality of such integrated circuits could be connected together to form a larger system.

All communication and transfer of data within any such system is based on a memory map. Every single state variable in such a system occupies a place on a system memory map. All reconfiguration between multiple media processing units be they on or off chip, is through the memory map. Routing of data and control information proceeds through the system by associating an address with the information.

The media processing units comprise multiple blocks of memory which act as the state variable storage elements (which can be dynamic ram or static ram) and multiple blocks of various computational units. FIG. 2 depicts the memory blocks and the computational units connected together by a reconfigurable routing matrix. The reconfigurable routing matrix can dynamically, on a per clock basis, be switched to present a different configuration.

The dynamic routing of the computational units is folded into the pipeline of the machine so that routing delays do not inhibit the speed of operation of the device. The depth of the pipeline can be varied depending on the complexity and performance required out of the device. In cases of deeper pipelines, multi-threaded applications can be run through the same media processing unit to alleviate problems with pipeline latencies.

The configuration data for the computational blocks consist of information that determines the operation that a specific block will perform, its data dependencies on the results from other blocks and the precision of its input and output data. The precision of the input data may be different from the precision of its output data.

The configuration data for the routing consists of information regarding the routing of data between various computational blocks themselves and also between computational blocks and the storage elements (memory).

All configuration data is placed in normal memory much like data and is accessed on a pipeline basis much the same way as data, i.e., configuration data is treated just like any other data.

Within the media processing units there is a hierarchy of routing referred to as "micro-routing" and "macro-routing". Micro-routing refers to routing within macro data types such as 32, 16 or 8 bit data. In micro-routing signals (bits) can be individually routed between various macro data types to emulate fixed-function (hard-wired) designs. Macro-routing routes macro-data width connections between computational elements and computational elements and storage elements.

The adaptive nature of the invention comes from the fact that the configuration information can be changed on the fly by the nature of the data that is being processed. The configuration information can be accessed and modified at any time and is treated just like any other data.

A particular application is mapped onto the device by studying its computational complexity and performance requirements. The application is broken up into separate blocks which perform the functions required. The inputs, outputs and bandwidth requirements of each of these smaller blocks is determined. The various configurations of media processing units, computational and storage elements is then determined from the specification of the smaller blocks.

The cycle or sequence of both computational unit configuration and routing configuration that is required to implement a specific function is the instruction sequence of that particular function and is herein referred to as the "software" that drives the device.

In FIG. 3, an embodiment of the invention, eight (8) media processing units (MPUs) are interconnected through a pipelined communication and data transfer wiring scheme which essentially consists of four (4) bi-directional 64 bit busses. Data transfer to and from media processing units is managed through memory mapped locations.

Each of these units is capable of executing one or a multiple of complex 32 bit media instructions per clock cycle. This instruction stream forms the configuration sequence for both the computational, storage and routing elements of the units. This complex media instruction may configure the media processing unit to execute three concurrent 32 bit arithmetic or logical operations in parallel while accessing four 32 bit data words from memory and also performing four memory address computations; all this in a single clock cycle. All the computational units have a 32 bit data path in the current embodiment except for the multiplier-accumulator unit which has a 64 bit accumulator. These data paths can be split into multiple 8 or 16 bit data paths working in a SIMD mode of operation. Each complex media instruction is comparable to multiple simple DSP like instructions.

The present embodiment of the invention has two (2) computational units within each media processing unit. These two units are a 32 bit Multiplier whose output can be accumulated to 64 bits (MAU) and a 32 bit Arithmetic Logic Unit (ALU). A 32 bit micro-router (BMU) with 64 bit input and 32 bit output is also present. The two computational units and the micro-router can be configured to implement pipelined 32 bit Single Precision IEEE Floating Point Multiplies, Adds and Divides. This greatly enhances the capability of the device to implement complex modem, audio and 3-D applications.

Since each of the MPUs are virtually identical to each other, writing software (the configuration sequence) becomes very easy. The RISC-like nature of each of these media processing units also allows for a consistent hardware platform for simple OS and driver development. Any one of the MPU's can take on a supervisory role and act as a central controller if necessary. This can be very useful in Set-top box applications where a Controlling CPU will not be necessary.

All communication on chip is memory based, i.e., all the processing units (MPUs, Video interface, etc) lie on a 64 MB memory map and communication between these units and the units and local memory is through simple memory reads and writes. Here a processing unit refers to the MPU's as well as all the peripheral controllers. These peripheral controllers consist of the PCI interface, Video capture interface, Audio Codec and Telecommunications interface and the Video Display interfaces. Therefore, besides there being DMA pathways for all these peripheral interfaces, there also exists "through processor" pathways for all input and output media data. This allows for pre and post-processing of all data types going into and coming out of memory, thereby greatly reducing memory bandwidth. This processing can be done "on the fly" because of the very high speed at which each of the MPU's operate.

Operation of the MPU's can be interrupted by the various peripheral interface units. This allows for "object oriented" media types to be implemented. Memory fill/empty level trigger points can be set up for the various peripheral interfaces which interrupt particular MPU's that can then service these interrupts "on the fly".

Figure 26:
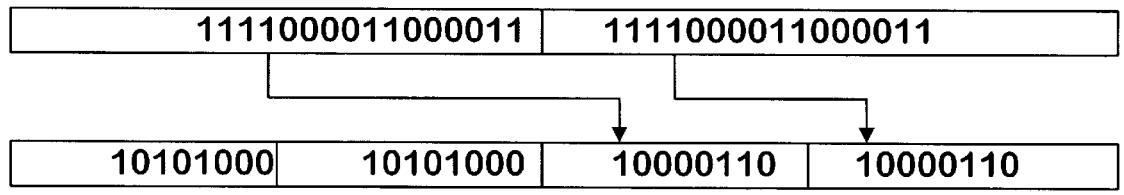

FIG. 26 is a memory map illustrating the effect of a first example logical shift left bit manipulation performed with 8 bit precision SIMD on a Word data type input by a bit manipulation unit according to one embodiment of the present invention.

Figure 27:
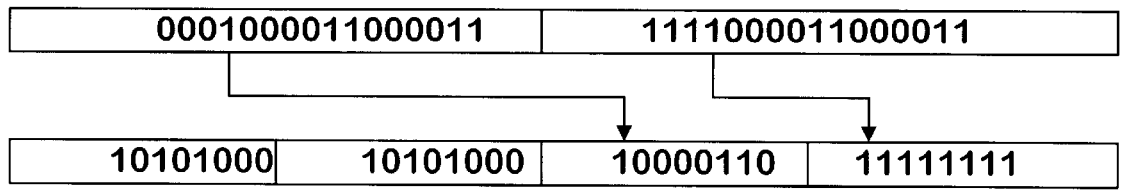

FIG. 27 is a memory map illustrating the effect of a second example logical shift left bit manipulation performed with 8 bit precision SIMD on a Word data type input by a bit manipulation unit according to one embodiment of the present invention.

Figure 28:
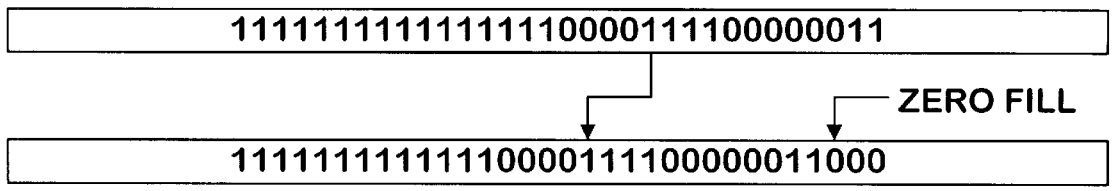

FIG. 28 is a memory map illustrating the effect of a first example arithmetic shift left bit manipulation performed with 32 bit precision on a Dword data type input by a bit manipulation unit according to one embodiment of the present invention.

Figure 29:
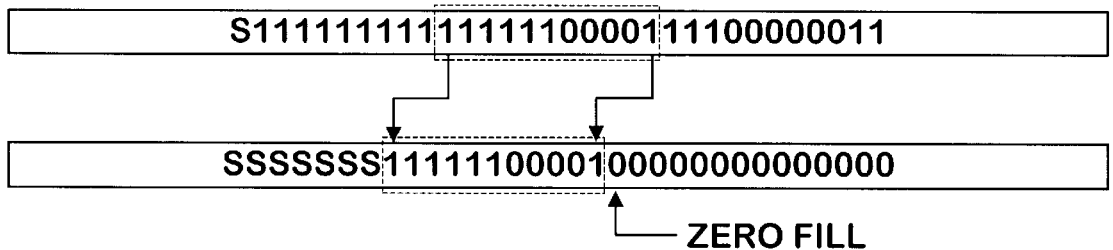

FIG. 29 is a memory map illustrating the effect of a second example arithmetic shift left bit manipulation performed with 32 bit precision on a Dword data type input by a bit manipulation unit according to one embodiment of the present invention.

Figure 30:
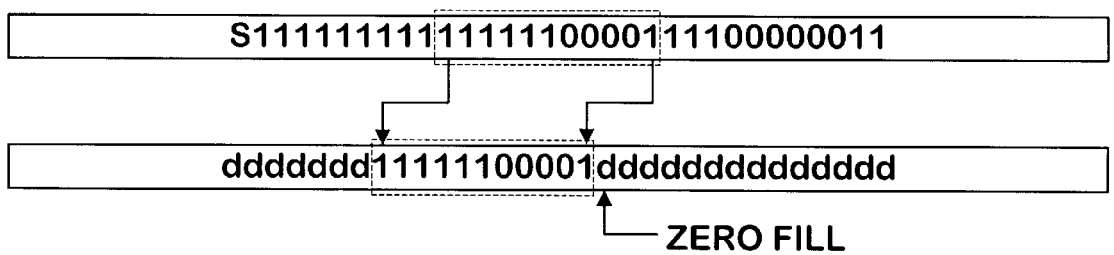

FIG. 30 is a memory map illustrating the effect of a third example arithmetic shift left bit manipulation performed with 32 bit precision on a Dword data type input by a bit manipulation unit according to one embodiment of the present invention.

Figure 31:
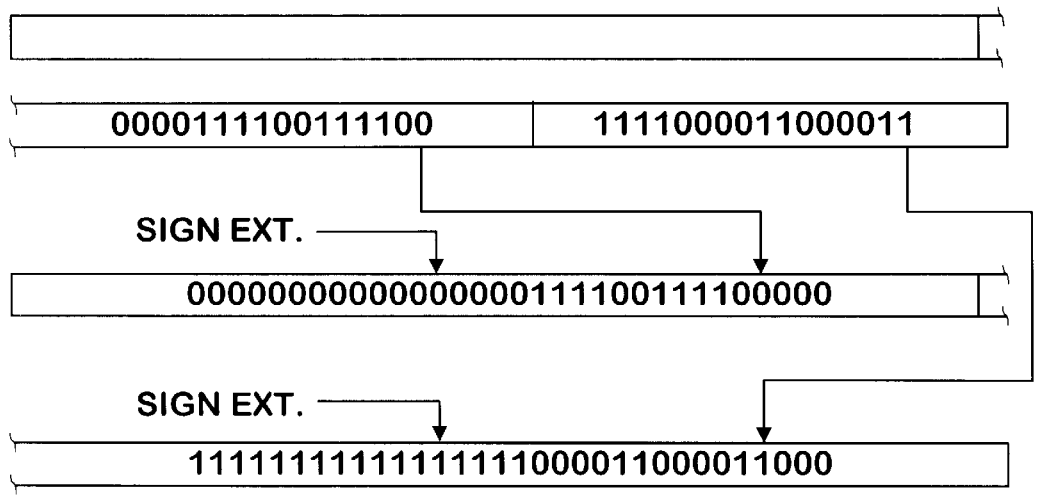

FIG. 31 is a memory map illustrating the effect of a first example arithmetic shift left bit manipulation performed with 32 bit precision on a Word data type input by a bit manipulation unit according to one embodiment of the present invention.

Figure 32:
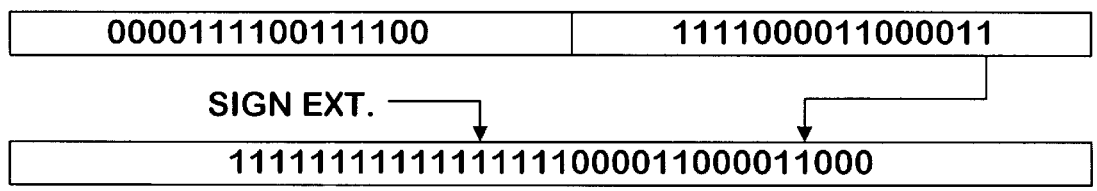

FIG. 32 is a memory map illustrating the effect of a second example arithmetic shift left bit manipulation performed with 32 bit precision on a Word data type input by a bit manipulation unit according to one embodiment of the present invention.

Figure 33:
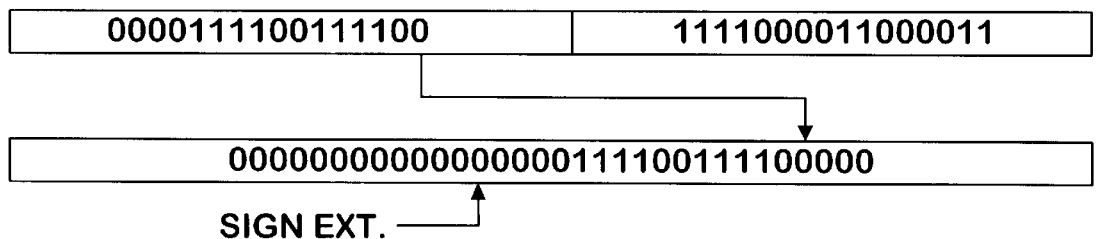

FIG. 33 is a memory map illustrating the effect of a third example arithmetic shift left bit manipulation performed with 32 bit precision on a Word data type input by a bit manipulation unit according to one embodiment of the present invention.

Figure 34:
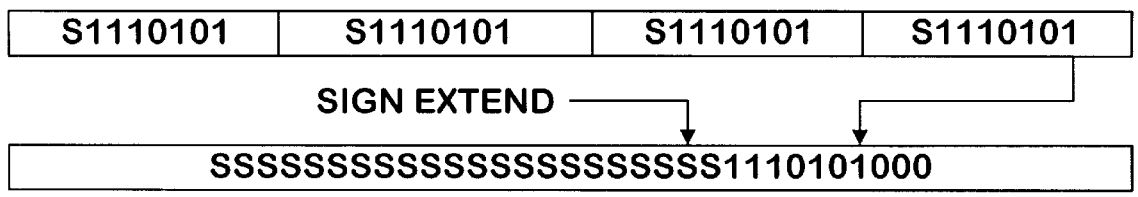

FIG. 34 is a memory map illustrating the effect of a first example arithmetic shift left bit manipulation performed with 32 bit precision on a Byte data type input by a bit manipulation unit according to one embodiment of the present invention.

Figure 35:
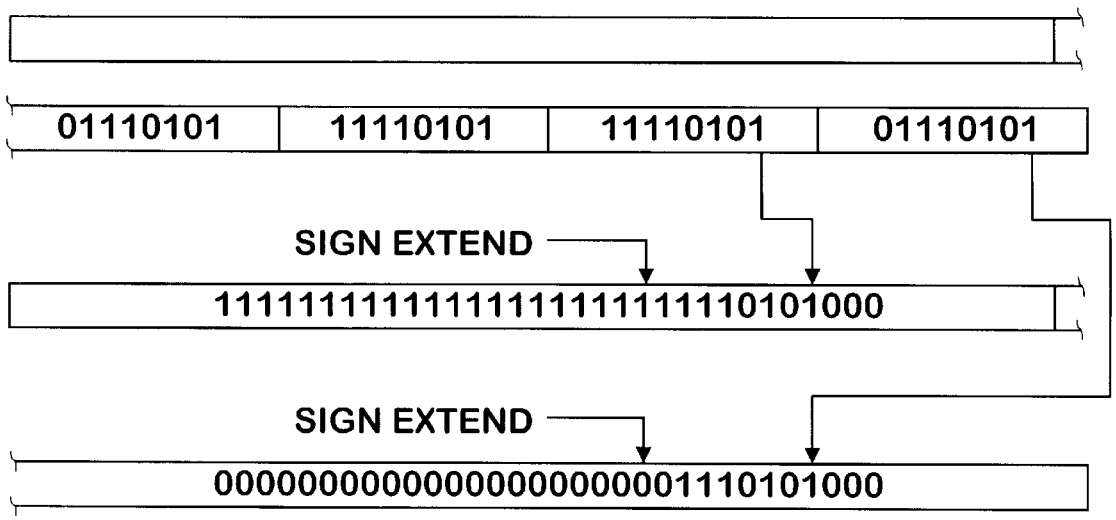

FIG. 35 is a memory map illustrating the effect of a second example arithmetic shift left bit manipulation performed with 32 bit precision on a Byte data type input by a bit manipulation unit according to one embodiment of the present invention.

Figure 36:
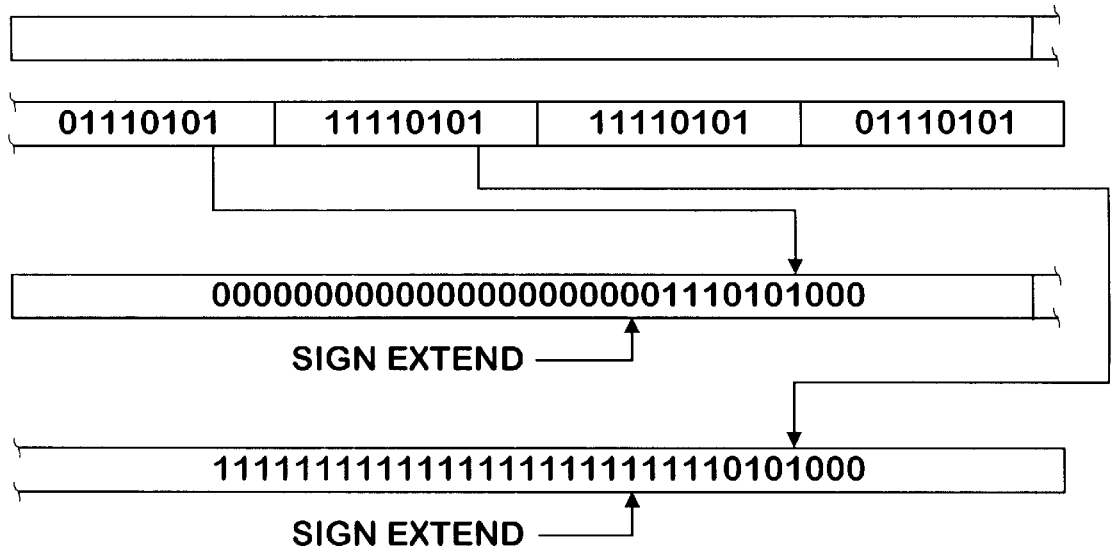

FIG. 36 is a memory map illustrating the effect of a third example arithmetic shift left bit manipulation performed with 32 bit precision on a Byte data type input by a bit manipulation unit according to one embodiment of the present invention.

Figure 37:
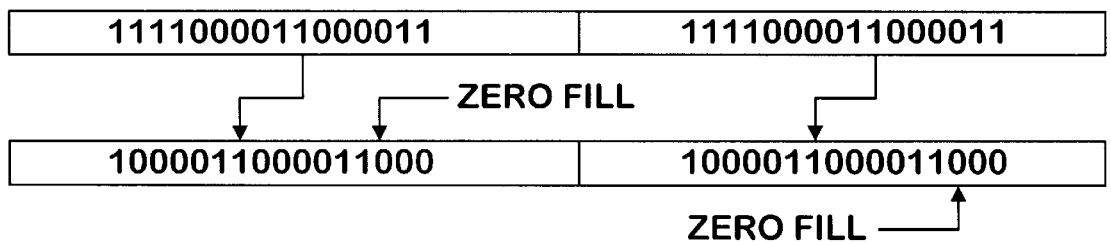

FIG. 37 is a memory map illustrating the effect of a first example arithmetic shift left bit manipulation performed with 16 bit precision SIMD on a Word data type input by a bit manipulation unit according to one embodiment of the present invention.

Figure 38:
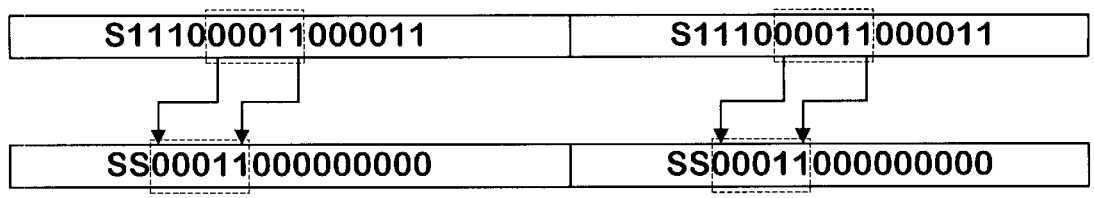

FIG. 38 is a memory map illustrating the effect of a second example arithmetic shift left bit manipulation performed with 16 bit precision SIMD on a Word data type input by a bit manipulation unit according to one embodiment of the present invention.

Figure 39:
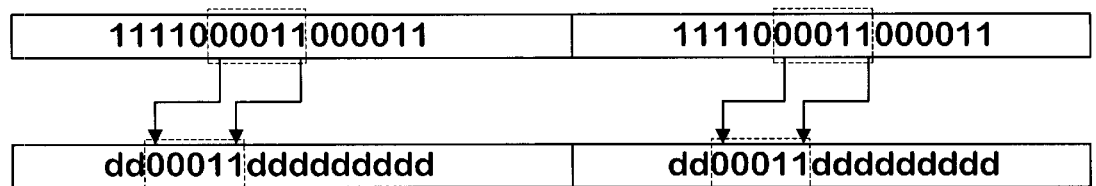

FIG. 39 is a memory map illustrating the effect of a third example arithmetic shift left bit manipulation performed with 16 bit precision SIMD on a Word data type input by a bit manipulation unit according to one embodiment of the present invention.

Figure 40:
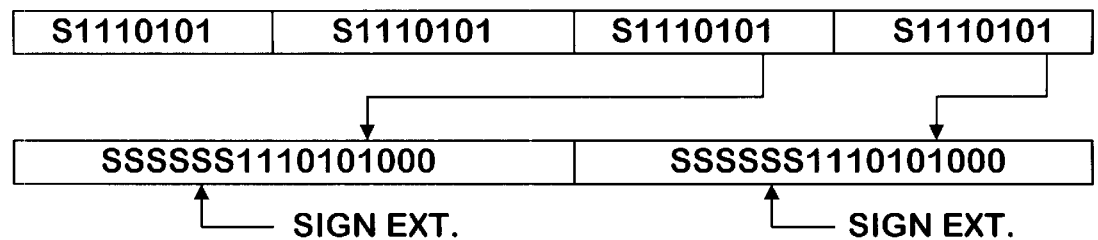

FIG. 40 is a memory map illustrating the effect of a first example arithmetic shift left bit manipulation performed with 16 bit precision SIMD on a Byte data type input by a bit manipulation unit according to one embodiment of the present invention.

Figure 41:
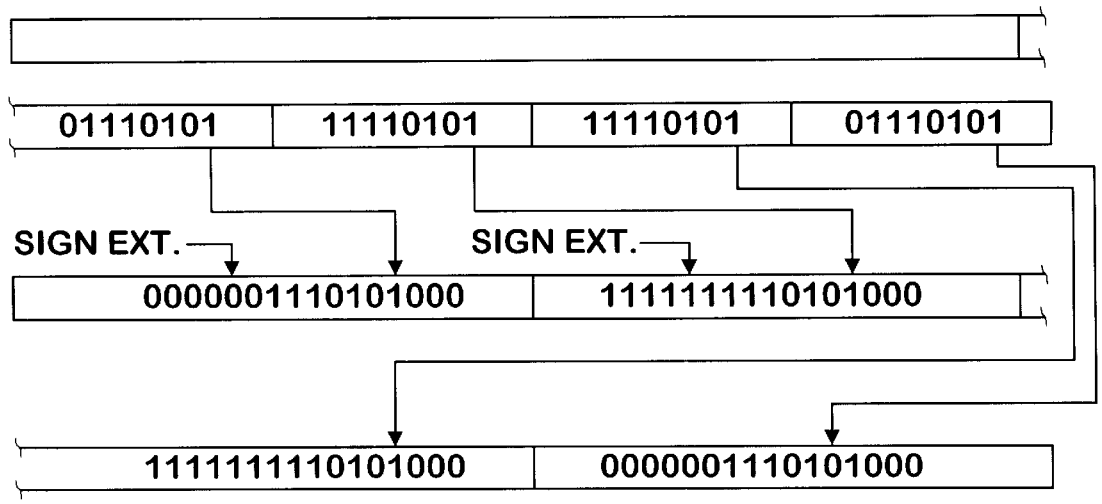

FIG. 41 is a memory map illustrating the effect of a second example arithmetic shift left bit manipulation performed with 16 bit precision SIMD on a Byte data type input by a bit manipulation unit according to one embodiment of the present invention.

Figure 42:
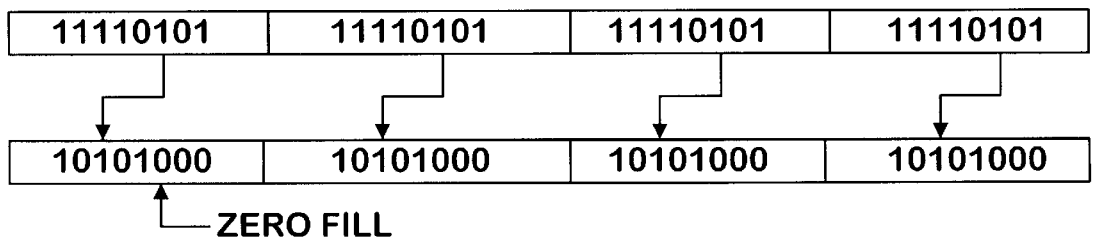

FIG. 42 is a memory map illustrating the effect of a first example arithmetic shift left bit manipulation performed with 8 bit precision SIMD on a Byte data type input by a bit manipulation unit according to one embodiment of the present invention.

Figure 43:
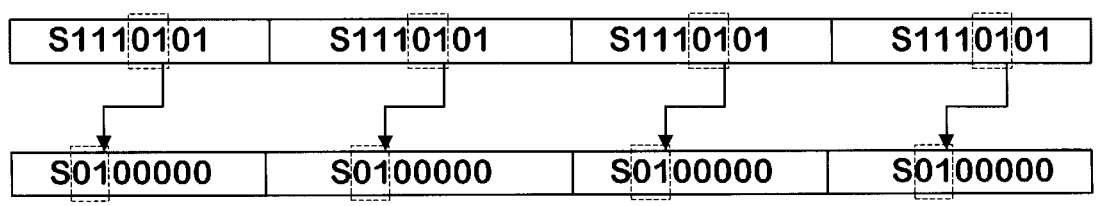

FIG. 43 is a memory map illustrating the effect of a second example arithmetic shift left bit manipulation performed with 8 bit precision SIMD on a Byte data type input by a bit manipulation unit according to one embodiment of the present invention.

Figure 44:
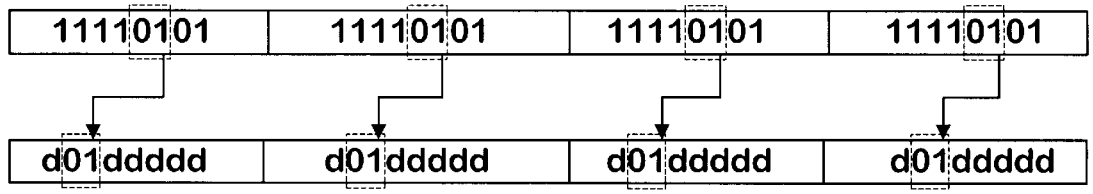

FIG. 44 is a memory map illustrating the effect of a third example arithmetic shift left bit manipulation performed with 8 bit precision SIMD on a Byte data type input by a bit manipulation unit according to one embodiment of the present invention.

Figure 45:
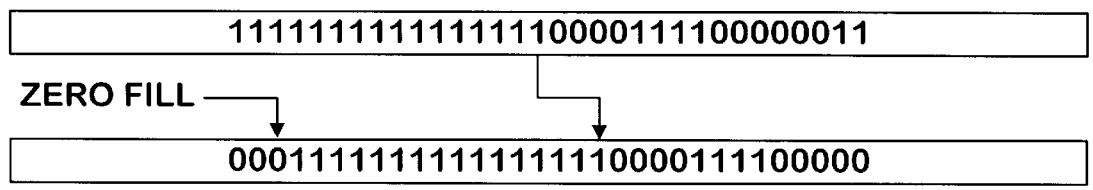

FIG. 45 is a memory map illustrating the effect of a first example logical shift right bit manipulation performed with 32 bit precision on a Dword data type input by a bit manipulation unit according to one embodiment of the present invention.

Figure 46:
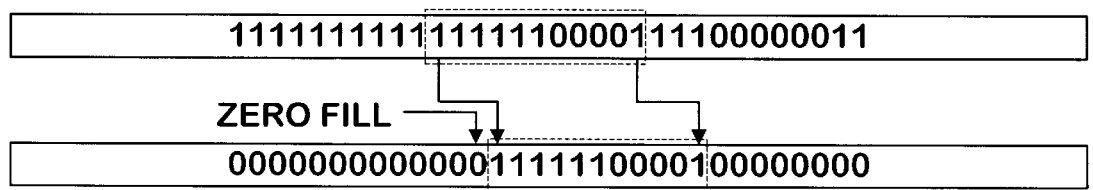

FIG. 46 is a memory map illustrating the effect of a second example logical shift right bit manipulation performed with 32 bit precision on a Dword data type input by a bit manipulation unit according to one embodiment of the present invention.

Figure 47:
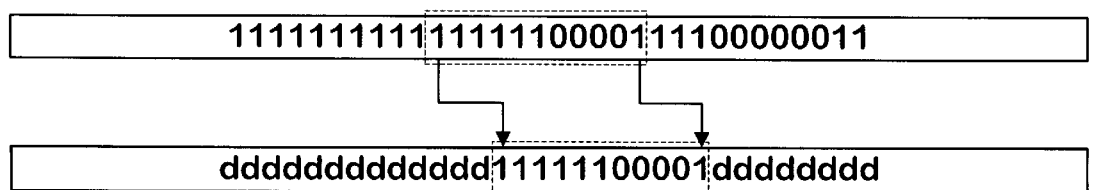

FIG. 47 is a memory map illustrating the effect of a third example logical shift right bit manipulation performed with 32 bit precision on a Dword data type input by a bit manipulation unit according to one embodiment of the present invention.

Figure 48:
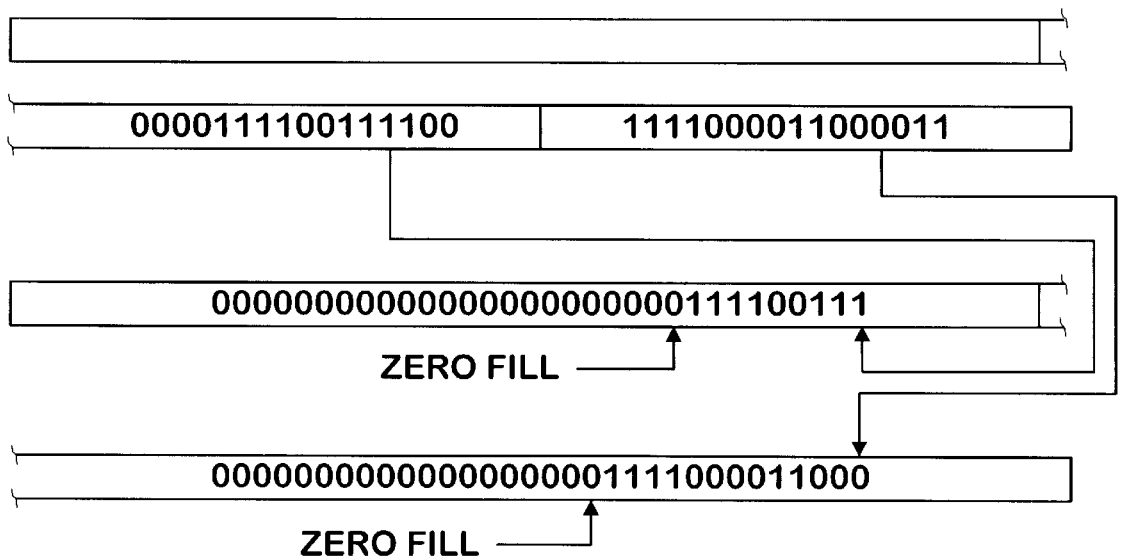

FIG. 48 is a memory map illustrating the effect of a first example logical shift right bit manipulation performed with 32 bit precision on a Word data type input by a bit manipulation unit according to one embodiment of the present invention.

Figure 49:
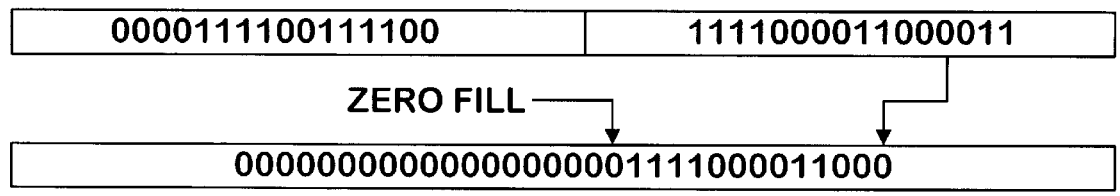

FIG. 49 is a memory map illustrating the effect of a second example logical shift right bit manipulation performed with 32 bit precision on a Word data type input by a bit manipulation unit according to one embodiment of the present invention.

Figure 50:
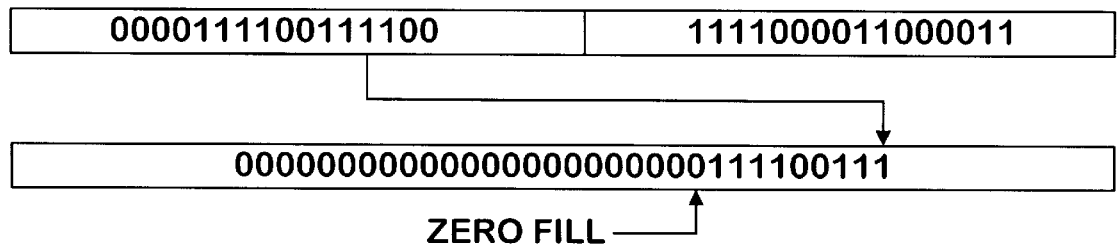

FIG. 50 is a memory map illustrating the effect of a third example logical shift right bit manipulation performed with 32 bit precision on a Word data type input by a bit manipulation unit according to one embodiment of the present invention.

Figure 51:
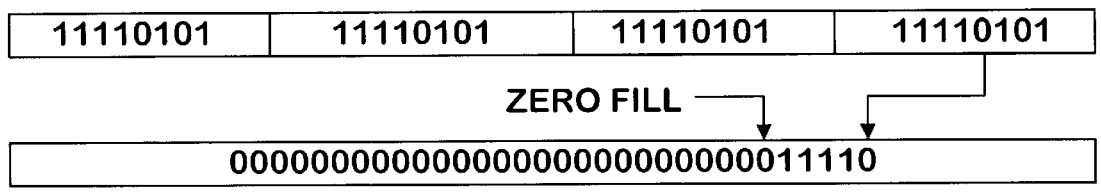

FIG. 51 is a memory map illustrating the effect of a first example logical shift right bit manipulation performed with 32 bit precision on a Byte data type input by a bit manipulation unit according to one embodiment of the present invention.

Figure 52:
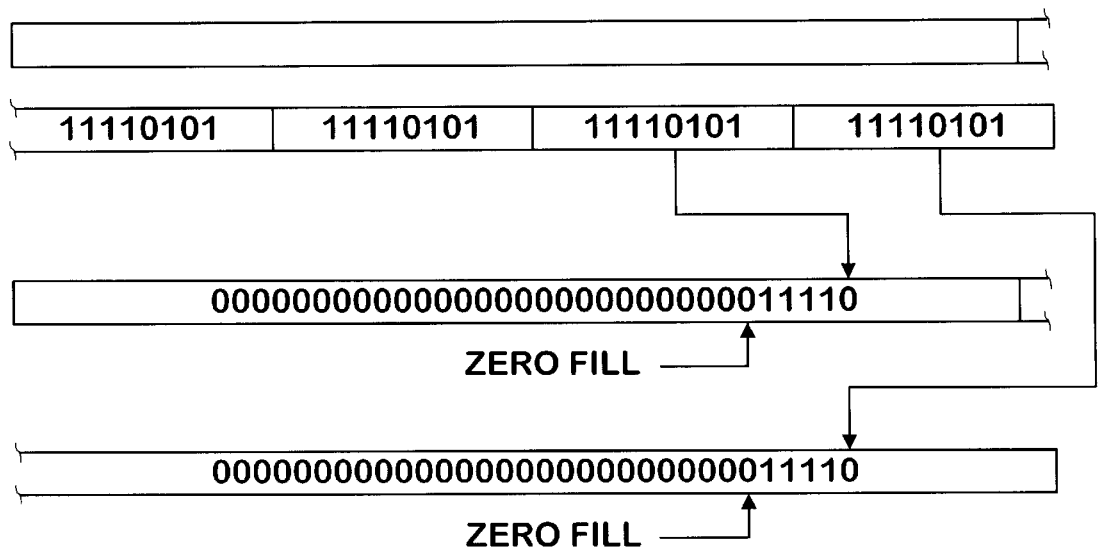

FIG. 52 is a memory map illustrating the effect of a second example logical shift right bit manipulation performed with 32 bit precision on a Byte data type input by a bit manipulation unit according to one embodiment of the present invention.

Figure 53:
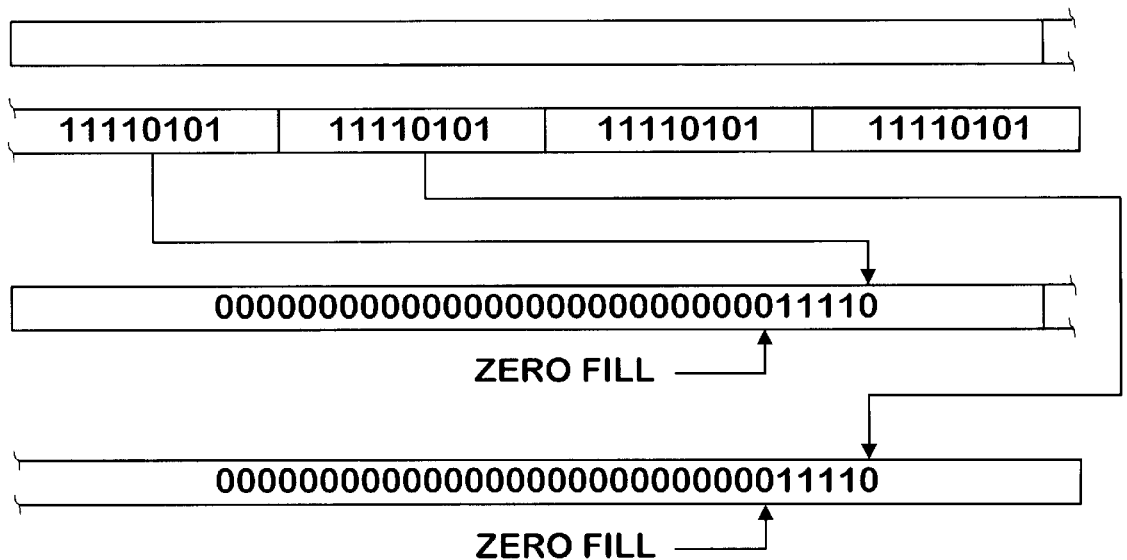

FIG. 53 is a memory map illustrating the effect of a third example logical shift right bit manipulation performed with 32 bit precision on a Byte data type input by a bit manipulation unit according to one embodiment of the present invention.

Figure 54:
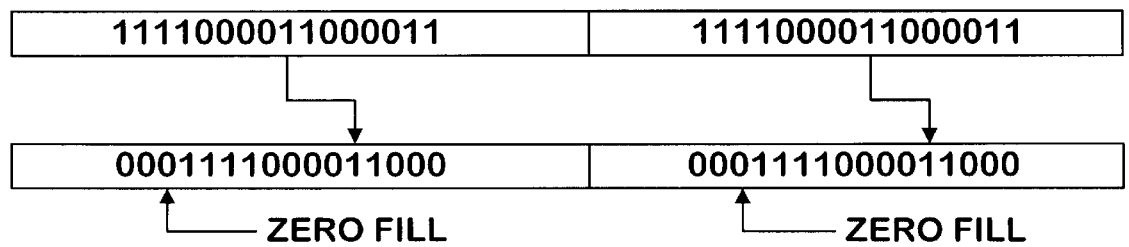

FIG. 54 is a memory map illustrating the effect of a first example logical shift right bit manipulation performed with 16 bit precision SIMD on a Word data type input by a bit manipulation unit according to one embodiment of the present invention.

Figure 55:
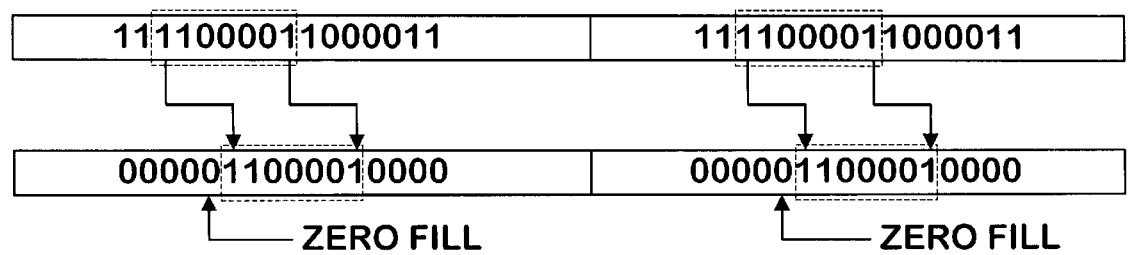

FIG. 55 is a memory map illustrating the effect of a second example logical shift right bit manipulation performed with 16 bit precision SIMD on a Word data type input by a bit manipulation unit according to one embodiment of the present invention.

Figure 56:
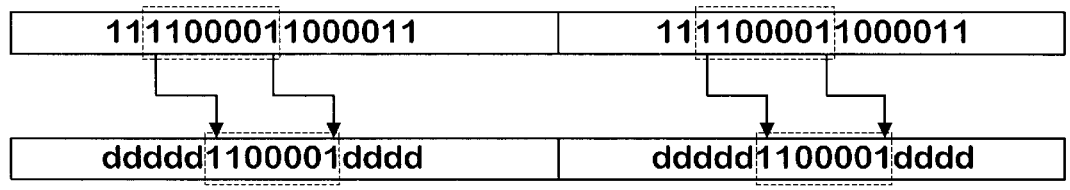

FIG. 56 is a memory map illustrating the effect of a third example logical shift right bit manipulation performed with 16 bit precision SIMD on a Word data type input by a bit manipulation unit according to one embodiment of the present invention.

Figure 57:
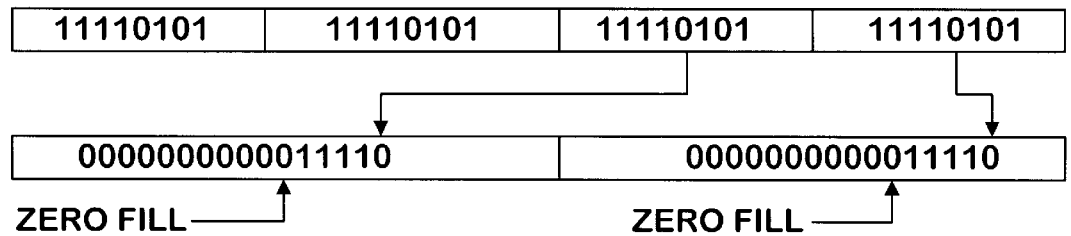

FIG. 57 is a memory map illustrating the effect of a first example logical shift right bit manipulation performed with 16 bit precision SlMD on a Byte data type input by a bit manipulation unit according to one embodiment of the present invention.

Figure 58:
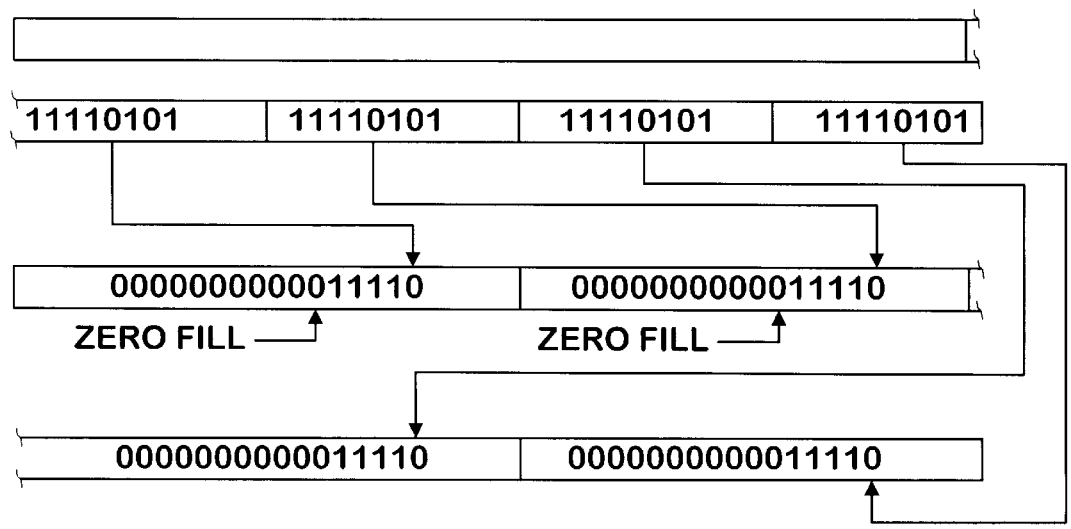

FIG. 58 is a memory map illustrating the effect of a second example logical shift right bit manipulation performed with 16 bit precision SIMD on a Byte data type input by a bit manipulation unit according to one embodiment of the present invention.

Figure 59:
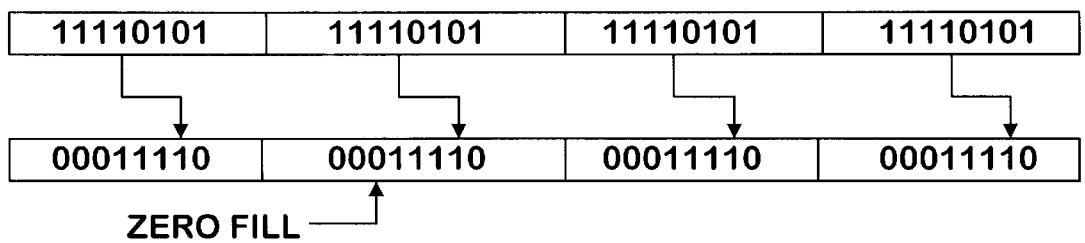

FIG. 59 is a memory map illustrating the effect of a first example logical shift right bit manipulation performed with 8 bit precision SIMD on a Byte data type input by a bit manipulation unit according to one embodiment of the present invention.

Figure 60:
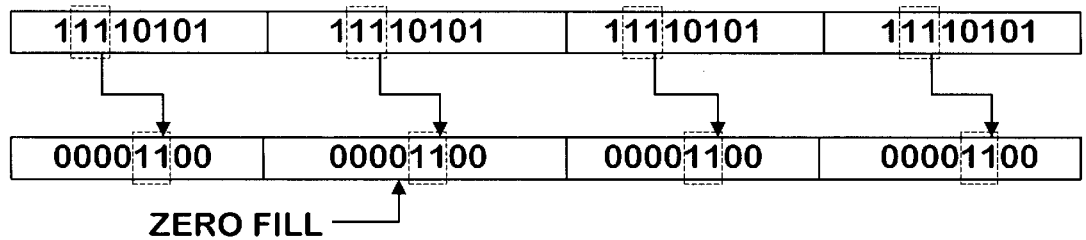

FIG. 60 is a memory map illustrating the effect of a second example logical shift right bit manipulation performed with 8 bit precision SIMD on a Byte data type input by a bit manipulation unit according to one embodiment of the present invention.

Figure 61:
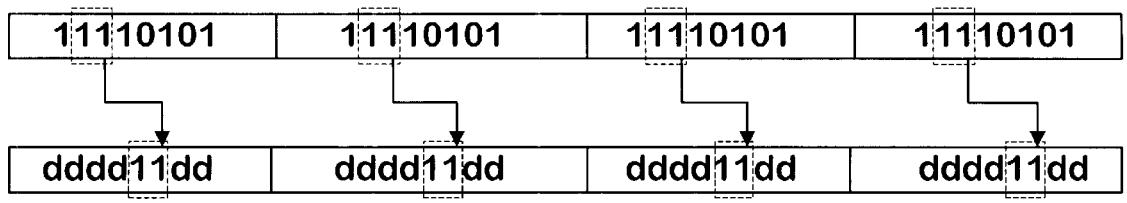

FIG. 61 is a memory map illustrating the effect of a third example logical shift right bit manipulation performed with 8 bit precision SIMD on a Byte data type input by a bit manipulation unit according to one embodiment of the present invention.

Figure 62:
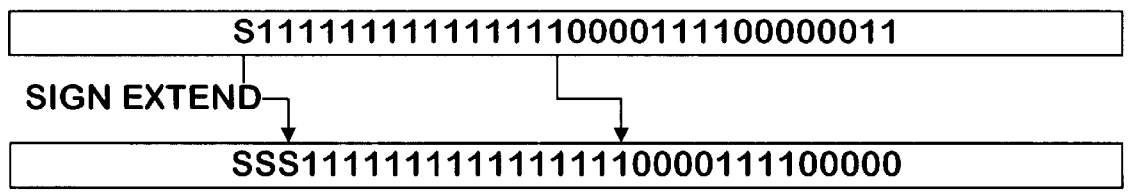

FIG. 62 is a memory map illustrating the effect of a first example arithmetic shift right bit manipulation performed with 32 bit precision on a Dword data type input by a bit manipulation unit according to one embodiment of the present invention.

Figure 63:
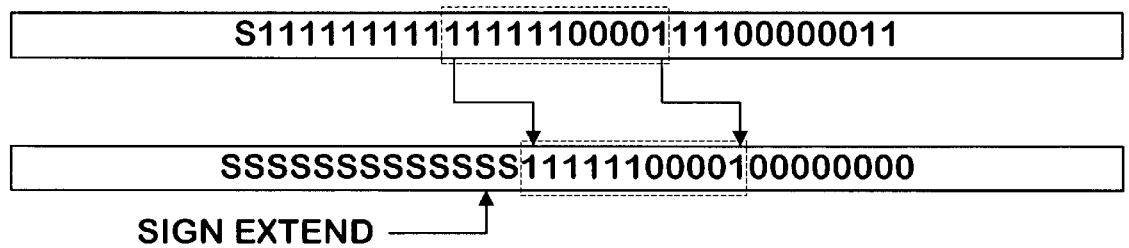

FIG. 63 is a memory map illustrating the effect of a second example arithmetic shift right bit manipulation performed with 32 bit precision on a Dword data type input by a bit manipulation unit according to one embodiment of the present invention.

Figure 64:
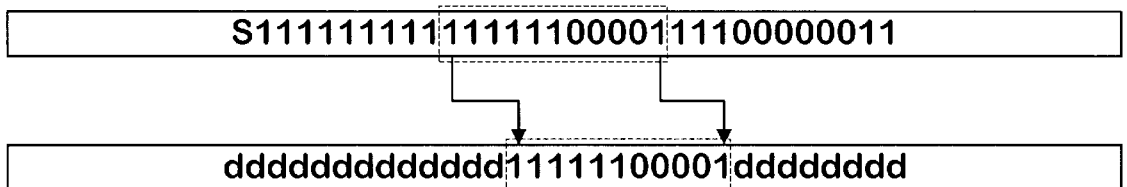

FIG. 64 is a memory map illustrating the effect of a third example arithmetic shift right bit manipulation performed with 32 bit precision on a Dword data type input by a bit manipulation unit according to one embodiment of the present invention.

Figure 65:
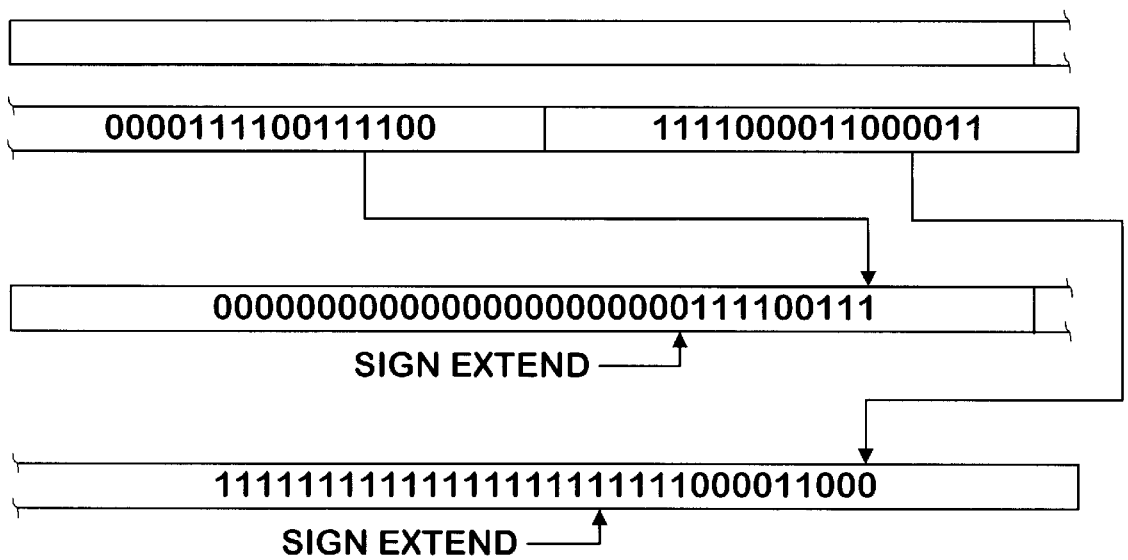

FIG. 65 is a memory map illustrating the effect of a first example arithmetic shift right bit manipulation performed with 32 bit precision on a Word data type input by a bit manipulation unit according to one embodiment of the present invention.

Figure 66:
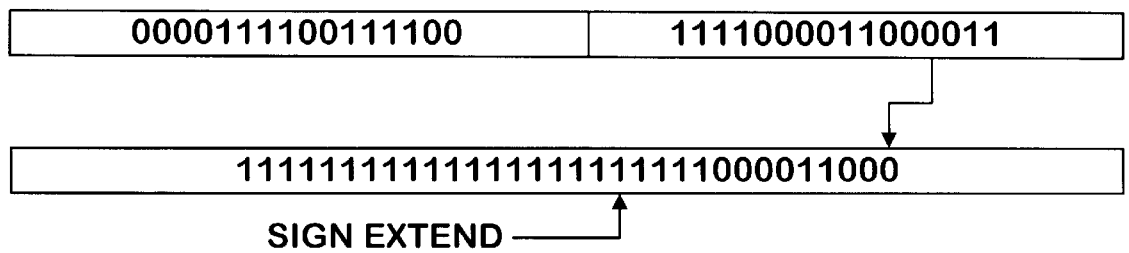

FIG. 66 is a memory map illustrating the effect of a second example arithmetic shift right bit manipulation performed with 32 bit precision on a Word data type input by a bit manipulation unit according to one embodiment of the present invention.

Figure 67:
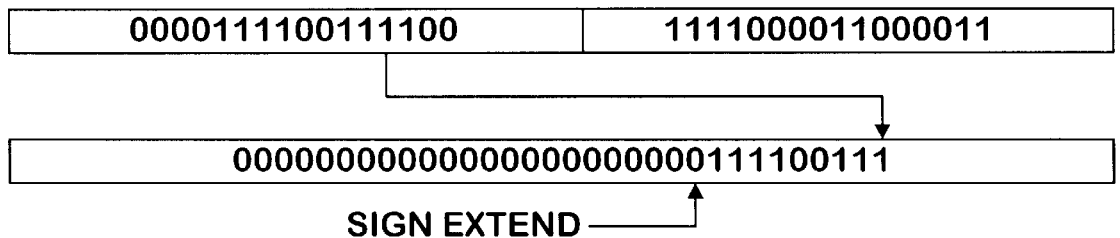

FIG. 67 is a memory map illustrating the effect of a third example arithmetic shift right bit manipulation performed with 32 bit precision on a Word data type input by a bit manipulation unit according to one embodiment of the present invention.

Figure 68:
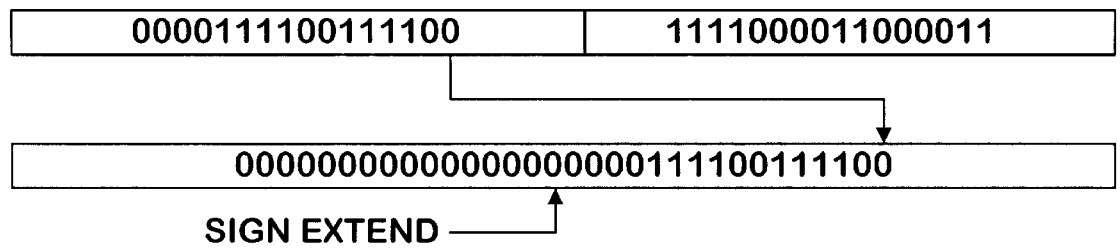

FIG. 68 is a memory map illustrating the effect of a fourth example arithmetic shift right bit manipulation performed with 32 bit precision on a Word data type input by a bit manipulation unit according to one embodiment of the present invention.

Figure 69:
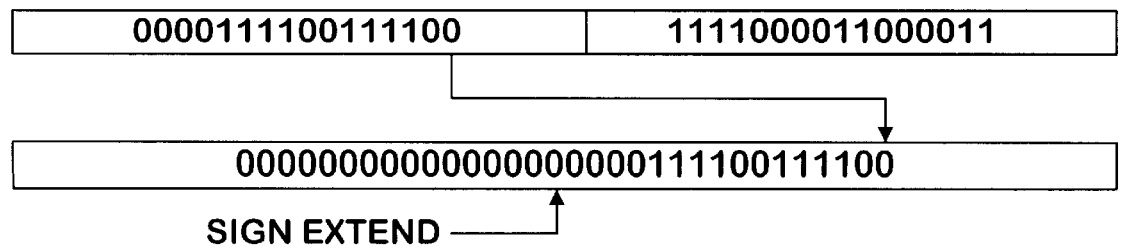

FIG. 69 is a memory map illustrating the effect of a fifth example arithmetic shift right bit manipulation performed with 32 bit precision on a Word data type input by a bit manipulation unit according to one embodiment of the present invention.

Figure 70:
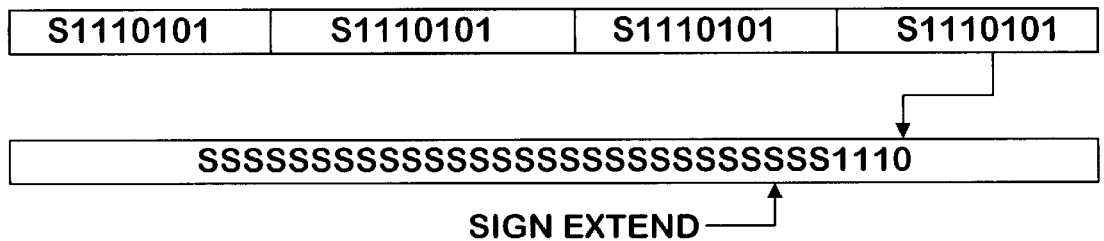

FIG. 70 is a memory map illustrating the effect of a first example arithmetic shift right bit manipulation performed with 32 bit precision on a Byte data type input by a bit manipulation unit according to one embodiment of the present invention.

Figure 71:
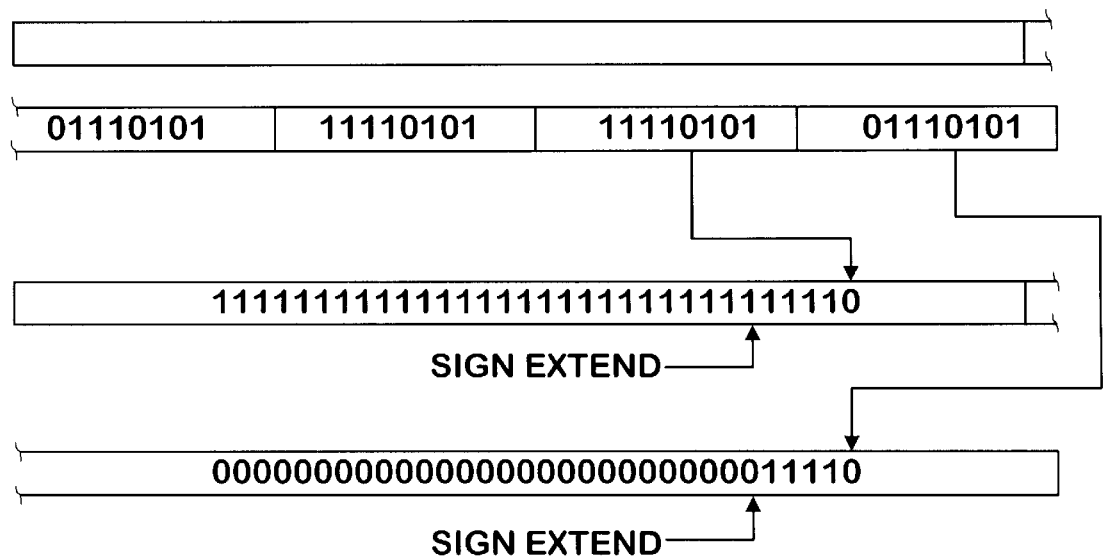

FIG. 71 is a memory map illustrating the effect of a second example arithmetic shift right bit manipulation performed with 32 bit precision on a Byte data type input by a bit manipulation unit according to one embodiment of the present invention.

Figure 72:
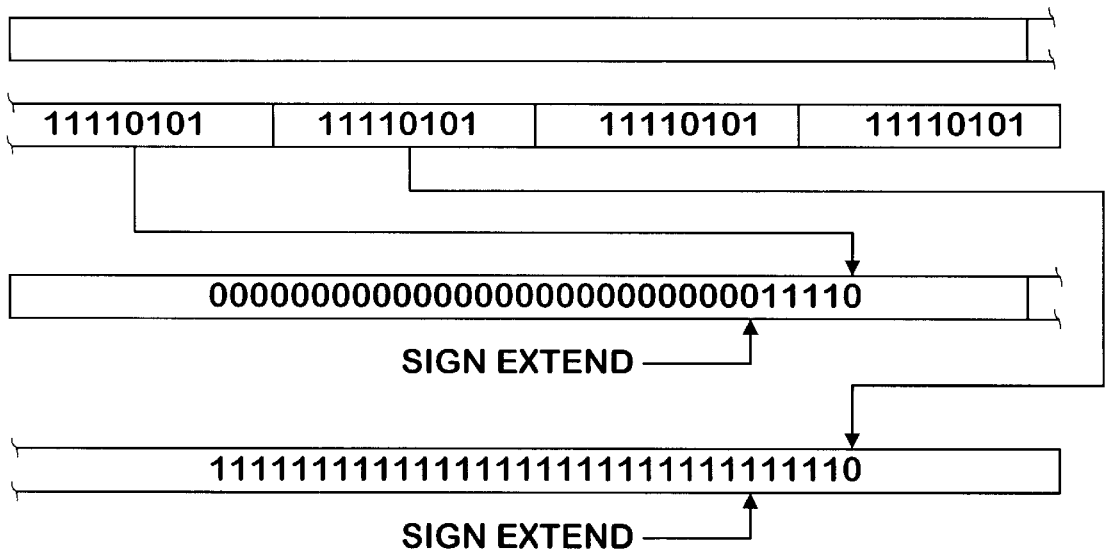

FIG. 72 is a memory map illustrating the effect of a third example arithmetic shift right bit manipulation performed with 32 bit precision on a Byte data type input by a bit manipulation unit according to one embodiment of the present invention.

Figure 73:
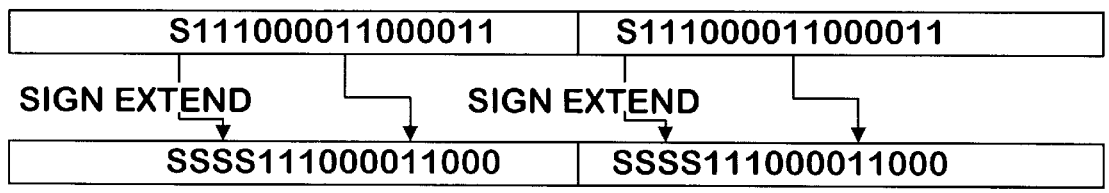

FIG. 73 is a memory map illustrating the effect of a first example arithmetic shift right bit manipulation performed with 16 bit precision SIMD on a Word data type input by a bit manipulation unit according to one embodiment of the present invention.

Figure 74:
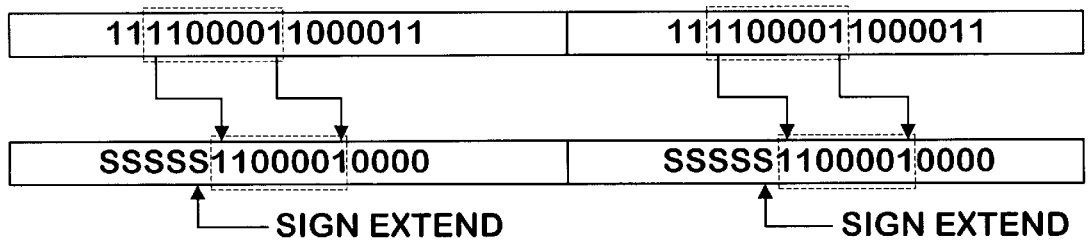

FIG. 74 is a memory map illustrating the effect of a second example arithmetic shift right bit manipulation performed with 16 bit precision SIMD on a Word data type input by a bit manipulation unit according to one embodiment of the present invention.

Figure 75:
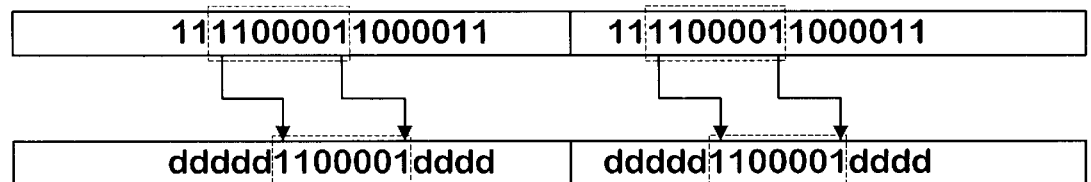

FIG. 75 is a memory map illustrating the effect of a third example arithmetic shift right bit manipulation performed with 16 bit precision SIMD on a Word data type input by a bit manipulation unit according to one embodiment of the present invention.

Figure 76:
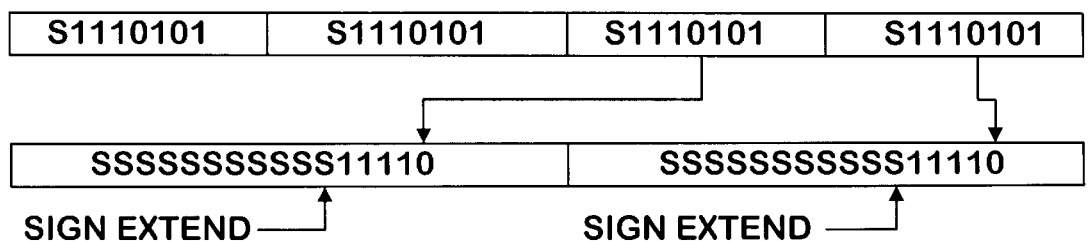

FIG. 76 is a memory map illustrating the effect of a first example arithmetic shift right bit manipulation performed with 16 bit precision SIMD on a Byte data type input by a bit manipulation unit according to one embodiment of the present invention.

Figure 77:
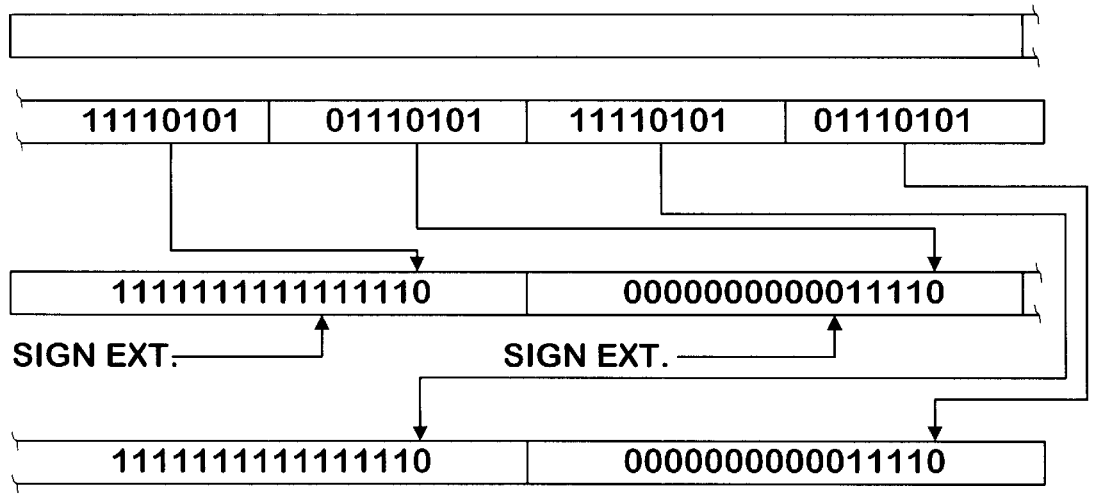

FIG. 77 is a memory map illustrating the effect of a second example arithmetic shift right bit manipulation performed with 16 bit precision SIMD on a Byte data type input by a bit manipulation unit according to one embodiment of the present invention.

Figure 78:
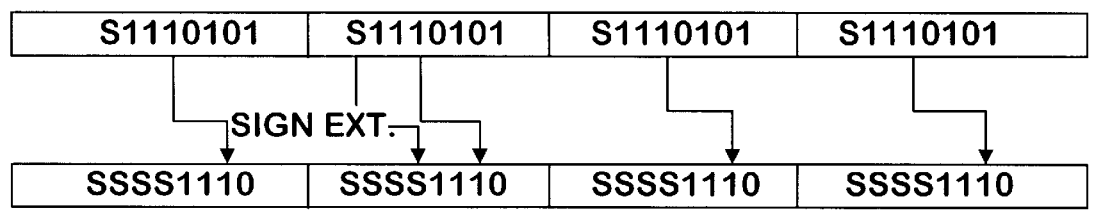

FIG. 78 is a memory map illustrating the effect of a first example arithmetic shift right bit manipulation performed with 8 bit precision SIMD on a Byte data type input by a bit manipulation unit according to one embodiment of the present invention.

Figure 79:
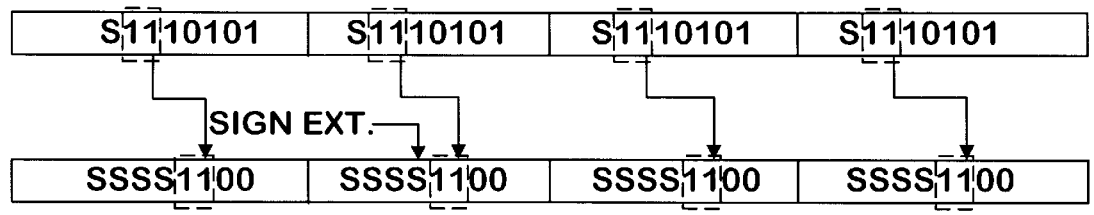

FIG. 79 is a memory map illustrating the effect of a second example arithmetic shift right bit manipulation performed with 8 bit precision SIMD on a Byte data type input by a bit manipulation unit according to one embodiment of the present invention.

Figure 80:
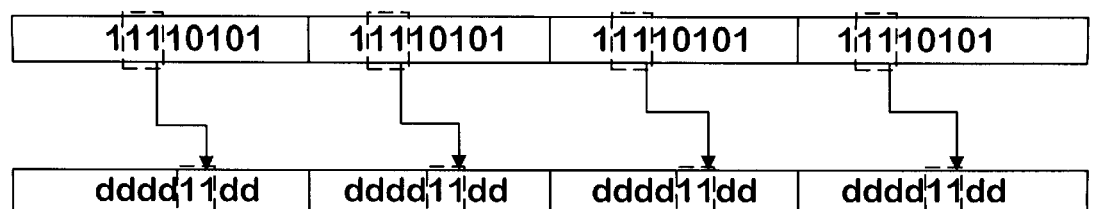

FIG. 80 is a memory map illustrating the effect of a third example arithmetic shift right bit manipulation performed with 8 bit precision SIMD on a Byte data type input by a bit manipulation unit according to one embodiment of the present invention.

Figure 81:
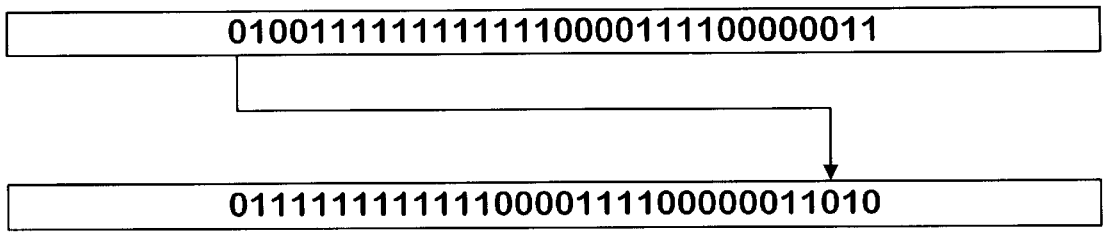

FIG. 81 is a memory map illustrating the effect of an example arithmetic/logical rotate left bit manipulation performed with 32 bit precision on a Dword data type input by a bit manipulation unit according to one embodiment of the present invention.

Figure 82:
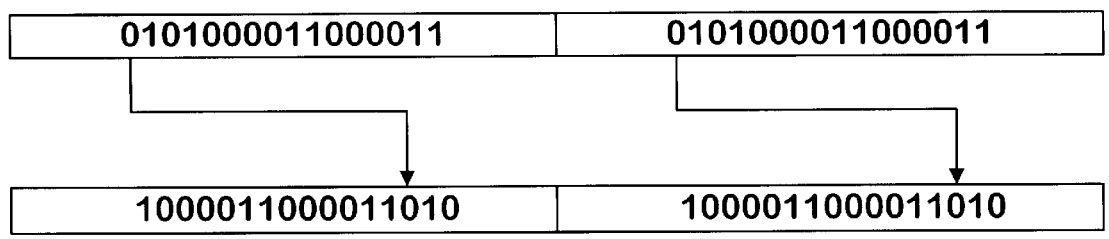

FIG. 82 is a memory map illustrating the effect of an example arithmetic/logical rotate left bit manipulation performed with 16 bit precision SIMD on a Word data type input by a bit manipulation unit according to one embodiment of the present invention.

Figure 83:
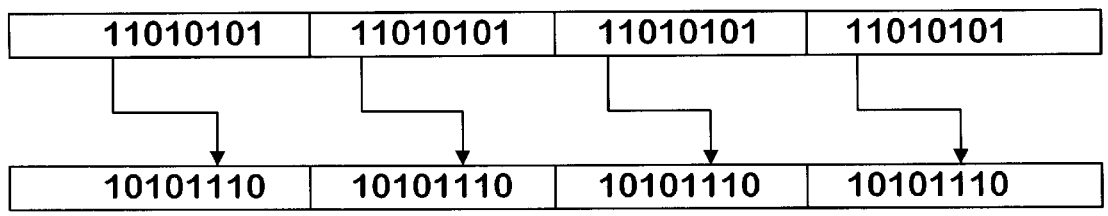

FIG. 83 is a memory map illustrating the effect of an example arithmetic/logical rotate left bit manipulation performed with 8 bit precision SIWD on a Byte data type input by a bit manipulation unit according to one embodiment of the present invention.

Figure 84:
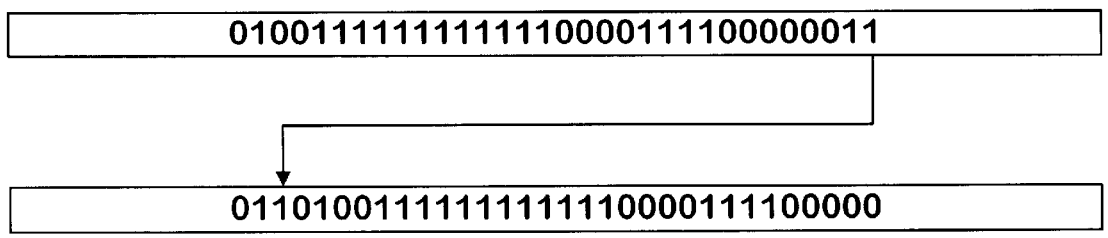

FIG. 84 is a memory map illustrating the effect of an example arithmetic/logical rotate right bit manipulation performed with 32 bit precision on a Dword data type input by a bit manipulation unit according to one embodiment of the present invention.

Figure 85:
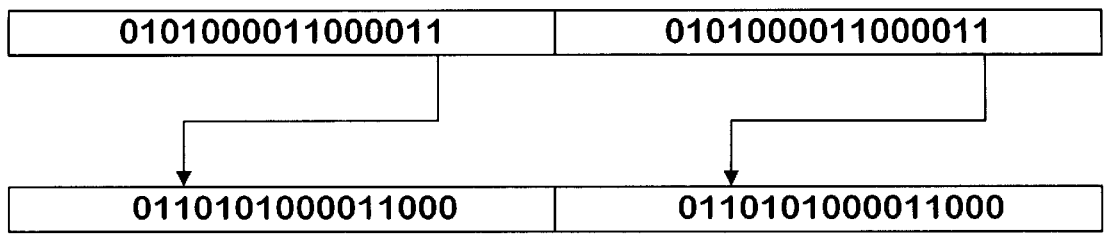

FIG. 85 is a memory map illustrating the effect of an example arithmetic/logical rotate right bit manipulation performed with 16 bit precision SIMD on a Word data type input by a bit manipulation unit according to one embodiment of the present invention.

Figure 86:
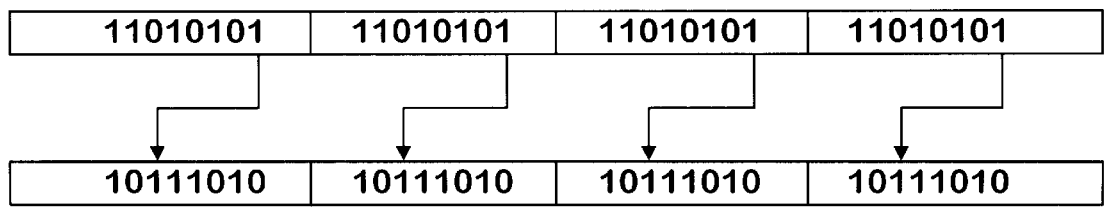

FIG. 86 is a memory map illustrating the effect of an example arithmetic/logical rotate right bit manipulation performed with 8 bit precision SIMD on a Byte data type input by a bit manipulation unit according to one embodiment of the present invention.

Figure 87:
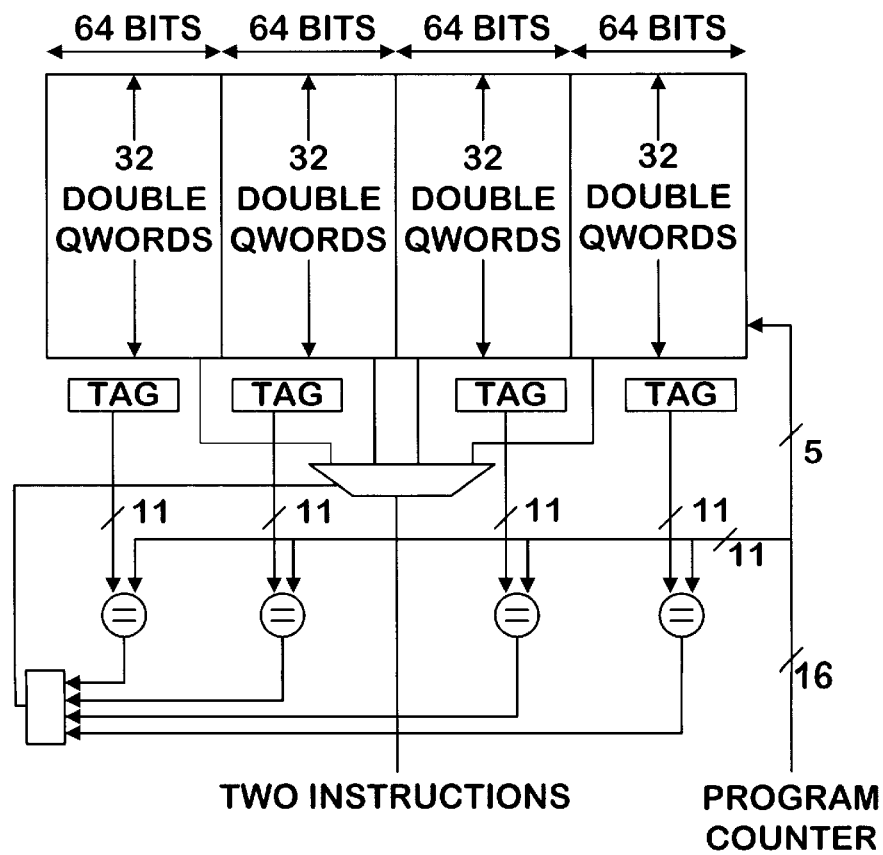

FIG. 87 is a block schematic diagram of an instruction cache according to one embodiment of the present invention.

Figures 88, 89A:
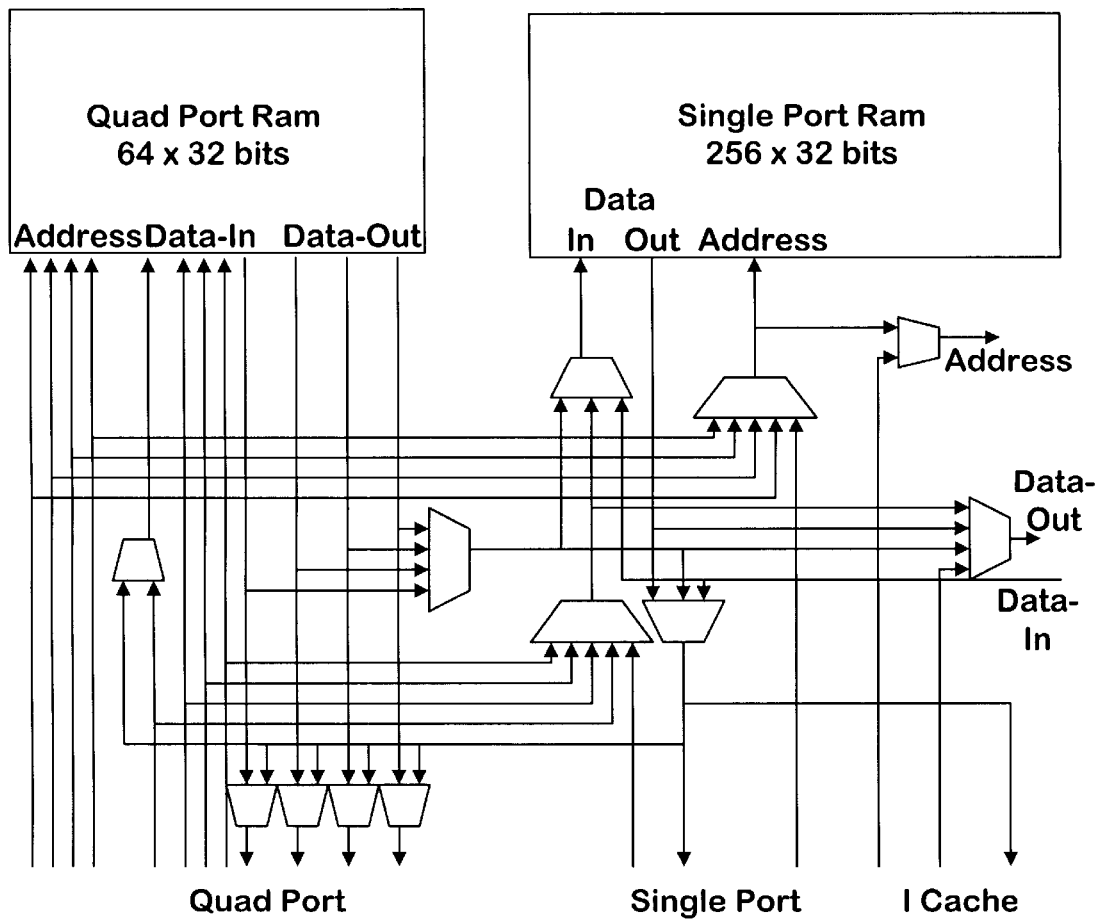

FIG. 88 is a block schematic diagram of a data memory according to one embodiment of the present invention.

FIG. 89, made by concatenating FIGS. 89A and 89B is a block diagram of a processor status word according to one embodiment of the present invention.

FIG. 90 is a block diagram of an extended processor status word according to one embodiment of the present invention.

FIG. 91, made by concatenating FIGS. 91A, 91B and 91C is a block schematic diagram of an interrupt register according to one embodiment of the present invention.

FIG. 92 is a block schematic diagram of a program counter according to one embodiment of the present invention.

FIG. 93 is a block schematic diagram of a stack pointer according to one embodiment of the present invention.

FIG. 94 is a block schematic diagram of a link register according to one embodiment of the present invention.

FIG. 95 is a block schematic diagram of a representative memory pointer, with bits 29–24 reserved, according to one embodiment of the present invention.

Figures 96, 97A:
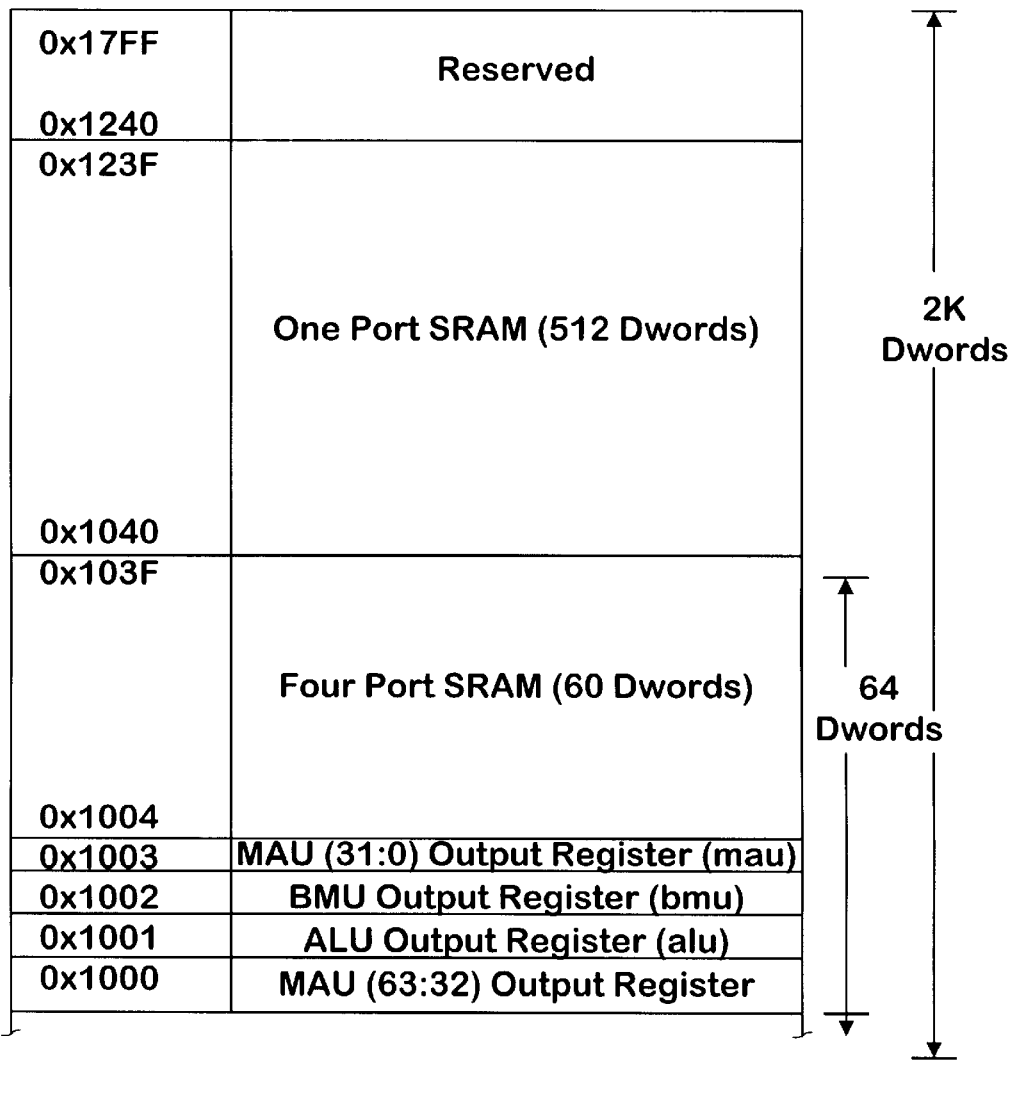

FIG. 96 is a block schematic diagram of a representative index register according to one embodiment of the present invention.

FIGS. 97A–97D are a block diagram of an MPU memory map according to one embodiment of the present invention.

FIGS. 98–100 (FIG. 100 is made of FIGS. 100A–100E) are block diagrams of computational instructions in three, two and one operation mode according to one embodiment of the present invention.

FIG. 101 (made of FIGS. 101A–101C) is a block diagram of a dictionary encoding for an MAU dictionary according to one embodiment of the present invention.

FIG. 102 (made of FIGS. 102A–102B) is a block diagram of a dictionary encoding for an ALU dictionary according to one embodiment of the present invention.

FIG. 103 is a block diagram of a dictionary encoding for a BMU dictionary according to one embodiment of the present invention.

FIG. 104 is a block diagram of a dictionary encoding for a BMU dictionary for the 8 bit SIMD mode according to one embodiment of the present invention.

FIG. 105 is a block diagram of a dictionary encoding for a BMU dictionary for the 16 bit SIMD mode according to one embodiment of the present invention.

FIG. 106 (made of FIGS. 106A–106C) is a block diagram of a dictionary encoding for a routing dictionary according to one embodiment of the present invention.

FIG. 107 is a block schematic diagram of a DMA source byte address register according to one embodiment of the present invention.

FIG. 108 is a block schematic diagram of a DMA destination byte address register according to one embodiment of the present invention.

FIG. 109 is a block schematic diagram of a DMA transfer size register according to one embodiment of the present invention.

FIG. 110 is a block schematic diagram of a DMA source and destination 2-D warp factor register according to one embodiment of the present invention.

FIG. 111 (made of FIGS. 111A–111B) is a block schematic diagram of a DMA command register according to one embodiment of the present invention.

FIG. 112 is a block schematic diagram of a memory map for the registers of FIGS. 107–111 according to one embodiment of the present invention.

FIG. 113 (made of FIGS. 113A–113B) is a block schematic diagram of a timer status and control register according to one embodiment of the present invention.

FIG. 114 is a block schematic diagram of a representative one of four timer period/scale register according to one embodiment of the present invention.

FIG. 115 is a block schematic diagram of a representative one of four timer counters according to one embodiment of the present invention.

FIG. 116 is a block schematic diagram of a memory map for the registers and counters of FIGS. 113–115 according to one embodiment of the present invention.

DETAILED DESCRIPTION

1. Unified Media Processor Architecture

1.1 Overview

The heart of the Unified Media Processor architecture consists of 8 Media Processing Units or MPU's. Each of these units is capable of executing one complex 32 bit media instruction per clock cycle. A complex media instruction may consist of three concurrent 32 bit arithmetic or logical operations in parallel with up to four memory accesses along with two memory address computations. All the Media Processing Units have a 32 bit data path. These data paths can be split into multiple 8 or 16 bit data paths working in a SIMD mode of operation. Each complex media instruction is comparable to multiple simple DSP like instructions.

Each MPU has a 32 bit Multiplier fused with a 32 bit Arithmetic Unit that can accumulate up to 64 bits (the MAU), a 32 bit Arithmetic Logic Unit (the ALU), and a 32 bit Bit Manipulation Unit with a 32 bit Barrel Shifter (the BMU). These three units working together can implement pipelined 32 bit Single Precision IEEE Floating Point Multiplies, Adds and Divides, providing a raw floating point performance for the UMP of 2.0 GFLOPS. This greatly enhances the capability of the UMP for implementing complex modem, audio and 3-D applications. This architecture can deliver 800 32 bit pipelined multiply-accumulates per second with a two clock latency.

The key element behind the architecture of the UMP is one of re-configurability and re-usability. Therefore, each MPU is made up of very high speed core elements that on a pipelined basis can be configured to form a more complex function. This leads to a lower gate count, thereby giving a smaller die size and ultimately a lower cost.

Since each of the MPU's are virtually identical to each other, writing software becomes very easy. The RISC-like nature of each of these Media Processors also allows for a consistent hardware platform for simple OS and driver development. Any one of the MPU's can take on a supervisory role and act as a central controller if necessary. This can be very useful in Set Top application's where a Controlling CPU may not be necessary, further reducing system cost.

All communication on chip is memory based, ie, all the processing units (MPUs, Video interface, etc) lie on a 64 MB memory map and communication between these units and the units and local memory is through simple memory reads and writes. Here a processing unit refers to the MPU's as well as all the peripheral controllers. These peripheral controllers consist of the PCI interface, Video capture interface, Audio Codec and Telecommunications interface and the Video Display interfaces. Therefore, besides there being DMA pathways for all these peripheral interfaces, there also exists "through processor" pathways for all input and output media data. This allows for pre and post-processing of all data types going into and coming out of memory, thereby greatly reducing memory bandwidth. This processing can be done "on the fly" because of the very high speed at which each of the MPU's operate.

Operation of the MPU's can be interrupted by the various peripheral interface units. This allows for "object oriented" media types to be implemented. Memory fill/empty level trigger points can be set up for the various peripheral interfaces which interrupt particular MPU's that can then service these interrupts "on the fly".

1.2 Block Diagram

Figure 1:
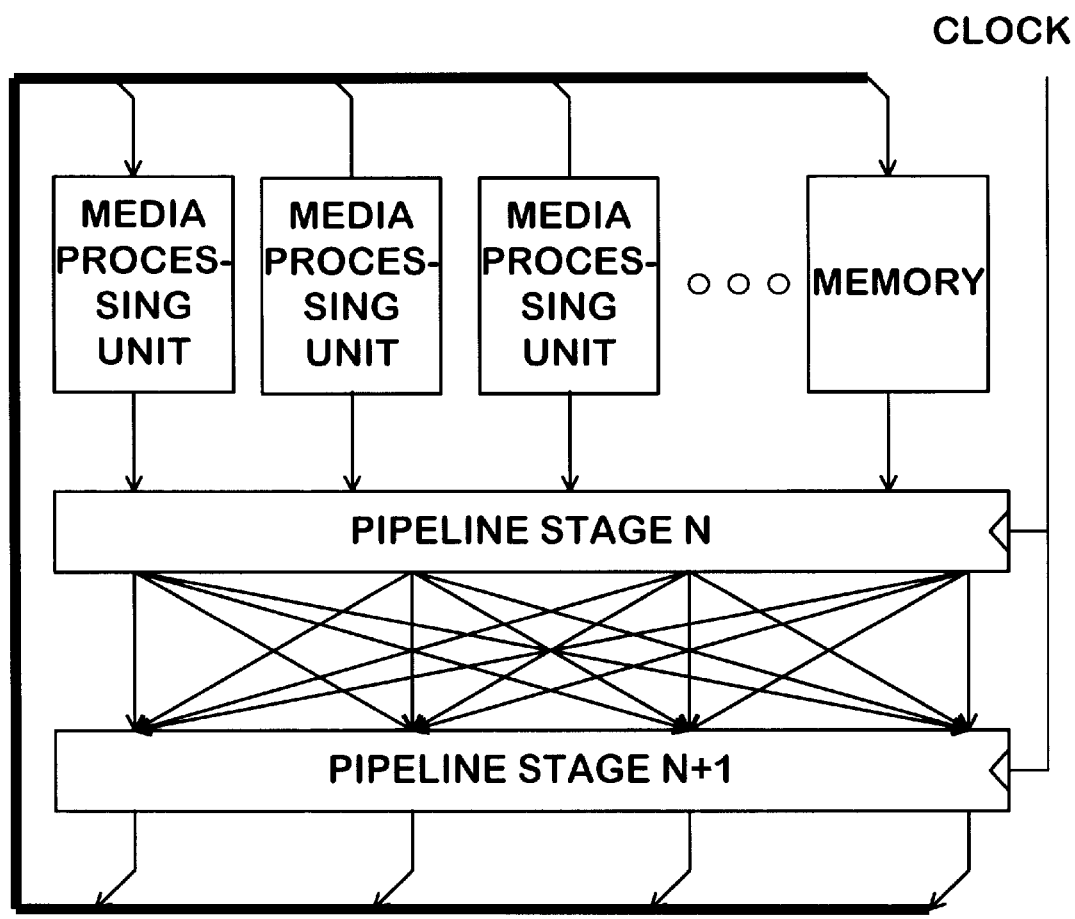
FIG. 1 is a block schematic diagram of an integrated circuit containing a plurality of media processing units according to one embodiment of the present invention.
Figure 2:
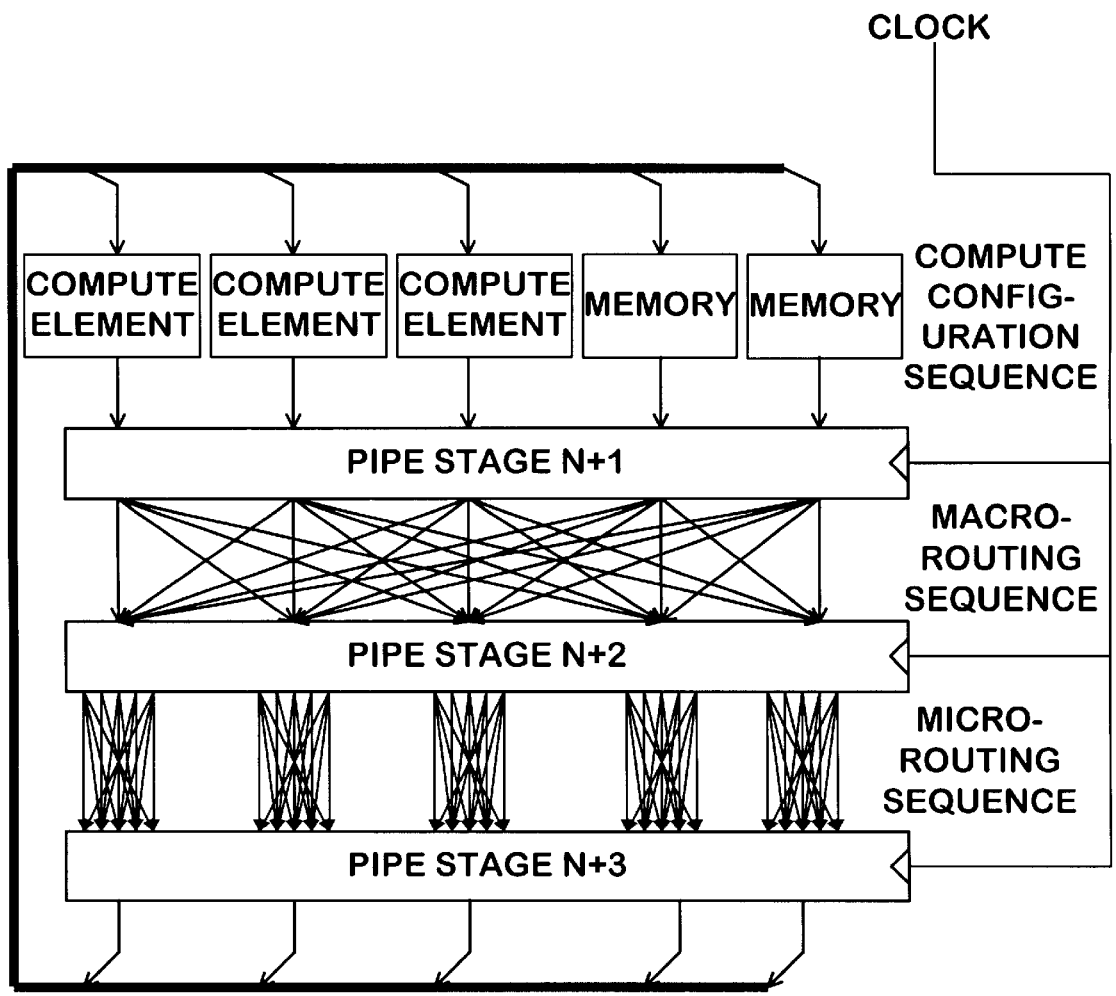
FIG. 2 is a block schematic diagram of memory blocks and computational units of the integrated circuit of FIG. 1.
Figure 3:
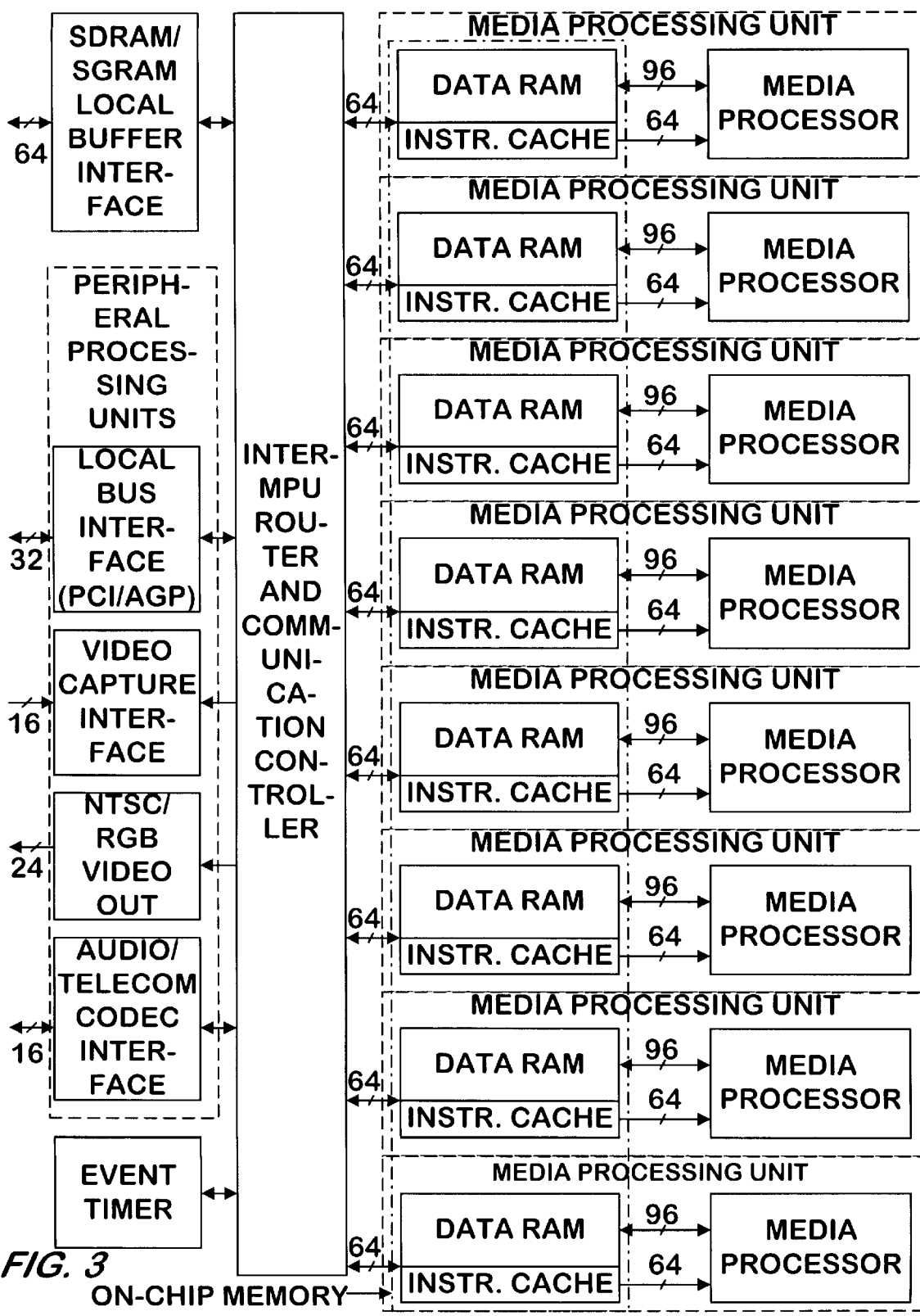
FIG. 3 is a block schematic diagram of a system according to one embodiment of the present invention.

The block diagram of the system is shown in FIG. 3.

1.3 Memory Organization

The Unified Media Processor occupies a 64 MByte memory space. This memory space includes memory-mapped I/O space, external local buffer memory, internal (on-chip) memory, internal registers, including user programmable and configuration registers, timer ports, interrupt ports, etc. Basically, all accessible data and control ports are memory mapped and directly addressable.

All internal resources can access a 4 GByte address space. All accesses are made on a Quad-word (4 bytes) boundary. Depending upon the resource these accesses may involve a direct address pointer or a shared segment pointer. For example, direct branches in the MPU code must be made within a 64 Kword page. Branches to another page must be made by setting the most significant 14 bits of the program counter. Similarily, data accesses outside a 64 Kword page must be made by first setting the most significant 14 bits of the memory pointers. All internal memory, registers, ports, etc. are mapped into a 64 Kword page. MPU and PIU memory areas are mapped into the 64 Mbyte UMP memory space through special segment pointers that reside in the MMU. These pointers are also memory mapped. In the first implementation of the UMP, these pointers will be hard-wired to fixed locations. These locations are specified in the global memory map defined in the next section. It is however advisable, that all software written for the UMP read these pointers and use the values returned, so as to be compatible with future generations of UMPs which might have a fully programmable implementation. The segment pointers themselves have hard addresses.

1.3.1 Code and Data Space

The UMP architecture has a shared program memory and data memory space. It is up to the loader and the resource manager to set the code and data segments up appropriately.

1.3.2 Global Memory Map

The global memory map defines the location of the various MPUs, PIUs, configuration registers, etc within the 64 Mbyte UMP memory space. This memory map only specifies the memory spaces for the various segments and processing units. The detailed map of each of these units is specified in the memory map sections of the description of the units themselves.

Figure 4B:
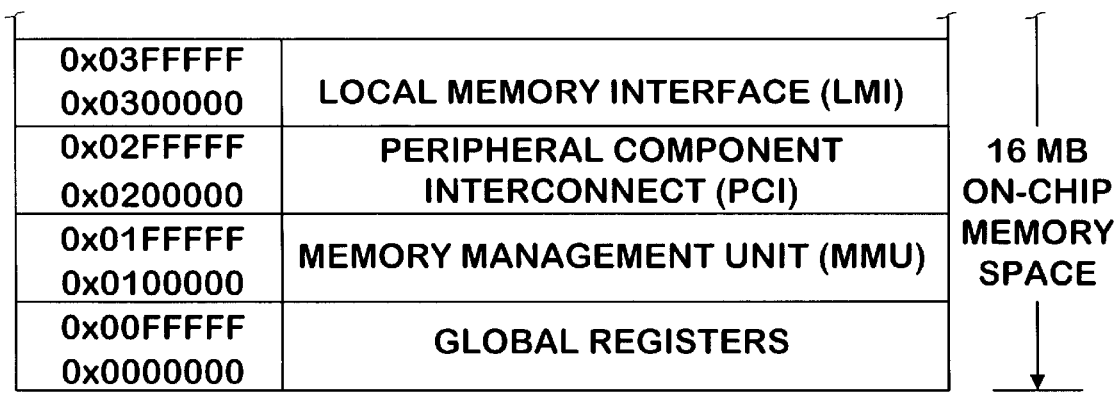
FIG. 4, a concatenation of FIGS. 4A and 4B is a memory map illustrating the arrangement of a memory space according to one embodiment of the present invention.
FIG. 4C is a memory map illustrating the arrangement of an MPU address/transfer word according to one embodiment of the present invention.
Figure 4:
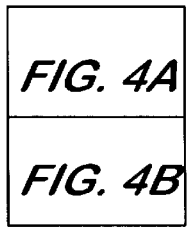

See FIG. 4.

1.4 Intra-UMP Communication

Intra-UMP communication and data transfer is achieved over a four lane 64 bit two-way communication highway which is arbitrated by the MMU. Pipelined data transfer takes place at the execution clock rate of the individual processors, with one 64 bit Qword being transferred every clock cycle per lane. Each lane is independent of the other and all four lanes transfer data in parallel, with each lane transferring data between mutually exclusive independent source and destination locations. Since all resources are memory mapped, be they external or internal, the type of data transfer is decided by the address of the access request. If the address specifies an internal resource, then any available lane is used for the resource. Multiple internal accesses are arbitrated by the MMU using round robin and priority schemes, just as in external memory accesses. At 133 MHz operation, the total bandwidth of the internal communication highway is 4.3 Gbytes/sec. Remember that intra-UMP communication runs concurrently with external local memory data transfers.

1.4.1 Block Communication Specification

Internal data transfer over the afore mentioned highways is geared towards "block burst" transfers. The internal communication protocol sends both address and data over the same 32 bit lanes. In the case of a write, the address is followed by the data, whereas, in the case of a read, the address goes over the output lane, while the data comes in over the input lane. The block that initiates the data transfer (master) sends the address of the burst to the MMU. The MMU then routes this address and subsequent data over to the addressed segment (target) in UMP memory space (which could be the external local memory, internal registers or some MPU memory). This routing by the MMU is done according to the rules of lane availability, priority and access privilege. Once the address is sent to the target, it is the targets responsibility to generate the rest of the addresses in the burst while addressing its own memory space during the data transfer.

All communication between blocks is at the system clock rate (133 MHz in the first implementation). There are two other signals besides the 64 bit data/address lanes that are used in the communication protocol. Each input or output lane has associated with it these two signals. Therefore, each block (memory segment) would have associated with it an incoming and an outgoing version of these signals. These signals are:

1. REQ—The request signal is used by the master (through assertion) to indicate the start of a transfer cycle and indicates that address and other transfer information is on the lane, ie, the transfer is in the address phase. When it is deasserted following a write transfer, the information on the lane is data. It has to remain deasserted all through a write transfer. Assertion of the signal at any time indicates the start of a new transfer cycle. REQ is deasserted only after the receipt of the RDY signal. If REQ is deasserted before the receipt of RDY than it means that the transfer has been aborted by the master. Once a burst transfer is in progress it cannot be aborted and goes to completion. The hardware guarantees completion.

2. RDY—This signal throttles the data transfer on both ends. During a write, the target returns the RDY to indicate whether the data in the current clock has been successfully written or not. The target can introduce wait states by deasserting this signal. The master must then hold the current data until the RDY is reasserted. During a read, the master can introduce wait states that indicate to the target that the data must be held until the master is ready to receive more data.

Tip. Since single transfer writes take two clock cycles to complete (only the output lane is used for the transfer), its better to perform a read where possible instead of a write. A read can conceptually (depending on what its trying to read) complete within one clock cycle (both the input and output lanes are used).

The format of an MPU address/transfer word is shown below.

Figures 4C, 5:
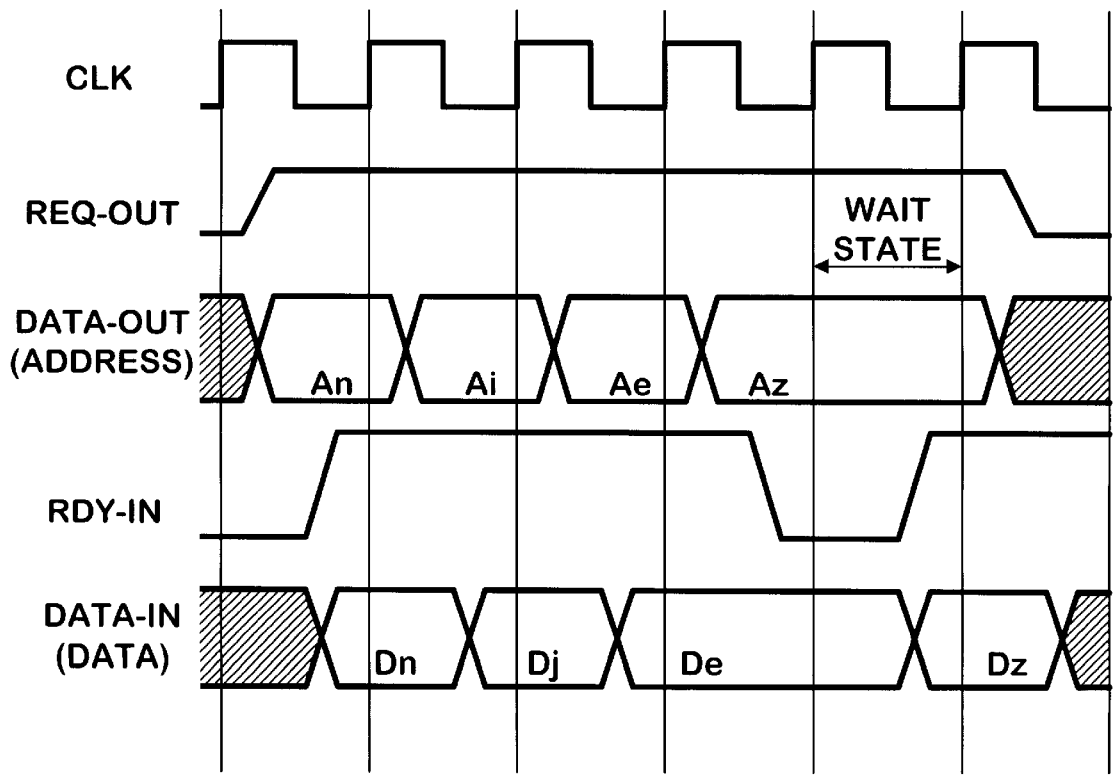
FIG. 5 is a timing diagram illustrating timing of a non burst read according to one embodiment of the present invention.

See FIG. 4C.

1.4.1.1 Non-Burst Read

See FIG. 5.

Here an address is put out on the 32 bit outgoing data bus on every transfer cycle. A new address or request is indicated by asserting REQ high. Read data is available on the 32 bit input data bus. The master clocks in the input data on the rising edge of CLK and when RDY is high. RDY being low indicates a target that has inserted a wait state. The address is held steady until RDY is reasserted high, at which time the data can be latched in.

1.4.1.2 Burst Read

Figure 6:
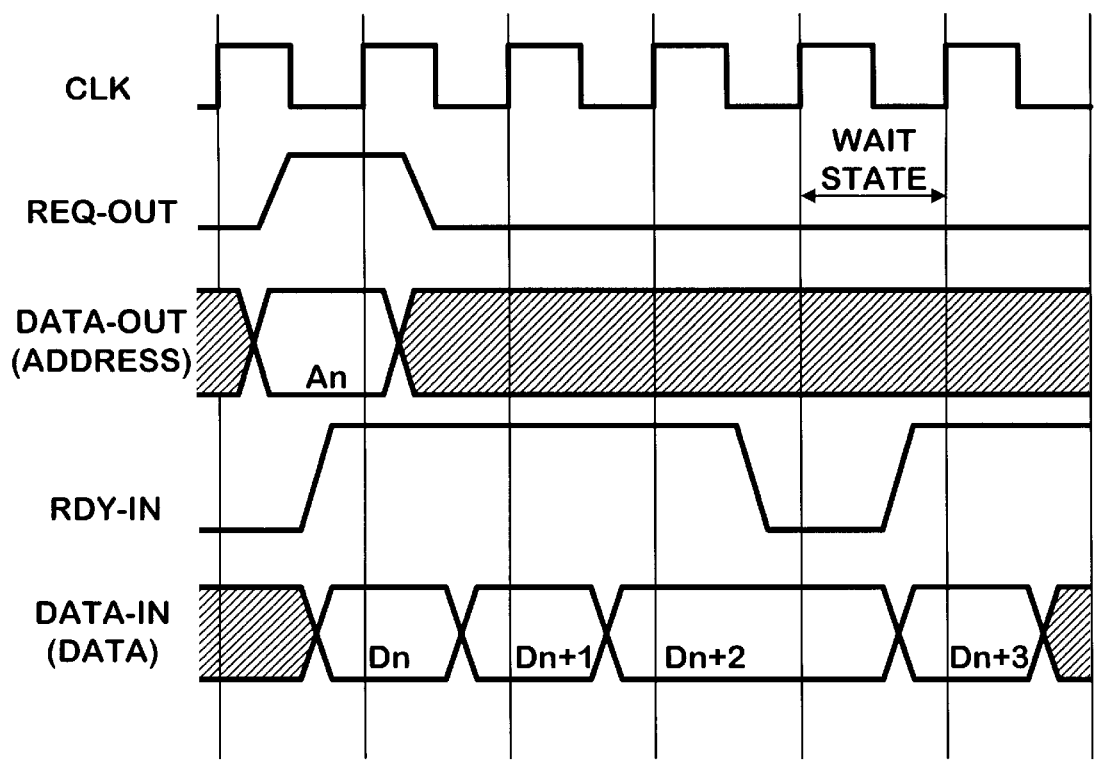
FIG. 6 is a timing diagram illustrating timing of a burst read according to one embodiment of the present invention.

See FIG. 6.

In a burst read, the starting address is all that is required. The burst count, and the direction of transfer is included in the address/transfer word.

1.4.1.3 Non-Burst Write

Figure 7:
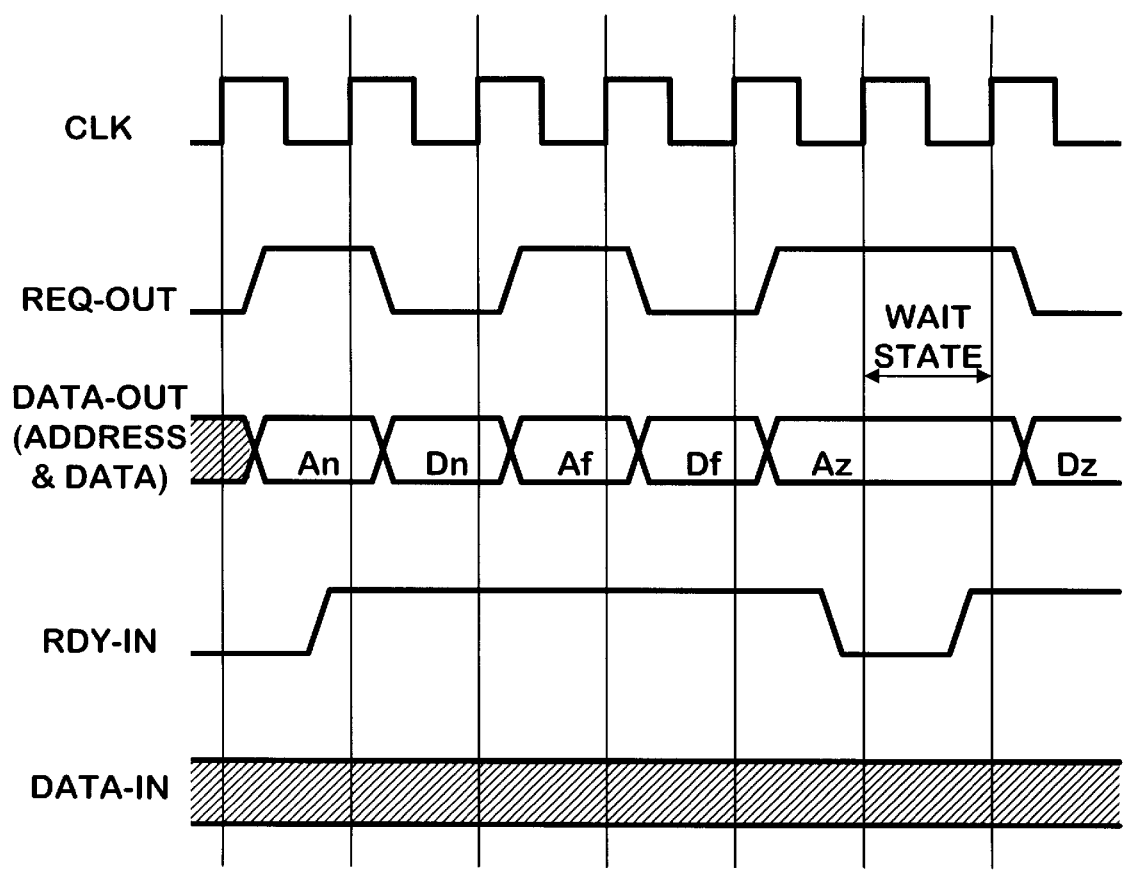
FIG. 7 is a timing diagram illustrating timing of a non burst write according to one embodiment of the present invention.

See FIG. 7.

1.4.1.4 Burst Write

Figure 8:
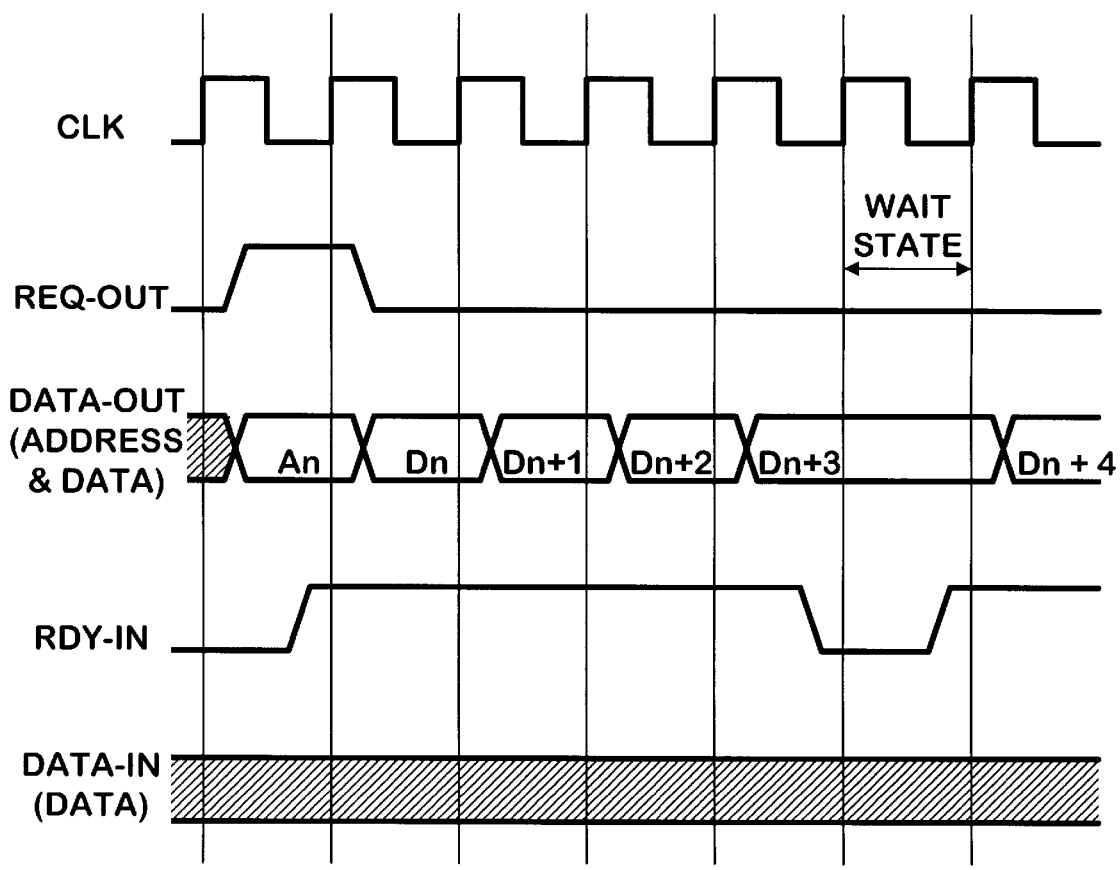
FIG. 8 is a timing diagram illustrating timing of a burst write according to one embodiment of the present invention.

See FIG. 8.

1.5 Start-Up Sequencing (Bootstrapping)

On reset, only MPU0 is awake and makes a program counter access to its internal program cache. It makes an access to location 0x03800000 (location of ROM). All other MPUs are asleep on reset. Bit 13 in the processor status word determines if an MPU is asleep or not. In the sleep state all sequencing and processor operations are stopped. MPU0 is the only MPU whose sleep bit after reset is a 1, all others are 0.

The instruction caches all come up invalidated after reset.

2. Media Processing Units 2.1 Architecture

Each MPU has a 32 bit Multiplier with a separately accessible 64 bit arithmetic unit (for the carry-propagate addition) that allows accumulation up to 64 bits, a 32 bit ALU and a 32 bit Bit Manipulation Unit with a 32 bit Barrel Shifter with 64 bit input and 32 bit output. These three units working together can implement pipelined 32 bit Single Precision IEEE Standard 754 Floating Point Multiplies, Adds and Divides.

2.2 Execution Units 2.2.1 Multiplier Accumulator Unit (MAU)

The Multiplier Accumulator is essentially a pipelined Carry-Save 4:2 compressor tree based 32 bit signed/unsigned multiplier. The Carry-Save components are added by a 64 bit carry-select adder. The Multiplier has slots for adding rounding bits and for adding the lower 64 bits of the accumulators during a multiply-accumulate operation. The carry-save addition takes place in one clock cycle and the 64 bit carry propogate addition (using the carry-select adder) takes place in the next clock cycle. The least significant 32 bits of the carry-select adder can also perform a split or fused absolute value operation in one clock cycle. This feature is used in motion-estimation. The carry-select adder part of the multiplier can be operated stand-alone for simple arithmetic operations.

The multiplier can be configured in the following ways:
- One 32×32, signed two's complement or unsigned, integer multiply giving a 64 bit result.
- Two 16×16, signed two's complement or unsigned, integer, multiplies giving two 32 bit results.
- Four 8×8, signed two's complement or unsigned, integer, multiplies giving three 16 bit results.

The carry-select adder part can be configured to perform arithmetic operations on signed two's complement and unsigned numbers in the following ways:
- As a single 32 bit adder/subtractor.
- As two 16 bit adder/subtractors.
- As four 8 bit adder/subtractors.
- As a 64 bit accumulator during multiplies or 32 bit adds and subtracts.
- As two 32 bit adders for multiplies with accumulation up to 32 bits each.
- As four 16 bit adders for multiplies with accumulation up to 16 bits each.

2.2.2 Arithmetic Logic Unit (ALU)

The Arithmetic Logic Unit or ALU is a 32 bit Carry-Select adder that can also perform logical operations. Four carry bits out of 8 bit split operations (providing a 36 bit output) are provided so that no precision is lost when accumulating numbers. All operations take place in one clock cycle. The ALU can also perform a split or fused Absolute value operation and saturation in one clock cycle. This is very useful in video processing applications.

The Arithmetic Logic Unit can be configured to perform arithmetic operations on signed two's complement and unsigned numbers in the following ways:

As a single 32 bit adder/subtractor.
As two 16 bit adder/subtractors.
As four 8 bit adder/subtractors.

2.2.3 Bit Manipulation Unit (BMU)

The Bit Manipulation Unit or BMU consists of a 32 bit Barrel Shifter Array that can be split into four 8 bit sections or two 16 bit sections which can be shifted individually by specific amounts. By being able to split the shifter, one can expand compressed bit fields into byte aligned words or bytes. An example would be expanding a compressed 16 bit 5-6-5 RGB format into a 24 bit RGB format, all in one clock cycle. The BMU is made up of three blocks. The first block is a mux stage that "merges" the current 32 bit word with the next 32 bit word. This is useful for string traversing a long (greater than 32 bits) word without loosing any clock cycles. Example, in the case of an MPEG bit stream. The second block is the actual barrel shifter array, which consists of 5 binary shift stages. It is constructed so that it can only shift left and rotate left. Right rotates and shifts are performed by shifting left by 32 minus the shift amount. This reduces the amount of logic required to implement the barrel shifter and also makes it operate much faster. The third block is the "masking" block which is used for zero-fills, sign-extensions, bit field extraction, etc.

The Bit Manipulation Unit can perform the following functions:

Rotate left or right by 32 bits.
Arithmetic shift left or right by 32 bits.
Logical shift left or right by 32 bits.
Sign-extend from 8 to 16 bits.
Sign-extend form 16 to 32 bits.
Shift current word and merge with next word in one cycle.
Extract bit field from bit stream continuously.
Individual (split) left and right shifts on four bytes.
Individual (split) left and right shifts on two words.

Figure 9:
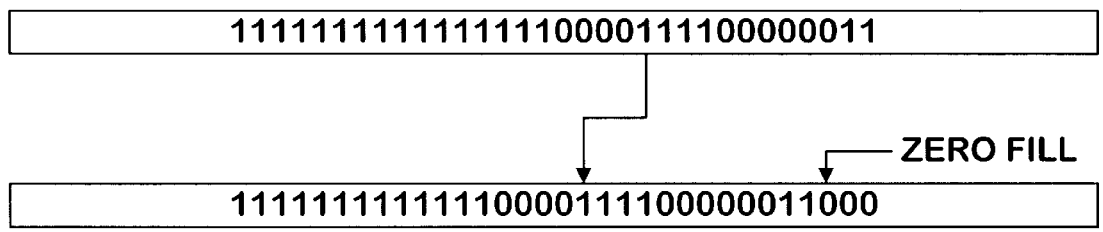
FIG. 9 is a memory map illustrating the effect of a first example shift left bit manipulation performed with 32 bit precision on a Dword data type input by a bit manipulation unit according to one embodiment of the present invention.
Figure 10:
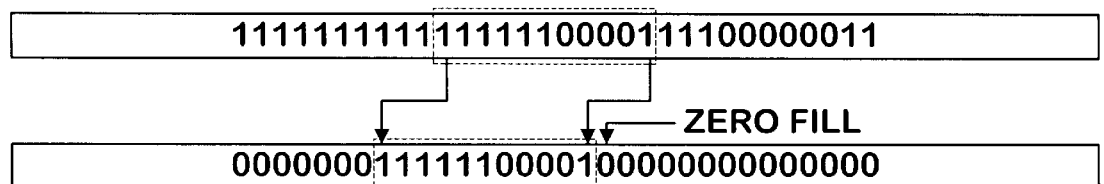
FIG. 10 is a memory map illustrating the effect of a second example logical shift left bit manipulation performed with 32 bit precision on a Dword data type input by a bit manipulation unit according to one embodiment of the present invention.
Figure 11:
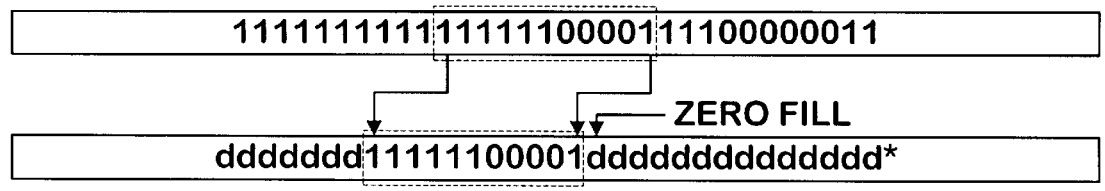
FIG. 11 is a memory map illustrating the effect of a third example logical shift left bit manipulation performed with 32 bit precision on a Dword data type input by a bit manipulation unit according to one embodiment of the present invention.
Figure 12:
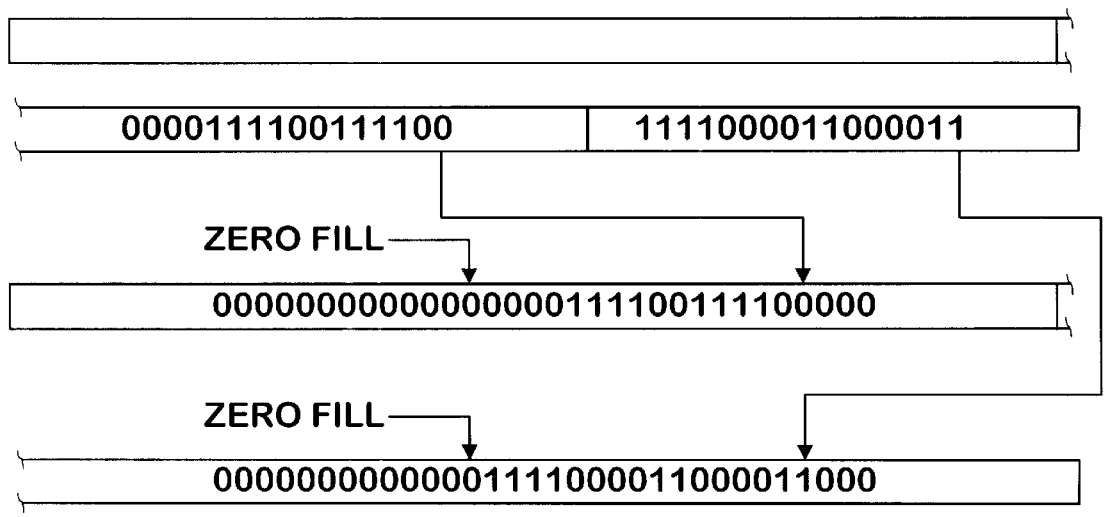
FIG. 12 is a memory map illustrating the effect of a first example logical shift left bit manipulation performed with 32 bit precision on a Word data type input by a bit manipulation unit according to one embodiment of the present invention.
Figure 13:
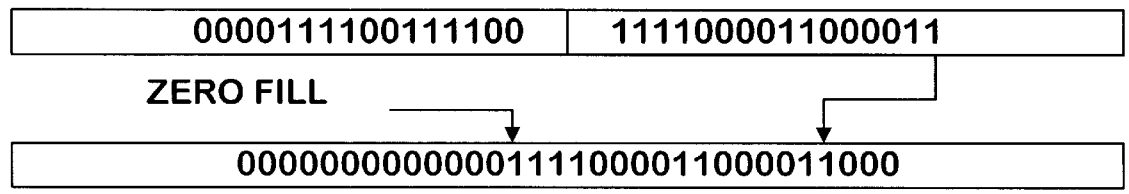
FIG. 13 is a memory map illustrating the effect of a second example logical shift left bit manipulation performed with 32 bit precision on a Word data type input by a bit manipulation unit according to one embodiment of the present invention.
Figure 14:
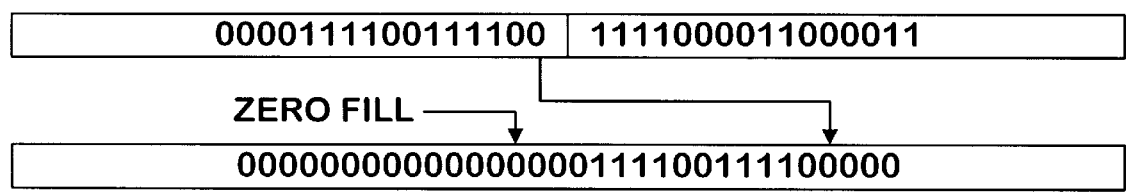
FIG. 14 is a memory map illustrating the effect of a third example logical shift left bit manipulation performed on a Word data type input by a bit manipulation unit according to one embodiment of the present invention.
Figure 15:
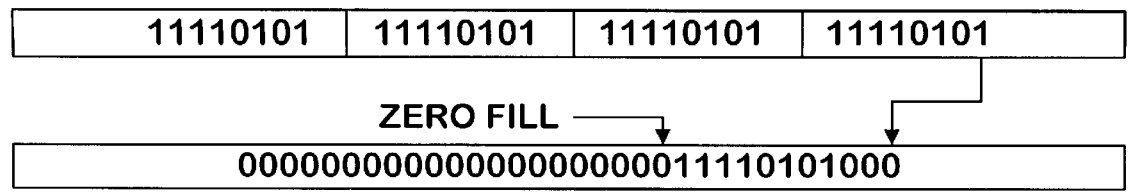
FIG. 15 is a memory map illustrating the effect of a first example logical shift left bit manipulation performed with 32 bit precision on a Byte data type input by a bit manipulation unit according to one embodiment of the present invention.
Figure 16:
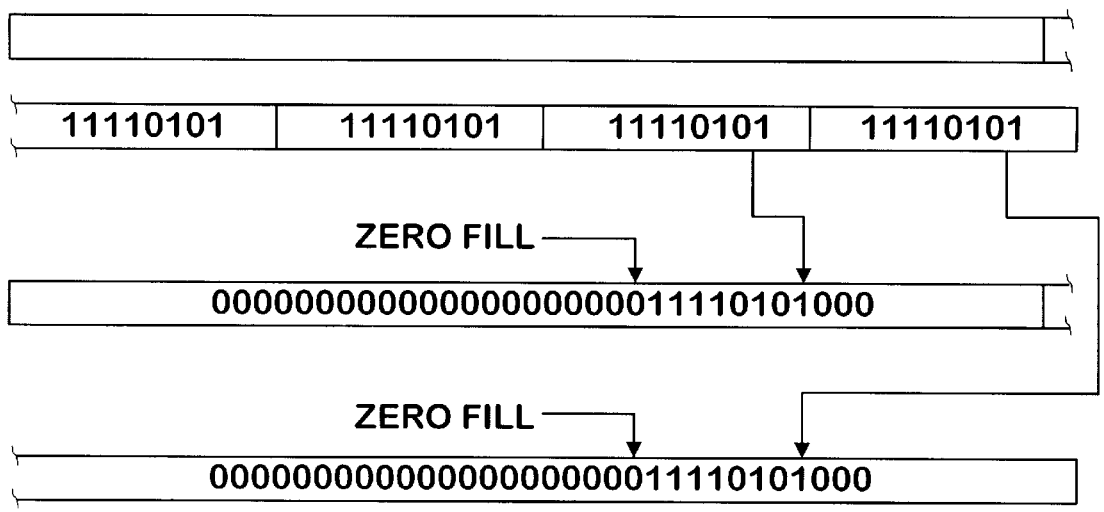
FIG. 16 is a memory map illustrating the effect of a second example logical shift left bit manipulation performed with 32 bit precision on a Byte data type input by a bit manipulation unit according to one embodiment of the present invention.
Figure 17:
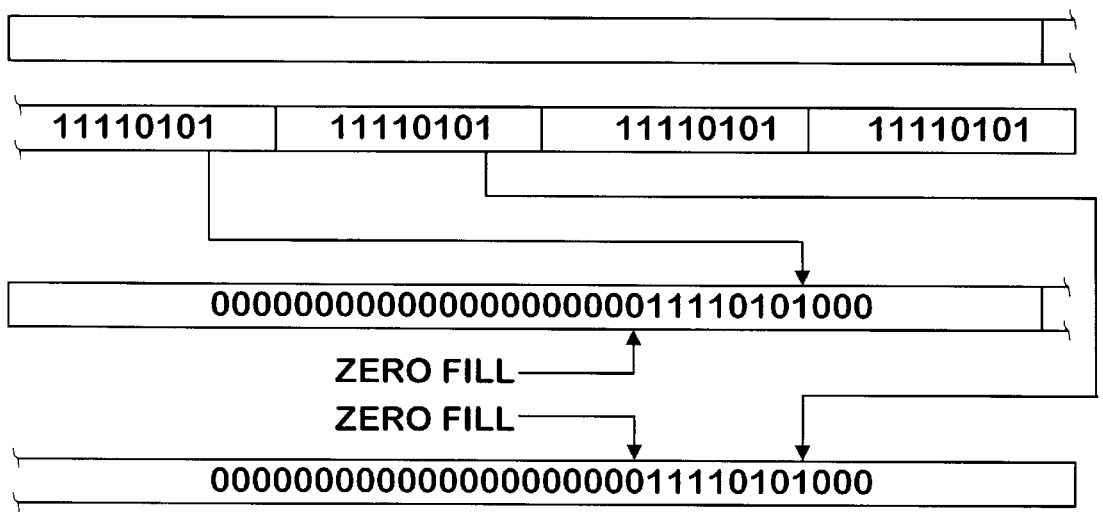
FIG. 17 is a memory map illustrating the effect of a third example logical shift left bit manipulation performed with 32 bit precision on a Byte data type input by a bit manipulation unit according to one embodiment of the present invention.
Figure 18:
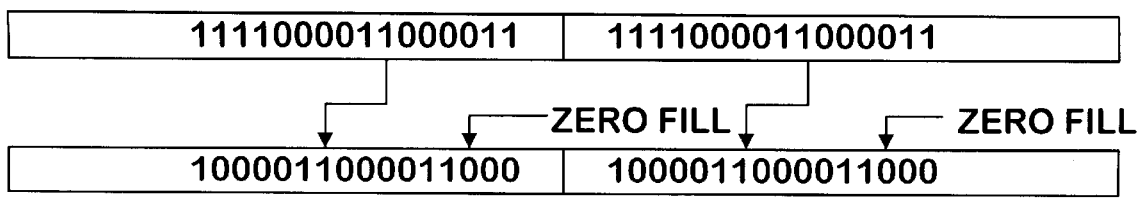
FIG. 18 is a memory map illustrating the effect of a first example logical shift left bit manipulation performed with 16 bit precision SIMD on a Word data type input by a bit manipulation unit according to one embodiment of the present invention.
Figure 19:
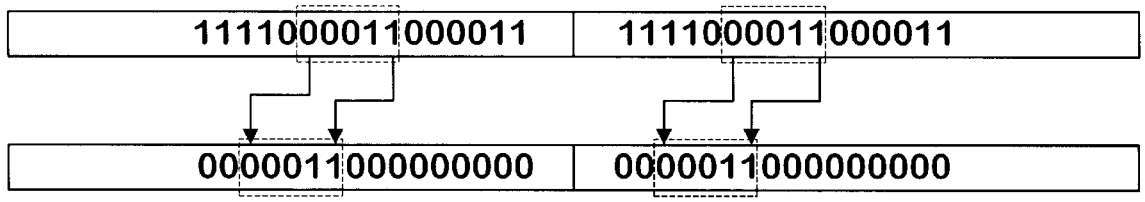
FIG. 19 is a memory map illustrating the effect of a second example logical shift left bit manipulation performed with 16 bit precision SIMD on a Word data type input by a bit manipulation unit according to one embodiment of the present invention.
Figure 20:
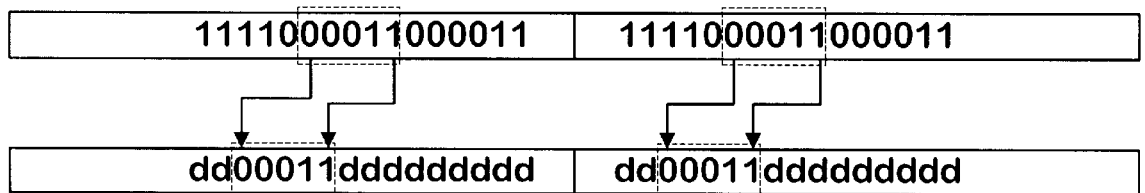
FIG. 20 is a memory map illustrating the effect of a third example logical shift left bit manipulation performed with 16 bit precision SIMD on a Word data type input by a bit manipulation unit according to one embodiment of the present invention.
Figure 21:
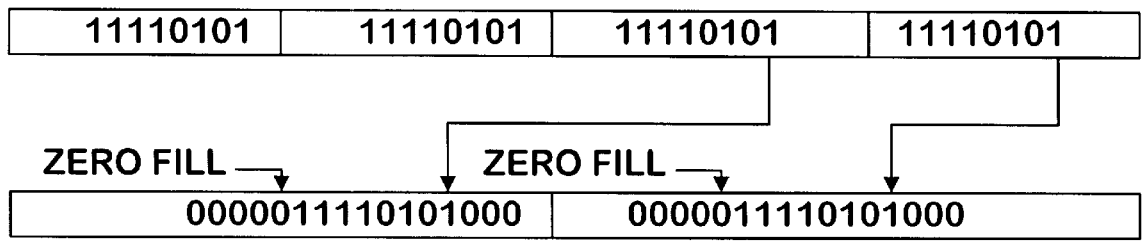
FIG. 21 is a memory map illustrating the effect of a first example logical shift left bit manipulation performed with 16 bit precision SIMD on a Byte data type input by a bit manipulation unit according to one embodiment of the present invention.
Figure 22:
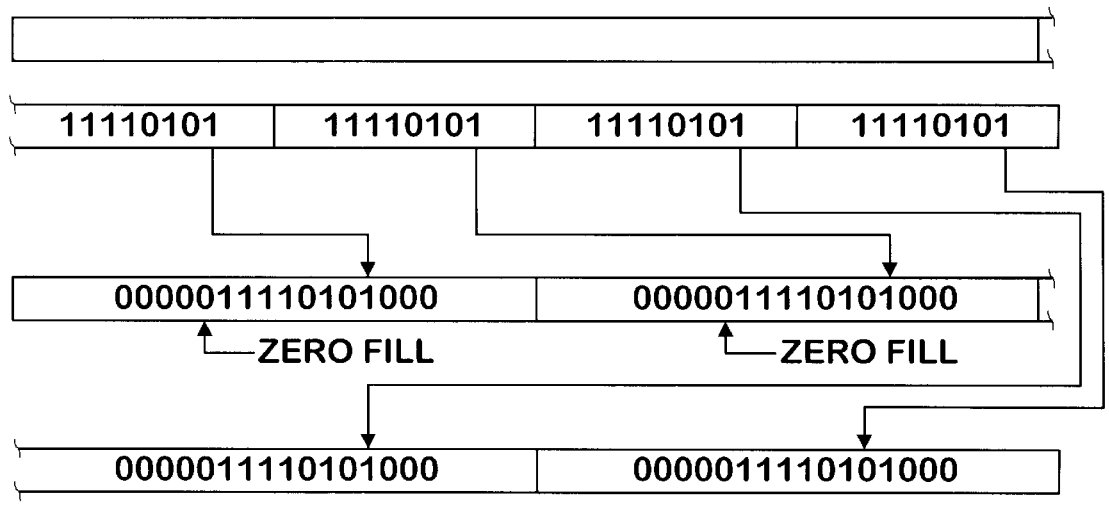
FIG. 22 is a memory map illustrating the effect of a second example logical shift left bit manipulation performed with 16 bit precision SIMD on a Byte data type input by a bit manipulation unit according to one embodiment of the present invention.
Figure 23:
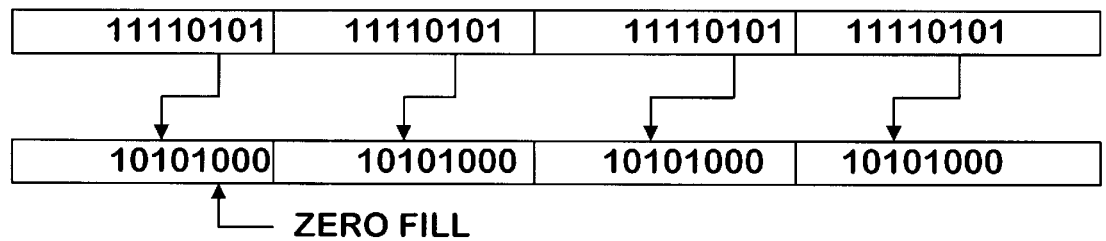
FIG. 23 is a memory map illustrating the effect of a first example logical shift left bit manipulation performed with 8 bit precision STMD on a Byte data type input by a bit manipulation unit according to one embodiment of the present invention.
Figure 24:
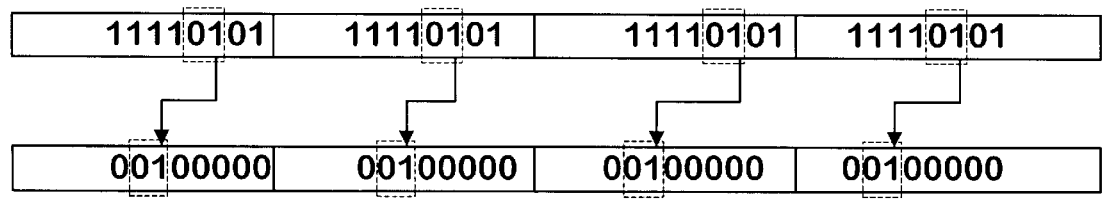
FIG. 24 is a memory map illustrating the effect of a second example logical shift left bit manipulation performed with 8 bit precision SIMD on a Byte data type input by a bit manipulation unit according to one embodiment of the present invention.
Figure 25:
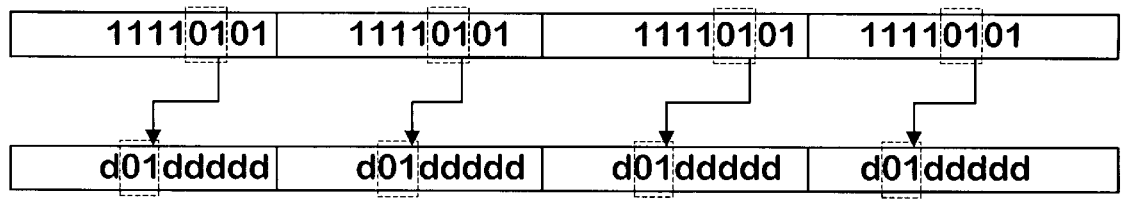
FIG. 25 is a memory map illustrating the effect of a third example logical shift left bit manipulation performed with 8 bit precision SIMD on a Byte data type input by a bit manipulation unit according to one embodiment of the present invention.

2.2.3.1 BMU Operations
2.2.3.1.1 Logical Shift Left
2.2.3.1.1.1 32 Bit Precision—Dword Data Type Input
unsigned long mem1*;
unsigned long bmu;

bmu=mem1 [0x7]<<3;
See FIG. 9.
unsigned long mem1*;
unsigned long bmu;

bmu=mem1 [0x7] (21:11)<<3;
See FIG. 10.
unsigned long mem1*;
unsigned long bmu;

bmu (24:14)=mem1 [0x7] (21:11)<<3;
See FIG. 11.
*d=original bits of the bmu or output
2.2.3.1.1.2 32 Bit Precision—Word Data Type Input
unsigned word mem1*;
unsigned long bmu;

bmu=mem1 [0x7]<<3;
See FIG. 12.
See FIG. 13.
See FIG. 14.
2.2.3.1.1.3 32 Bit Precision—Byte Data Type Input
unsigned byte mem1*;
unsigned long bmu;

bmu=mem1 [0x7]<<3;
See FIG. 15.
See FIG. 16.
See FIG. 17.
2.2.3.1.1.4 16 Bit Precision SIMD—Word Data Type Input
unsigned word mem1*;
unsigned word bmu;

bmu=mem1 [0x7]<<3;
See FIG. 18.
unsigned word mem1*;
unsigned word bmu;

bmu=mem1 [0x7] (10:6)<<3;
See FIG. 19.
unsigned word mem1*;
unsigned word bmu;

bmu (13:9)=mem1 [0x7] (10:6)<<3;
See FIG. 20.
2.2.3.1.1.5 16 Bit Precision SIMD—Byte Data Type Input
unsigned byte mem1*;
unsigned word bmu;

bmu=mem1 [0x7]<<3;
See FIG. 21.
See FIG. 22.
2.2.3.1.1.6 8 Bit Precision SIMD—Byte Data Type Input
unsigned byte mem1*;
unsigned byte bmu;

bmu=mem1 [0x7]<<3;
See FIG. 23.
unsigned byte mem1*;
unsigned byte bmu;

bmu=mem1 [0x7] (3:2)<<3;
See FIG. 24.
unsigned byte mem1*;
unsigned byte bmu;

bmu (6:5)=mem1 [0x7] (3:2)<<3;
See FIG. 25.
2.2.3.1.1.7 8 Bit Precision SIMD—Word Data Type Input
unsigned word mem1*;

unsigned byte bmu;

bmu=mem1 [0x7]<<3;
See FIG. 26.
unsigned word mem1*;
saturated unsigned byte bmu;

bmu=mem1 [0x7]<<3;
See FIG. 27.
2.2.3.1.2 Arithmetic Shift Left
2.2.3.1.2.1 32 Bit Precision—Dword Data Type Input
signed long mem1*;
signed long bmu;

bmu=mem1 [0x7]<<3;
　　See FIG. 28.
signed long mem1*;
signed long bmu;

bmu=mem1 [0x7] (21:11)<<3;
　　See FIG. 29.
signed long mem1*;
signed long bmu;

bmu (24:14)=mem1 [0x7] (21:11)<<3;
　　See FIG. 30.
2.2.3.1.2.2 32 Bit Precision—Word Data Type Input
signed word mem1*;
signed long bmu;

bmu=mem1 [0x7]<<3;
　　See FIG. 31.
　　See FIG. 32.
　　See FIG. 33.
2.2.3.1.2.3 32 Bit Precision—Byte Data Type Input
signed byte mem1*;
signed long bmu;

bmu=mem1 [0x7]<<3;
　　See FIG. 34.
　　See FIG. 35.
　　See FIG. 36.
2.2.3.1.2.4 16 Bit Precision SIMD—Word Data Type Input
signed word mem1*;
signed word bmu;

bmu=mem1 [0x7]<<3;
　　See FIG. 37.
signed word mem1*;
signed word bmu;

bmu=mem1 [0x7] (10:6)<<3;
　　See FIG. 38.
signed word mem1*;
signed word bmu;

bmu (13:9)=mem1 [0x7] (10:6)<<3;
　　See FIG. 39.
2.2.3.1.2.5 16 Bit Precision SIMD—Byte Data Type Input
signed byte mem1*;
signed word bmu;

bmu=mem1 [0x7]<<3;
　　See FIG. 40.
　　See FIG. 41.
2.2.3.1.2.6 8 Bit Precision SIMD—Byte Data Type Input
signed byte mem1*;
signed byte bmu;

bmu=mem1 [0x7]<<3;
　　See FIG. 42.
signed byte mem1*;
signed byte bmu;

bmu=mem1 [0x7] (3:2)<<3;
　　See FIG. 43.
unsigned byte mem1*;
unsigned byte bmu;

bmu (6:5)=mem1 [0x7] (3:2)<<3;
　　See FIG. 44.

2.2.3.1.3 Logical Shift Right
2.2.3.1.3.1 32 Bit Precision—Dword (Long) Data Type Input
unsigned long mem1*;
unsigned long bmu;

bmu=mem1 [0x7]>>3;
　　See FIG. 45.
unsigned long mem1*;
unsigned long bmu;

bmu=mem1 [0x7] (21:11)>>3;
　　See FIG. 46.
unsigned long mem1*;
unsigned long bmu;

bmu (18:8)=mem1 [0x7] (21:11)>>3;
　　See FIG. 47.
2.2.3.1.3.2 32 Bit Precision—Word Data Type Input
unsigned word mem1*;
unsigned long bmu;

bmu=mem1 [0x7]>>3;
　　See FIG. 48.
　　See FIG. 49.
　　See FIG. 50.
2.2.3.1.3.3 32 Bit Precision—Byte Data Type Input
unsigned byte mem1*;
unsigned long bmu;

bmu=mem1 [0x7]>>3;
　　See FIG. 52.
　　See FIG. 53.
2.2.3.1.3.4 16 Bit Precision SIMD—Word Data Type Input
unsigned word mem1*;
unsigned word bmu;

bmu=mem1 [0x7]>>3;
　　See FIG. 54.
unsigned word mem1*;
unsigned word bmu;

bmu=mem1 [0x7] (13:7)>>3;
　　See FIG. 55.
unsigned word mem1*;
unsigned word bmu;

bmu (10:4)=mem1 [0x7] (13:7)>>3;
　　See FIG. 56.
2.2.3.1.3.5 16 Bit Precision SIMD—Byte Data Type Input
unsigned byte mem1*;
unsigned word bmu;

bmu=mem1 [0x7]>>3;
　　See FIG. 57.
　　See FIG. 58.
2.2.3.1.3.6 8 Bit Precision SIMD—Byte Data Type Input
unsigned byte mem1*;
unsigned byte bmu;

bmu=mem1 [0x7]>>3;
　　See FIG. 59.
unsigned byte mem1*;
unsigned byte bmu;

bmu=mem1 [0x7] (6:5)>>3;
　　See FIG. 60.

unsigned byte mem1*;
unsigned byte bmu;

bmu (3:2)=mem1 [0x7] (6:5)>>3;
   See FIG. 61.
2.2.3.1.4 Arithmetic Shift Right
2.2.3.1.4.1 32 Bit Precision—Dword Data Type Input
signed long mem1*;
signed long bmu;

bmu=mem1 [0x7]>>3;
   See FIG. 62.
signed long mem1*;
signed long bmu;

bmu=mem1 [0x7] (21:11)>>3;
   See FIG. 63.
signed long mem1*;
signed long bmu;

bmu (18:8)=mem1 [0x7] (21:11)>>3;
   See FIG. 64.
2.2.3.1.4.2 32 Bit Precision—Word Data Type Input
signed word mem1*;
signed long bmu;

bmu=mem1 [0x7]>>3; // example for 64 bit output
   See FIG. 65.
signed word mem1*;
signed long bmu;

bmu=mem1 [0x7]>>3;
   See FIG. 66.
signed word mem1*;
signed long bmu;

bmu=mem1 [0x7] (31:16)>>3;
   See FIG. 67.
signed long mem1*;
signed long bmu;

bmu=mem1 [0x7] (31:16); // extract word 1 into long bmu
   See FIG. 68.
signed long mem1*;
signed long bmu;

bmu=mem1 [0x7] (31:16); // extract word 1 into long bmu
   See FIG. 69.
2.2.3.1.4.3 32 Bit Precision—Byte Data Type Input
signed byte mem1*;
signed long bmu;

bmu=mem1 [0x7]>>3;
   See FIG. 70.
   See FIG. 71.
   See FIG. 72.
2.2.3.1.4.4 16 Bit Precision SIMD—Word Data Type Input
signed word mem1*;
signed word bmu;

bmu=mem1 [0x7]>>3;
   See FIG. 73.
signed word mem1*;
signed word bmu;

bmu=mem1 [0x7] (13:7)>>3;
   See FIG. 74.

signed word mem1*;
signed word bmu;

bmu (10:4)=mem1 [0x7] (13:7)>>3;
   See FIG. 75.
2.2.3.1.4.5 16 Bit Precision SIMD—Byte Data Type Input
signed byte mem1*;
signed word bmu;

bmu=mem1 [0x7]>>3;
   See FIG. 76.
   See FIG. 77.
2.2.3.1.4.6 8 Bit Precision SIMD—Byte Data Type Input
signed byte mem1*;
signed byte bmu;

bmu=mem1 [0x7]>>3;
   See FIG. 78.
signed byte mem1*;
signed byte bmu;

bmu=mem1 [0x7] (6:5)>>3;
   See FIG. 79.
signed byte mem1*;
signed byte bmu;

bmu (3:2)=mem1 [0x7] (6:5)>>3;
   See FIG. 80.
2.2.3.1.5 Arithmetic/Logical Rotate Left
2.2.3.1.5.1 32 Bit Precision—Dword Data Type Input
long mem1*;
long bmu;

bmu=mem1 [0x7]<<<3;
   See FIG. 81.
2.2.3.1.5.2 16 Bit Precision SIMD—Word Data Type Input
word mem1*;
word bmu;

bmu=mem1 [0x7]<<<3;
   See FIG. 82.
2.2.3.1.5.3 8 Bit Precision SIMD—Byte Data Type Input
byte mem1*;
byte bmu;

bmu=mem1 [0x7]<<<3;
   See FIG. 83.
2.2.3.1.6 Arithmetic/Logical Rotate Right
2.2.3.1.6.1 32 Bit Precision—Dword Data Type Input
long mem1*;
long bmu;

bmu=mem1 [0x7]>>>3;
   See FIG. 84.
2.2.3.1.6.2 16 Bit Precision SIMD—Word Data Type Input
word mem1*;
word bmu;

bmu=mem1 [0x7]>>>3;
   See FIG. 85.
2.2.3.1.6.3 8 Bit Precision SIMD—Byte Data Type Input
byte mem1*;
byte bmu;

bmu=mem1 [0x7]>>>3;
   See FIG. 86.
2.2.4 Flags

Flags are generated by the MAU and ALU execution units. Various flags are set depending on the results of the execution. Some flags are logical operations of other flags. This section details the computation of these flags. Conditional instructions use these flags to control program flow or execution. The four basic conditional flags are Carry, Negative, Zero and Overflow. All other flags are derived from these four flags. Loading the output registers of the MAU and ALU does not set these flags. These flags are only set during an execution phase.

For logical operations only the Z flag is affected, the other flags remain unchanged. The Z flag in the PSW reflects the full 32 bits, regardless of the precision of the operation (SIMD mode). The C, N and V flags in the PSW are equivalent to the flags for the most significant word or byte of a SIMD operation.

2.2.4.1 Carry (C)

There are four carry flags for each byte of both the MAU and ALU arithmetic units. These carry flags are set whenever there is a carry out of bits 31, 23, 15 and 7. During a multiply-accumulate operation the MAU carry flags are set whenever there is a carry out of bits 63, 47, 31 and 15. The flags can not be individually accessed for a condition in the software, instead all four are treated as one. In the case of a SIMD operation the individual flag bits are used in the condition, whereas in the case of a full 32 bit operation, only the most significant carry flag is used.

2.2.4.2 Negative (N)

There are four negative flags for each byte of both the MAU and ALU arithmetic units. These negative flags are set equal to bits 31, 23 15 and 7 of the result after all non-multiply-accumulate operations. After a multiply-accumulate operation the MAU negative flags are set equal to bits 63, 47, 31 and 15. The accessibility of the negative flag is similar to that of the carry flag, ie, the flags are not separately accessible for use in conditional instructions in the software.

2.2.4.3 Zero (Z)

There are four zero flags for each byte of both the MAU and ALU arithmetic units. The zero flags are set in the following way.

Z(3)=NOR of bits 31 to 0 during a 32 bit operation
Z(3)=NOR of bits 31 to 24 during an 8 bit SIMD operation
Z(3)=NOR of bits 31 to 16 during a 16 bit SIMD operation
Zm(3)=NOR of bits 63 to 0 during a multiply-accumulate operation (MAU only)
Z(2)=NOR of bits 23 to 16 during 32, 16 and 8 bit operations
Zm(2)=NOR of bits 47 to 31 during a multiply-accumulate operation (MAU only)
Z(1)=NOR of bits 15 to 8 during 8 bit SIMD and 32 bit operations
Z(1)=NOR of bits 15 to 0 during a 16 bit SIMD operation
Zm(1)=NOR of bits 31 to 0 during a multiply-accumulate operation (MAU only)
Z(0)=NOR of bits 7 to 0 during 8 and 16 bit SIMD and 32 bit operations
Zm(0)=NOR of bits 15 to 0 during a multiply-accumulate operation (MAU only)

2.2.4.4 Overflow (V)

The way the overflow flag is computed depends on the type of the two input operands, ie, whether the operands are signed, unsigned or a mix of the two. Each of the cases is explained in the following sections.

2.2.4.4.1 Signed/Signed $V = C_{msb} .XOR. C_{msb-1}$

Where $C_{msb}$=carry out of the most significant bit of the arithmetic computation and $C_{msb-1}$=carry out of the bit before the most significant bit

2.2.4.4.2 Unsigned/Unsigned $V = C_{msb} .XOR.$ subtract_flag

Where $C_{msb}$=carry out of the most significant bit of the arithmetic computation and subtract_flag=indicates a subtract operation if true (hardware internal flag)

2.2.4.4.3 Signed/Unsigned $V = C_{msb} .XOR. S_{msb}$

Where $C_{msb}$=carry out of the most significant bit of the arithmetic computation and $S_{msb}$=most significant bit of the signed operand or "sign bit"

2.2.4.5 Less Than (LT)

LT=N .XOR.V

Where

N=Negative flag

V=Overflow flag

2.2.4.6 Greater Than or Equal (GE)

GE=.NOT. LT

Where

LT=Less Than flag

2.2.4.7 Less Than or Equal (LE)

LE=LT .OR. Z

Where

LT=Less Than flag, and

Z=Zero flag

2.2.4.8 Greater Than (GT)

GT=.NOT. LE

Where

LE=Less Than or Equal flag

2.3 MPU Data Path

The data path of the MPU is configured such that all three of the execution units described earlier can work concurrently during an execution phase. Instructions that use the execution units are known as computational instructions. This class of instructions will be explained in greater detail in the section dealing with the MPU instruction set. Computational instructions can specify up to a maximum of four directly (or indirectly) addressable memory operands. These operands can come from anywhere in the memory map. Besides these four memory operands, computational instructions can also indirectly (will be explained in detail later) access various registers in the data path. The maximum number of operands (be they read or write) that can be specified through a computational instruction is nine. The way these operands are addressed and their connection to the various inputs and outputs of the execution units is specified by an routing dictionary (again, this concept and its implementation will be explained in detail in a later section).

Each execution unit is configured to have two inputs and one output. Each input of an execution unit can be connected to one of two memory ports (to access operands in the memory map, generally from the four port or single port sram) out of a total of four. The inputs can also be connected to their own output registers or the output registers of the execution units to the left and right of them.

2.4 Local Memory

Local memory includes the static ram memory, dictionaries, registers and latches that are associated with each MPU. Local sram memory consists of an Instruction cache and data memory. Total memory bandwidth to local memory is 2.8 Gbytes/sec per MPU. All operations, besides inter-processor accesses, are executed out of and into local memory.

As mentioned earlier the UMP is a memory mapped architecture. This means that all storage locations, be they sram memory or registers or latches are user accessible through the memory map. Each of the local memory sub-blocks is dealt with in detail in the sections that follow and the accessibility of each of the memory blocks is explained.

2.4.1 Instruction Cache

The Instruction cache is a four-way set-associative cache with a single index. This greatly simplifies the construction of the cache, while providing reasonably good cache performance. The instruction cache consist of four 32 double word blocks of single-ported static ram, giving a total of 256 words (1.0 Kbyte) of instruction memory. Each of these blocks is separately addressable, so that an external memory transfer could be taking place in one of the blocks while the MPU accesses instructions from another block. The cache uses a least-recently-used (LRU) replacement policy.

The tags are 11 bits wide, since each block is 32 double words long, and there are 2 LRU bits per block. The size of block fetches from external or global memory can be specified at the MPU, when replacing a block. This means that one could necessarily only fetch enough to fill half a block (32 instructions) per MPU request. There is also provision for automatic instruction pre-fetch.

In automatic instruction pre-fetch, the least recently used block is overwritten, and the LRU bits for the pre-fetched block becomes the most recently used. Pre-fetch of the succeeding block starts as soon as the current block gets a hit. Pre-fetches can also be tuned by providing a trigger address (0 to 31) for the current block. An automatic pre-fetch starts a soon as this trigger address is accessed.

Any of the instruction cache blocks can be made non-disposable, so that they are not overwritten with new data. This is useful for small terminate-and-stay-resident (TSR) type programs, which could be interrupt service routines or supervisory routines. This way interrupt requests and frequently used subroutines do not incur any overhead if the program happens to be currently executing in distant memory space.

See FIG. 87.

In the diagram above the VALID bits are not shown. There is one VALID bit for each bank. A cache miss would occur if the tags do not match or the VALID bit is reset. On cache misses, the MPU is stalled and a DMA memory request is made if the address is to an external (outside MPU memory space) location. If it is to an internal memory location than (usually) the internal single port data ram is accessed.

2.4.1.1 Cache Replacement Algorithm

The LRU bits are modified in the following way:

On a MISS, the LRU bits are all decremented by one. The least recently used block which is "00" wraps around to be "11"; most recently used.

On a HIT, the LRU bits of the block that is hit becomes "11", and only those blocks whose LRU bits are greater than the previous value of the block that was hit, are decremented.

2.4.2 Data Memory

Data memory consists of one independently addressable 512 word single-port static ram blocks and one independently addressable 64 word quadruple-port static ram block, giving a total of 576 words (2.3 Kbytes) of data memory. The memory hierarchy was necessary in order to balance the need for concurrent high performance access with the cost associated with multi-ported memories. Each of these blocks is mapped in an identifiable memory space, so that applications can judiciously choose the various memory spaces, depending on the number of concurrent accesses that are to be made to that locality of memory.

Five simultaneous Dword memory accesses are allowed in a single cycle. Four of these accesses are to the quad-port memory and the fifth access can be either to an external memory space or to the internal single port ram. Since computational instructions can access only four memory locations at a time, the fifth access can occur while managing the stack (if the stack is stored in the single port ram) or while performing a concurrent move instruction with a computational instruction.

See FIG. 88.

2.4.3 Dictionaries

MPU dictionaries are used to configure the MPU data paths to provide an extensive instruction set without the need for long instruction words. The dictionaries and their usage will be presented in detail in the section on the instruction set. MPU dictionaries are part of the local MPU memory space. Their exact location can be found in the MPU memory map diagram.

There are four MPU dictionaries and each of them is essentially single port memory. The four MPU dictionaries are:

1. MAU dictionary
2. ALU dictionary
3. BMU dictionary
4. Routing dictionary

These dictionaries are all 8 words deep and dictionary entries are all 32 bits in length, although some dictionaries may not have all their bits fully implemented. These dictionaries may be implemented with srams or with addressable latches, whichever is most cost-effective. The four dictionaries are read concurrently in one clock cycle during the decode/operand-fetch phase of the execution pipeline. For non-execution access, only one read or write operation can be performed in one cycle. Thus, the four MPU dictionaries act as one single port memory during moves.

2.4.4 MPU Registers

The MPU registers include both data, address, control and status registers. The data registers are essentially pipeline registers in the data path that hold the data through the various stages of the execution pipeline. The data registers also hold intermediate results before they are used by the next instruction. The address registers consist of the four memory pointers and their associated index registers. All MPU registers are 32 bits in length, to better support the 32 bit data paths.

See FIG. 89.

2.4.4.1 Processor Status Word—PSW (R/W)
2.4.4.2 Extended Processor Status Word—EPSW (R/W)

See FIG. 90.

This register contains all the basic flag bits generated by the MAU and the ALU. As mentioned earlier, the secondary flag bits can all be derived from these basic flags.

2.4.4.3 Interrupt Register—INT (R/W)

See FIG. 91.

Note. The flag bits of the Interrupt register may be set through software to cause an interrupt.

2.4.4.4 Program Counter—PC (R/W)

See FIG. 92.

Note: During program execution (subroutine calls, jumps, etc.), only the lower 16 bits of the PC is modified, the upper 8 bits have to be modified by a direct write to the PC.

2.4.4.5 Stack Pointer—SP (R/W)
See FIG. 93.

The stack pointer can only point to a local memory location. This would usually be in the single port sram associated with the MPU.

2.4.4.6 Link Register—LR (R/W)
See FIG. 94.

2.4.4.7 Memory Pointers—MEM0, MEM1, MEM2, MEM3 (R/W)
See FIG. 95.

Note: The MS Dword address bits (23 to 16) of all the memory pointers map to the same 8 bit register. Therefore, writes to any one of the memory pointers will always update the upper 8 bits of the address of all four memory pointers with the same value, ie, the upper 8 bits of the last memory pointer that was written. During address calculations using the memory pointers, only the lower 16 bits of the pointers are modified, the upper 8 bits have to be modified by a direct write to the pointer.

2.4.4.8 Index Registers—INDX0, INDX1, INDX2, INDX3 (R/W)
See FIG. 96.

There are four 8 bit signed indexes that can be added to each memory pointer (MEMn). Thus the index values range from +127 to −128.

2.4.5 MPU Memory Map

All MPU local storage is mapped into MPU memory space. The MPU memory map is shown below.
See FIG. 97A.
See FIG. 97B.
See FIG. 97C.
See FIG. 97D.

2.5 Instruction Set
2.5.1 Introduction

The Instruction Set of the Media Processors encompasses nearly all DSP type instructions, as well as immediate data move instructions that can be used to configure the complex pipeline of the execution units. As an example, the Multiplier could be configured to behave as four 8 bit multipliers. Each instruction is a complex 32 bit instruction that may be comprised of a number of DSP like operations.

The key characteristic of MPU "computational" instructions is the fact that they are interpreted instructions. This means that various instructions are encoded indirectly through a programmable instruction interpreter. This keeps the length of the instruction word to 32 bits and allows multiple instructions to be executed per clock cycle. The interpreter consists of addressable storage (which is part of the memory map) and decoder logic. The programmer must set up the interpreter by loading up the instruction "dictionary" with the instructions that will follow. This is what achieves the dynamic run-time reconfigurability This dictionary may only need to be changed at the beginning of the program segment or at the beginning of a complex inner loop operation. All other instructions have traditional microprocessor or DSP characteristics. Instruction encoding will be dealt with in detail in a subsequent section.

2.5.2 Instruction Encoding

In all instructions the most significant three bits decide the type and mode of the instruction. Bits 28 down to 0, are then interpreted depending on the three most significant "type" bits.

2.5.2.1 Computational Instructions
See FIG. 98.

2.5.2.1.1 Three Operation Mode
See FIG. 99.

2.5.2.1.2 Two Operation Mode
See FIG. 100.

2.5.2.1.3 One Operation Mode

Note. In the four port modes, a value of 00h (when memn(30)=0) or values of 00h, 1Ch, 1Dh, 1Eh or 1Fh (when memn(30)=1) in any port field, indicates indirect pointer addressing for that port field. Here, the memory pointer value n is the same as the port field number. A value other than the ones mentioned above indicates a direct pointer addressing format for that port. A direct pointer address is formed by concatenating the port field value with the memory pointer memn.

An offset value of 01h, 02h and 03h concatenated with the memory pointer memo always points to execution unit output registers alu, bmu and mau respectively.

2.5.2.1.4 Dictionary Encoding
See FIG. 101.

2.5.2.1.4.1 MAU Dictionary
2.5.2.1.4.2 ALU Dictionary
See FIG. 102.

2.5.2.1.4.3 BMU Dictionary
See FIG. 103.

Note: Only 8 and 16 bit data types may be inserted with 5 bit immediate values. Unaligned data may be inserted by specifying a shift amount and a data width through either a 10 bit immediate (most significant 5 bits specifies the data width while the least significant 5 bits specifies the shift amount) or an indirect variable at input B with the following formats.

8 Bit SIMD Mode:
See FIG. 104.
16 Bit SIMD Mode:
See FIG. 105.

Note: Extracts can be specified through a 5 bit immediate by setting the BMU to the right shift mode. An arithmetic shift performs a sign extended extract, whereas a logical shift performs a zero-filled extract.

For an 8 bit input data type, an immediate value of
0 extracts Byte 0
8 extracts Byte 1
16 extracts Byte 2
24 extracts Byte 3
For a 16 bit input data type, an immediate value of
0 extracts Word 0
16 extracts Word 1

2.5.2.1.4.4 Routing Dictionary
See FIG. 106.

2.5.2.1.4.4.1 Execution Unit Port Connectivity

The ALU input/output-port assignments are as follows:
Input A: Port (0), Port (2)
Input B: Port (1), Port (3)
Output: Port (2), Port (3)
The BMU input/output-port assignments are as follows:
Input A: Port (0), Port (2)
Input B: Port (1), Port (0)
Output: Port (2), Port (3)
The MAU input/output-port assignments are as follows:
Input A: Port (0), Port (2)
Input B: Port (1), Port (3)
Output: Port (2), Port (3)

Note. Input ports can be shared by specifying the same inputs for different execution units. Port sharing is only done if the assembler detects two operands which are equal, ie, either they refer to the same memory pointer through indirect addressing or they have the same offset values and their memory pointers are also the same.

2.5.2.1.4.4.2 Two Operation - Four Port Assignment Table (No shared ports)

| ALU | | | | BMU | | | | ES |
|---|---|---|---|---|---|---|---|---|
| Input A | Input B | Output | Code | Input A | Input B | Output | Code | Code |
| port(0) | port(3) | alu | 4 | port(2) | port(1) | bmu | 4 | 0 |
| port(0) | port(3) | alu | 4 | bm/ma/al | port(1) | port(2) | 9/a/b | 0 |
| port(2) | port(1) | alu | 4 | port(0) | al/bm/ma | port(3) | 9/a/b | 1 |
| port(0) | al/bm/ma | port(3) | 9/a/b | port(2) | port(1) | bmu | 4 | 0 |
| port(0) | al/bm/ma | port(3) | 9/a/b | bm/ma/al | port(1) | port(2) | 9/a/b | 0 |
| bm/ma/al | port(1) | port(2) | 9/a/b | port(0) | al/bm/ma | port(3) | 9/a/b | 1 |
| port(0) | port(3) | port(2) | c | bm/ma/al | port(1) | bmu | 1/2/3 | 0 |
| port(2) | port(1) | port(3) | c | port(0) | al/bm/ma | bmu | 1/2/3 | 1 |
| port(0) | port(1) | port(3) | 8 | bm/ma/al | al/bm/ma | port(2) | d/e/f | 0 |
| port(0) | al/bm/ma | alu | 1/2/3 | port(2) | port(1) | port(3) | c | 0 |
| bm/ma/al | al/bm/ma | port(2) | d/e/f | port(0) | port(1) | port(3) | 8 | 1 |

| ALU | | | | MAU | | | | |
|---|---|---|---|---|---|---|---|---|
| Input A | Input B | Output | Code | Input A | Input B | Output | Code | Code |
| port(2) | port(1) | alu | 4 | port(0) | port(3) | mau | 4 | 1 |
| bm/ma/al | port(1) | port(2) | 9/a/b | port(0) | port(3) | mau | 4 | 1 |
| port(2) | port(1) | alu | 4 | port(0) | al/bm/ma | port(3) | 9/a/b | 1 |
| bm/ma/al | port(1) | port(2) | 9/a/b | port(0) | al/bm/ma | port(3) | 9/a/b | 1 |
| bm/ma/al | port(1) | alu | 1/2/3 | port(0) | port(3) | port(2) | c | 1 |
| bm/ma/al | al/bm/ma | port(2) | d/e/f | port(0) | port(1) | port(3) | 8 | 1 |
| port(2) | port(1) | port(3) | c | port(0) | al/bm/ma | mau | 1/2/3 | 1 |
| port(0) | port(1) | port(3) | 8 | bm/ma/al | al/bm/ma | port(2) | d/e/f | 0 |

| MAU | | | | BMU | | | | |
|---|---|---|---|---|---|---|---|---|
| Input A | Input B | Output | Code | Input A | Input B | Output | Code | Code |
| port(0) | port(3) | mau | 4 | port(2) | port(1) | bmu | 4 | 0 |
| port(0) | port(3) | mau | 4 | bm/ma/al | port(1) | port(2) | 9/a/b | 0 |
| port(2) | port(1) | mau | 4 | port(0) | al/bm/ma | port(3) | 9/a/b | 1 |
| port(0) | al/bm/ma | port(3) | 9/a/b | port(2) | port(1) | bmu | 4 | 0 |
| port(0) | al/bm/ma | port(3) | 9/a/b | bm/ma/al | port(1) | port(2) | 9/a/b | 0 |
| bm/ma/al | port(1) | port(2) | 9/a/b | port(0) | al/bm/ma | port(3) | 9/a/b | 1 |
| port(0) | port(3) | port(2) | c | bm/ma/al | port(1) | bmu | 1/2/3 | 0 |
| port(2) | port(1) | port(3) | c | port(0) | al/bm/ma | bmu | 1/2/3 | 1 |
| port(0) | port(1) | port(3) | 8 | bm/ma/al | al/bm/ma | port(2) | d/e/f | 0 |
| port(0) | al/bm/ma | mau | 1/2/3 | port(2) | port(1) | port(3) | c | 0 |
| bm/ma/al | al/bm/ma | port(2) | d/e/f | port(0) | port(1) | port(3) | 8 | 1 |

45

2.5.2.1.4.4.3 Two Operation - Four Port Assignment table (Shared ports)

| Input A | Input B | Output | Code | Input A | Input B | Output | Code | Code |
|---|---|---|---|---|---|---|---|---|
| ALU | | | | BMU | | | | ES |
| port (0) | al/bm/ma | port (3) | 9/a/b | port (0) | port (1) | port (2) | 8 | 0 |
| port (0) | port (1) | port (2) | 8 | port (0) | al/bm/ma | port (3) | 9/a/b | 1 |
| port (0) | port (3) | alu | 4 | port (0) | port (1) | port (2) | 8 | 0 |
| port (0) | port (3) | port (2) | c | port (0) | port (1) | bmu | 0 | 0 |
| bm/ma/al | port (1) | port (2) | 9/a/b | port (0) | port (1) | port (3) | 8 | 1 |
| port (0) | port (1) | port (3) | 8 | bm/ma/al | port (1) | port (2) | 9/a/b | 0 |
| port (2) | port (1) | alu | 4 | port (0) | port (1) | port (3) | 8 | 1 |
| port (2) | port (1) | port (3) | c | port (0) | port (1) | bmu | 0 | 1 |
| port (0) | port (1) | port (3) | 8 | port (0) | port (1) | port (2) | 8 | 0 |
| ALU | | | | MAU | | | | |
| port (0) | port (1) | port (2) | 8 | port (0) | al/bm/ma | port (3) | 9/a/b | 1 |
| port (0) | al/bm/ma | port (3) | 9/a/b | port (0) | port (1) | port (2) | 8 | 0 |
| port (0) | port (1) | port (2) | 8 | port (0) | port (3) | mau | 4 | 1 |

-continued

2.5.2.1.4.4.3 Two Operation - Four Port Assignment table (Shared ports)

| Input A | Input B | Output | Code | Input A | Input B | Output | Code | Code |
|---------|---------|--------|------|---------|---------|--------|------|------|
| port (0) | port (1) | alu | 0 | port (0) | port (3) | port (2) | c | 1 |
| port (0) | port (1) | port (3) | 8 | bm/ma/al | port (1) | port (2) | 9/a/b | 0 |
| bm/ma/al | port (1) | port (2) | 9/a/b | port (0) | port (1) | port (3) | 8 | 1 |
| port (0) | port (1) | port (3) | 8 | port (2) | port (1) | mau | 4 | 0 |
| port (0) | port (1) | alu | 0 | port (2) | port (1) | port (3) | c | 0 |
| port (0) | port (1) | port (2) | 8 | port (0) | port (1) | port (3) | 8 | 1 |
| port (2) | port (1) | port (3) | c | port (0) | port (1) | mau | 0 | 0 |
| | MAU | | | | BMU | | | |
| port (0) | al/bm/ma | port (3) | 9/a/b | port (0) | port (1) | port (2) | 8 | 0 |
| port (0) | port (1) | port (2) | 8 | port (0) | al/bm/ma | port (3) | 9/a/b | 1 |
| port (0) | port (3) | mau | 4 | port (0) | port (1) | port (2) | 8 | 0 |
| port (0) | port (3) | port (2) | c | port (0) | port (1) | bmu | 0 | 0 |
| bm/ma/al | port (1) | port (2) | 9/a/b | port (0) | port (1) | port (3) | 8 | 1 |
| port (0) | port (1) | port (3) | 8 | bm/ma/al | port (1) | port (2) | 9/a/b | 0 |
| port (2) | port (1) | mau | 4 | port (0) | port (1) | port (3) | 8 | 1 |
| port (2) | port (1) | port (3) | c | port (0) | port (1) | bmu | 0 | 1 |
| port (0) | port (1) | port (3) | 8 | port (0) | port (1) | port (2) | 8 | 0 |

2.5.2.1.4.4.4 Two Operation - Three Port Assignment Table (No Sharing)

| ALU | | | | BMU | | | | ES |
|-----|---|---|---|-----|---|---|---|-----|
| Input A | Input B | Output | Code | Input A | Input B | Output | Code | Code |
| port(2) | port(1) | alu | 4 | port(0) | al/bm/ma | bmu | 1/2/3 | 1 |
| port(0) | port(1) | alu | 0 | bm/ma/al | al/bm/ma | port(2) | d/e/f | 0 |
| bm/ma/al | port(1) | port(2) | 9/a/b | port(0) | al/bm/ma | bmu | 1/2/3 | 1 |
| port(0) | al/bm/ma | alu | 1/2/3 | port(2) | port(1) | bmu | 4 | 0 |
| bm/ma/al | al/bm/ma | port(2) | d/e/f | port(0) | port(1) | bmu | 0 | 1 |
| port(0) | al/bm/ma | alu | 1/2/3 | bm/ma/al | port(1) | port(2) | 9/a/b | 0 |
| port(0) | port(1) | port(2) | 8 | bm/ma/al | al/bm/ma | bmu | 5/6/7 | 1 |
| bm/ma/al | al/bm/ma | alu | 5/6/7 | port(0) | port(1) | port(2) | 8 | 0 |

| ALU | | | | MAU | | | | |
|-----|---|---|---|-----|---|---|---|---|
| Input A | Input B | Output | Code | Input A | Input B | Output | Code | Code |
| port(2) | port(1) | alu | 4 | port(0) | al/bm/ma | mau | 1/2/3 | 1 |
| port(0) | port(1) | alu | 0 | bm/ma/al | al/bm/ma | port(2) | d/e/f | 0 |
| bm/ma/al | port(1) | port(2) | 9/a/b | port(0) | al/bm/ma | mau | 1/2/3 | 1 |
| port(0) | al/bm/ma | alu | 1/2/3 | port(2) | port(1) | mau | 4 | 0 |
| bm/ma/al | al/bm/ma | port(2) | d/e/f | port(0) | port(1) | mau | 0 | 1 |
| port(0) | al/bm/ma | alu | 1/2/3 | bm/ma/al | port(1) | port(2) | 9/a/b | 0 |
| port(0) | port(1) | port(2) | 8 | bm/ma/al | al/bm/ma | mau | 5/6/7 | 1 |
| bm/ma/al | al/bm/ma | alu | 5/6/7 | port(0) | port(1) | port(2) | 8 | 0 |

| MAU | | | | BMU | | | | |
|-----|---|---|---|-----|---|---|---|---|
| Input A | Input B | Output | Code | Input A | Input B | Output | Code | Code |
| port(2) | port(1) | mau | 4 | port(0) | al/bm/ma | bmu | 1/2/3 | 1 |
| port(0) | port(1) | mau | 0 | bm/ma/al | al/bm/ma | port(2) | d/e/f | 0 |
| bm/ma/al | port(1) | port(2) | 9/a/b | port(0) | al/bm/ma | bmu | 1/2/3 | 1 |
| port(0) | al/bm/ma | mau | 1/2/3 | port(2) | port(1) | bmu | 4 | 0 |
| bm/ma/al | al/bm/ma | port(2) | d/e/f | port(0) | port(1) | bmu | 0 | 1 |
| port(0) | al/bm/ma | mau | 1/2/3 | bm/ma/al | port(1) | port(2) | 9/a/b | 0 |
| port(0) | port(1) | port(2) | 8 | bm/ma/al | al/bm/ma | bmu | 5/6/7 | 1 |
| bm/ma/al | al/bm/ma | mau | 5/6/7 | port(0) | port(1) | port(2) | 8 | 0 |

Note. In three port modes, only one output to a port is allowed, viz., port (2)

2.5.2.1.4.4.5 Two Operation - Three Port Assignment Table (Shared Ports)

| Input A | Input B | Output | Code | Input A | Input B | Output | Code | Code |
|---|---|---|---|---|---|---|---|---|
| ALU | | | | BMU | | | | ES |
| port (2) | port (1) | alu | 4 | port (0) | port (1) | bmu | 0 | 1 |
| port (0) | port (1) | alu | 0 | port (2) | port (1) | bmu | 4 | 0 |
| port (0) | port (1) | port (2) | 8 | port (0) | port (1) | bmu | 0 | 1 |
| port (0) | port (1) | alu | 0 | port (0) | port (1) | port (2) | 8 | 0 |
| port (0) | al/bm/ma | alu | 1/2/3 | port (0) | port (1) | port (2) | 8 | 0 |
| port (0) | port (1) | port (2) | 8 | port (0) | al/bm/ma | bmu | 1/2/3 | 1 |
| port (0) | al/bm/ma | port (2) | 9/a/b | port (0) | port (1) | bmu | 0 | 0 |
| port (0) | port (1) | alu | 0 | port (0) | al/bm/ma | port (2) | 9/a/b | 1 |
| bm/ma/al | port (1) | port (2) | 9/a/b | port (0) | port (1) | bmu | 0 | 1 |
| port (0) | port (1) | alu | 0 | bm/ma/al | port (1) | port (2) | 9/a/b | 0 |
| bm/ma/al | port (1) | alu | 1/2/3 | port (0) | port (1) | port (2) | 8 | 1 |
| port (0) | port (1) | port (2) | 8 | bm/ma/al | port (1) | bmu | 1/2/3 | 0 |
| ALU | | | | MAU | | | | |
| port (2) | port (1) | alu | 4 | port (0) | port (1) | mau | 0 | 1 |
| port (0) | port (1) | alu | 0 | port (2) | port (1) | mau | 4 | 0 |
| port (0) | port (1) | port (2) | 8 | port (0) | port (1) | mau | 0 | 1 |
| port (0) | port (1) | alu | 0 | port (0) | port (1) | port (2) | 8 | 0 |
| port (0) | al/bm/ma | alu | 1/2/3 | port (0) | port (1) | port (2) | 8 | 0 |
| port (0) | port (1) | port (2) | 8 | port (0) | al/bm/ma | mau | 1/2/3 | 1 |
| port (0) | al/bm/ma | port (2) | 9/a/b | port (0) | port (1) | mau | 0 | 0 |
| port (0) | port (1) | alu | 0 | port (0) | al/bm/ma | port (2) | 9/a/b | 1 |
| bm/ma/al | port (10 | port (2) | 9/a/b | port (0) | port (1) | mau | 0 | 1 |
| bm/ma/al | port (1) | port (2) | 9/a/b | port (0) | port (1) | mau | 0 | 1 |
| port (0) | port (1) | alu | 0 | bm/ma/al | port (1) | port (2) | 9/a/b | 0 |
| bm/ma/al | port (1) | alu | 1/2/3 | port (0) | port (1) | port (2) | 8 | 1 |
| port (0) | port (1) | port (2) | 8 | bm/ma/al | port (1) | mau | 1/2/3 | 0 |
| MAU | | | | BMU | | | | |
| port (2) | port (1) | mau | 4 | port (0) | port (1) | bmu | 0 | 1 |
| port (0) | port (1) | mau | 0 | port (2) | port (1) | bmu | 4 | 0 |
| port (0) | port (1) | port (2) | 8 | port (0) | port (1) | bmu | 0 | 1 |
| port (0) | port (1) | mau | 0 | port (0) | port (1) | port (2) | 8 | 0 |
| port (0) | al/bm/ma | mau | 1/2/3 | port (0) | port (1) | port (2) | 8 | 0 |
| port (0) | port (1) | port (2) | 8 | port (0) | al/bm/ma | bmu | 1/2/3 | 1 |
| port (0) | al/bm/ma | port (2) | 9/a/b | port (0) | port (1) | bmu | 0 | 0 |
| port (0) | port (1) | mau | 0 | port (0) | al/bm/ma | port (2) | 9/a/b | 1 |
| bm/ma/al | port (1) | port (2) | 9/a/b | port (0) | port (1) | bmu | 0 | 1 |
| port (0) | port (1) | mau | 0 | bm/ma/al | port (1) | port (2) | 9/a/b | 0 |
| bm/ma/al | port (1) | mau | 1/2/3 | port (0) | port (1) | port (2) | 8 | 1 |
| port (0) | port (1) | port (2) | 8 | bm/ma/al | port (1) | bmu | 1/2/3 | 0 |

2.5.2.1.4.4.6 Three Operation—Four Port Assignment Table (No Sharing)

The three operation 4 port combinations are as follows:

| | ALU | | | | BMU | | | | MAU | | | | ES |
|---|---|---|---|---|---|---|---|---|---|---|---|---|---|
| In A | In B | Out | Code | In A | In B | Out | Code | In A | In B | Out | Code | Code |
| | | | | 3-1-0 | | | | | | | | |
| p (0) | p (3) | p (2) | c | regs | p (1) | bmu | 1/2/3 | regs | regs | mau | 5/6/7 | 0 |
| p (2) | p (1) | p (3) | c | p (0) | regs | bmu | 1/2/3 | regs | regs | mau | 5/6/7 | 3 |
| p (0) | p (1) | p (3) | 8 | regs | regs | p (2) | d/e/f | regs | regs | mau | 5/6/7 | 0 |
| | | | | 3-0-1 | | | | | | | | |
| p (2) | p (1) | p (3) | c | regs | regs | bmu | 5/6/7 | p (0) | regs | mau | 1/2/3 | 1 |
| p (0) | p (1) | p (2) | 8 | regs | regs | bmu | 5/6/7 | regs | regs | p (3) | d/e/f | 1 |
| | | | | 0-1-3 | | | | | | | | |
| regs | regs | alu | 5/6/7 | regs | p (1) | bmu | 1/2/3 | p (0) | p (3) | p (2) | c | 2 |
| regs | regs | alu | 5/6/7 | p (0) | regs | bmu | 1/2/3 | p (2) | p (1) | p (3) | c | 3 |
| regs | regs | alu | 5/6/7 | regs | regs | p (2) | d/e/f | p (0) | p (1) | p (3) | 8 | 2 |
| | | | | 1-0-3 | | | | | | | | |
| regs | p (1) | alu | 1/2/3 | regs | regs | bmu | 5/6/7 | p (0) | p (3) | p (2) | c | 1 |
| regs | regs | p (2) | d/e/f | regs | regs | bmu | 5/6/7 | p (0) | p (1) | p (3) | 8 | 1 |

-continued

| ALU | | | | BMU | | | | MAU | | | | ES |
|---|---|---|---|---|---|---|---|---|---|---|---|---|
| In A | In B | Out | Code | In A | In B | Out | Code | In A | In B | Out | Code | Code |

1-3-0

| | | | | | | | | | | | | |
|---|---|---|---|---|---|---|---|---|---|---|---|---|
| p (0) | regs | alu | 1/2/3 | p (2) | p (1) | p (3) | c | regs | regs | mau | 5/6/7 | 0 |
| regs | p (1) | alu | 1/2/3 | p (0) | p (3) | p (2) | c | regs | regs | mau | 5/6/7 | 3 |
| regs | regs | p (3) | d/e/f | p (0) | p (1) | p (2) | 8 | regs | regs | mau | 5/6/7 | 2 |

0-3-1

| regs | regs | alu | 5/6/7 | p (2) | p (1) | p (3) | c | p (0) | regs | mau | 1/2/3 | 2 |
|---|---|---|---|---|---|---|---|---|---|---|---|---|
| regs | regs | alu | 5/6/7 | p (0) | p (3) | p (2) | c | regs | p (1) | mau | 1/2/3 | 3 |
| regs | regs | alu | 5/6/7 | p (0) | p (1) | p (2) | 8 | regs | regs | p (3) | d/e/f | 2 |

2-2-0

| p (0) | p (3) | alu | 4 | p (2) | p (1) | bmu | 4 | regs | regs | mau | 5/6/7 | 0 |
|---|---|---|---|---|---|---|---|---|---|---|---|---|
| p (2) | p (1) | alu | 4 | p (0) | p (3) | bmu | 4 | regs | regs | mau | 5/6/7 | 3 |
| p (0) | p (3) | alu | 4 | regs | p (1) | p (2) | 9/a/b | regs | regs | mau | 5/6/7 | 0 |
| p (2) | p (1) | alu | 5 | p (0) | regs | p (3) | 9/a/b | regs | regs | mau | 5/6/7 | 3 |
| p (0) | regs | p (3) | 9/a/b | p (2) | p (1) | bmu | 4 | regs | regs | mau | 5/6/7 | 0 |
| regs | p (1) | p (2) | 9/a/b | p (0) | p (3) | bmu | 4 | regs | regs | mau | 5/6/7 | 3 |
| p (0) | regs | p (3) | 9/a/b | regs | p (1) | p (2) | 9/a/b | regs | regs | mau | 5/6/7 | 0 |
| regs | p (1) | p (2) | 9/a/b | p (0) | regs | p (3) | 9/a/b | regs | regs | mau | 5/6/7 | 3 |

2-0-2

| p (2) | p (1) | alu | 4 | regs | regs | bmu | 5/6/7 | p (0) | p (3) | mau | 4 | 1 |
|---|---|---|---|---|---|---|---|---|---|---|---|---|
| p (2) | p (1) | alu | 4 | regs | regs | bmu | 5/6/7 | p (0) | regs | p (3) | 9/a/b | 1 |
| regs | p (1) | p (2) | 9/a/b | regs | regs | bmu | 5/6/7 | p (0) | p (3) | mau | 4 | 1 |
| regs | p (1) | p (2) | 9/a/b | regs | regs | bmu | 5/6/7 | p (0) | regs | p (3) | 9/a/b | 1 |

0-2-2

| regs | regs | alu | 5/6/7 | p (2) | p (1) | bmu | 4 | p (0) | p (3) | mau | 4 | 2 |
|---|---|---|---|---|---|---|---|---|---|---|---|---|
| regs | regs | alu | 5/6/7 | p (0) | p (3) | bmu | 4 | p (2) | p (1) | mau | 4 | 3 |
| regs | regs | alu | 5/6/7 | p (2) | p (1) | bmu | 4 | p (0) | regs | p (3) | 9/a/b | 2 |
| regs | regs | alu | 5/6/7 | p (0) | p (3) | bmu | 4 | regs | p (1) | p (2) | 9/a/b | 3 |
| regs | regs | alu | 5/6/7 | regs | p (1) | p (2) | 9/a/b | p (0) | p (3) | mau | 4 | 2 |
| regs | regs | alu | 5/6/7 | regs | p (1) | p (2) | 9/a/b | p (0) | regs | p (3) | 9/a/b | 2 |
| regs | regs | alu | 5/6/7 | p (0) | regs | p (3) | 9/a/b | p (2) | p (1) | mau | 4 | 3 |
| regs | regs | alu | 5/6/7 | p (0) | regs | p (3) | 9/a/b | regs | p (1) | p (2) | 9/a/b | 3 |

2-1-1

| p (2) | p (3) | alu | 4 | regs | p (1) | bmu | 1/2/3 | p (0) | regs | mau | 1/2/3 | 2 |
|---|---|---|---|---|---|---|---|---|---|---|---|---|
| p (0) | p (3) | alu | 4 | regs | p (1) | bmu | 1/2/3 | p (2) | regs | mau | 1/2/3 | 0 |
| p (0) | p (1) | alu | 0 | p (2) | regs | bmu | 1/2/3 | regs | regs | p (3) | d/e/f | 1 |
| p (2) | p (1) | alu | 4 | regs | regs | p (3) | d/e/f | p (0) | regs | mau | 1/2/3 | 1 |
| p (0) | p (1) | alu | 0 | regs | regs | p (2) | d/e/f | regs | regs | p (3) | d/e/f | 0 |
| p (2) | regs | p (3) | 9/a/b | regs | p (1) | bmu | 1/2/3 | p (0) | regs | mau | 1/2/3 | 2 |
| regs | p (1) | p (2) | 9/a/b | regs | regs | p (3) | d/e/f | p (0) | regs | mau | 1/2/3 | 1 |

1-2-1

| regs | p (1) | alu | 1/2/3 | p (2) | p (3) | bmu | 4 | p (0) | regs | mau | 1/2/3 | 1 |
|---|---|---|---|---|---|---|---|---|---|---|---|---|
| regs | p (1) | alu | 1/2/3 | p (0) | p (3) | bmu | 4 | regs | regs | p (2) | d/e/f | 3 |
| regs | regs | p (3) | d/e/f | p (2) | p (1) | bmu | 4 | p (0) | regs | mau | 1/2/3 | 2 |
| regs | regs | p (2) | d/e/f | p (0) | p (1) | bmu | 0 | regs | regs | p (3) | d/e/f | 1 |
| regs | p (1) | alu | 1/2/3 | p (2) | regs | p (3) | 9/a/b | p (0) | regs | mau | 1/2/3 | 1 |
| regs | p (1) | alu | 1/2/3 | p (0) | regs | p (3) | 9/a/b | regs | regs | p (2) | d/e/f | 3 |
| regs | regs | p (2) | d/e/f | p (0) | regs | p (3) | 9/a/b | regs | p (1) | mau | 1/2/3 | 3 |
| p (0) | regs | alu | 1/2/3 | regs | p (1) | p (2) | 9/a/b | regs | p (3) | d/e/f | 0 |
| regs | regs | p (3) | d/e/f | regs | p (1) | p (2) | 9/a/b | p (0) | regs | mau | 1/2/3 | 2 |

1-1-2

| p (0) | regs | alu | 1/2/3 | regs | p (1) | bmu | 1/2/3 | p (2) | p (3) | mau | 4 | 0 |
|---|---|---|---|---|---|---|---|---|---|---|---|---|
| regs | regs | p (3) | d/e/f | regs | regs | p (2) | d/e/f | p (0) | p (1) | mau | 0 | 2 |
| p (0) | regs | alu | 1/2/3 | regs | p (1) | bmu | 1/2/3 | p (2) | regs | p (3) | 9/a/b | 0 |

2.5.2.1.4.4.7 Three Operation - Four Port Assignment Table (Shared Ports)

| ALU | | | | BMU | | | | MAU | | | | ES |
|---|---|---|---|---|---|---|---|---|---|---|---|---|
| In A | In B | Out | Code | In A | In B | Out | Code | In A | In B | Out | Code | Code |
| p (0) | regs | p (3) | 9/a/b | p (0) | p (1) | p (2) | 8 | regs | regs | mau | 5/6/7 | 0 |
| p (0) | p (1) | alu | 0 | p (2) | p (1) | p (3) | c | p (0) | regs | mau | 1/2/3 | 2 |

-continued

2.5.2.1.4.4.7 Three Operation - Four Port Assignment Table (Shared Ports)

| ALU | | | | BMU | | | | MAU | | | | ES |
|---|---|---|---|---|---|---|---|---|---|---|---|---|
| In A | In B | Out | Code | In A | In B | Out | Code | In A | In B | Out | Code | Code |
| regs | p (1) | p (2) | 9/a/b | p (0) | p (1) | bmu | 0 | regs | regs | p (3) | d/e/f | 1 |
| p (0) | p (3) | p (2) | c | p (0) | p (1) | bmu | 0 | regs | regs | mau | 5/6/7 | 0 |
| p (0) | p (1) | p (2) | 8 | p (0) | regs | p (3) | 9/a/b | regs | regs | mau | 5/6/7 | 3 |
| p (2) | p (1) | p (3) | c | regs | regs | bmu | 5/6/7 | p (0) | p (1) | mau | 0 | 1 |
| p (0) | p (1) | p (2) | 8 | regs | regs | bmu | 5/6/7 | p (0) | regs | p (3) | 9/a/b | 1 |
| regs | regs | alu | 5/6/7 | p (0) | p (1) | bmu | 0 | p (0) | p (3) | p (2) | c | 2 |
| regs | regs | alu | 5/6/7 | p (0) | p (1) | bmu | 0 | p (2) | p (1) | p (3) | c | 3 |

15

2.5.2.1.4.4.8 Three Operation—Three Port Assignment Table

The three operation 3 port combinations are as follows:

| 300, 030, 003, 210, 201, 120, 021, 012, 102, 111 | | | | | | | | | | | | |
|---|---|---|---|---|---|---|---|---|---|---|---|---|
| ALU | | | | BMU | | | | MAU | | | | ES |
| In A | In B | Out | Code | In A | In B | Out | Code | In A | In B | Out | Code | Code |
| | | | | | | 3-0-0 | | | | | | |
| p (0) | p (1) | p (2) | 8 | regs | regs | bmu | 5/6/7 | regs | regs | mau | 5/6/7 | 3 |
| | | | | | | 0-3-0 | | | | | | |
| regs | regs | alu | 5/6/7 | p (0) | p (1) | p (2) | 8 | regs | regs | mau | 5/6/7 | 0 |
| | | | | | | 0-0-3 | | | | | | |
| regs | regs | alu | 5/6/7 | regs | regs | bmu | 5/6/7 | p (0) | p (1) | p (2) | 8 | 3 |
| | | | | | | 2-1-0 | | | | | | |
| p (0) | p (1) | alu | 0 | regs | regs | p (2) | d/e/f | regs | regs | mau | 5/6/7 | 0 |
| p (2) | p (1) | alu | 4 | p (0) | regs | bmu | 1/2/3 | regs | regs | mau | 5/6/7 | 3 |
| regs | p (1) | p (2) | 9/a/b | p (0) | regs | bmu | 1/2/3 | regs | regs | mau | 5/6/7 | 3 |
| p (0) | regs | p (2) | 9/a/b | regs | p (1) | bmu | 1/2/3 | regs | regs | mau | 5/6/7 | 0 |
| | | | | | | 2-0-1 | | | | | | |
| p (0) | p (1) | alu | 0 | regs | regs | bmu | 5/6/7 | regs | regs | p (2) | d/e/f | 3 |
| p (2) | p (1) | alu | 4 | regs | regs | bmu | 5/6/7 | p (0) | regs | mau | 1/2/3 | 1 |
| regs | p (1) | p (2) | 9/a/b | regs | regs | bmu | 5/6/7 | p (0) | regs | mau | 1/2/3 | 1 |
| | | | | | | 1-2-0 | | | | | | |
| regs | regs | p (2) | d/e/f | p (0) | p (1) | bmu | 0 | regs | regs | mau | 5/6/7 | 3 |
| p (0) | regs | alu | 1/2/3 | p (2) | p (1) | bmu | 4 | regs | regs | mau | 5/6/7 | 0 |
| p (0) | regs | alu | 1/2/3 | regs | p (1) | p (2) | 9/a/b | regs | regs | mau | 5/6/7 | 0 |
| regs | p (1) | alu | 1/2/3 | p (0) | regs | p (2) | 9/a/b | regs | regs | mau | 5/6/7 | 3 |
| | | | | | | 0-2-1 | | | | | | |
| regs | regs | alu | 5/6/7 | p (0) | p (1) | bmu | 0 | regs | regs | p (2) | d/e/f | 2 |
| regs | regs | alu | 5/6/7 | p (2) | p (1) | bmu | 4 | p (0) | regs | mau | 1/2/3 | 2 |
| regs | regs | alu | 5/6/7 | regs | p (1) | p (2) | 9/a/b | p (0) | regs | mau | 1/2/3 | 2 |
| regs | regs | alu | 5/6/7 | p (0) | regs | p (2) | 9/a/b | regs | p (1) | mau | 1/2/3 | 3 |
| | | | | | | 0-1-2 | | | | | | |
| regs | regs | alu | 5/6/7 | regs | regs | p (2) | d/e/f | p (0) | p (1) | mau | 0 | 0 |
| regs | regs | alu | 5/6/7 | p (0) | regs | bmu | 1/2/3 | p (2) | p (1) | mau | 4 | 3 |
| regs | regs | alu | 5/6/7 | p (0) | regs | bmu | 1/2/3 | regs | p (1) | p (2) | 9/a/b | 3 |
| regs | regs | alu | 5/6/7 | p (0) | regs | bmu | 1/2/3 | p (0) | regs | p (2) | 9/a/b | 2 |
| | | | | | | 1-0-2 | | | | | | |
| regs | regs | p (2) | d/e/f | regs | regs | bmu | 5/6/7 | p (0) | p (1) | mau | 0 | 2 |
| p (2) | regs | alu | 1/2/3 | regs | regs | bmu | 5/6/7 | p (0) | p (1) | mau | 0 | 2 |
| regs | p (1) | alu | 1/2/3 | regs | regs | bmu | 5/6/7 | p (0) | regs | p (2) | 9/a/b | 1 |
| regs | p (1) | alu | 1/2/3 | regs | regs | bmu | 5/6/7 | p (0) | regs | p (2) | 9/a/b | 1 |
| | | | | | | 1-1-1 | | | | | | |
| p (0) | regs | alu | 1/2/3 | regs | p (1) | bmu | 1/2/3 | regs | regs | p (2) | d/e/f | 0 |
| p (0) | regs | alu | 1/2/3 | regs | p (1) | bmu | 1/2/3 | p (2) | regs | mau | 1/2/3 | 0 |
| regs | p (1) | alu | 1/2/3 | regs | regs | p (2) | d/e/f | p (0) | regs | mau | 1/2/3 | 1 |
| regs | p (1) | alu | 1/2/3 | p (2) | regs | bmu | 1/2/3 | p (0) | regs | mau | 1/2/3 | 1 |

-continued 300, 030, 003, 210, 201, 120, 021, 012, 102, 111

| ALU | | | | BMU | | | | MAU | | | | ES |
|---|---|---|---|---|---|---|---|---|---|---|---|---|
| In A | In B | Out | Code | In A | In B | Out | Code | In A | In B | Out | Code | Code |
| regs | p (1) | alu | 1/2/3 | p (0) | regs | bmu | 1/2/3 | regs | regs | p (2) | d/e/f | 3 |
| p (0) | regs | alu | 1/2/3 | regs | p (1) | bmu | 1/2/3 | p (2) | regs | mau | 1/2/3 | 0 |
| regs | p (1) | alu | 1/2/3 | regs | regs | p (2) | d/e/f | p (0) | regs | mau | 1/2/3 | 1 |
| regs | p (1) | alu | 1/2/3 | p (2) | regs | bmu | 1/2/3 | p (0) | regs | mau | 1/2/3 | 1 |
| regs | regs | p (2) | d/e/f | p (0) | regs | bmu | 1/2/3 | regs | p (1) | mau | 1/2/3 | 3 |
| regs | regs | p (2) | d/e/f | regs | p (1) | bmu | 1/2/3 | p (0) | regs | mau | 1/2/3 | 2 |
| regs | regs | p (2) | d/e/f | regs | p (1) | bmu | 1/2/3 | p (0) | regs | mau | 1/2/3 | 2 |
| p (2) | regs | alu | 1/2/3 | regs | p (1) | bmu | 1/2/3 | p (0) | regs | mau | 1/2/3 | 2 |

2.6 Addressing
2.6.1 Instruction

In this architecture, program and data memory share the same memory space. Program memory hierarchy is built on the concept of pages. Pages are 64K Dwords (32 bit word) in size. Each MPU can directly address program memory locations automatically (ie, without any program intervention) through the least significant word (lower 16 bits) of the Program Counter (PC) within a 64 KDword (32 bit word) page of memory. To address a program memory location that is off page, program intervention is required, viz, the next most significant 8 bits of the PC must be loaded. Pages are relocatable in the 64 MByte UMP address space. This is the current implementation of the UMP. In subsequent implementations the addressable range may expand to 4 GB.

The MPU instruction space is also addressed by the Link Register (LR). The Link Register is used for subroutine returns and hardware-loop returns. The operation of these registers is explained in detail in the section on program execution.

2.6.2 Data

Data memory hierarchy is also built on the concept of 64K Dword pages and the concept of 32 Dword blocks. Sequential access to the local memory spaces is within a 64 word directly addressed block if it is to a four-port memory space or within a 256 word sequentially addressed block if it is to a single or multi-port memory space. Page data memory address's are effectively the concatenation of the least significant 8, 10 or 11 bits of the memory pointers for each access, with the 5 bit direct addresses. Move instructions can set the memory pointers. Pages are relocatable in a 64 MByte UMP address space.

2.6.2.1 Addressing Modes

All Data addressing in computational instructions is done through four fields in the least significant 20 bits of the instruction word. A maximum of four independent memory accesses are allowed per computational instruction. There may be another memory access if there is a concurrent move instruction also being executed. These may be read or write accesses. The four fields may specify either pointer concatenated direct addresses or indirect addresses, depending on the addressing mode for that field.

2.6.2.1.1 Pointer Direct Addressing

In pointer direct addressing, the address of each memory access is formed by concatenating the most significant bits of a memory pointer with the 5 bit direct address specified in the appropriate instruction field.

2.6.2.1.2 Pointer Indirect Addressing

In pointer indirect addressing, the memory pointer is directly used to address the operands.

2.6.2.1.3 Pointer Indirect Addressing with Post-Modify

In pointer indirect addressing with post-modify, the operand is addressed through the memory pointer and the memory pointer is modified after the access by adding the value in the specified index register to it.

2.6.2.1.4 Circular Addressing

In circular addressing, one of the memory accesses can be either a read from or a write to, a circular buffer maintained in local memory. The address pointer wraps around on sequential reads or writes.

2.6.2.1.5 FIFO Addressing

In FIFO addressing, one of the memory accesses can be either a read from or a write to, a FIFO that is maintained in local memory. FIFO flags can be used as condition codes for program branches.

2.6.2.1.6 Bit Reversed Addressing

Bit reversed addressing is useful for implementing FFT's.

2.7 Program Execution
2.7.1 Pipeline Operation

The MPU's implement a classic RISC pipeline for instruction execution. In its most basic form, its a four phase pipeline. The four phases of the MPU pipeline are:

| | |
|---|---|
| • IF | -Instruction Fetch and Preliminary Decode |
| • OF | -Operand Fetch and Primary Decode |
| • EX | -Execute |
| • WB | -Write Back |

| | Clock m | Clock m+1 | Clock m+2 | Clock m+3 |
|---|---|---|---|---|
| Instr.n | IF | OF | EX | WB |
| Instr. n+1 | | IF | OF | EX |
| Instr. n+2 | | | IF | OF |
| Instr. n+3 | | | | IF |

The EXECUTE part (EX) of the pipeline can be extended over multiple clocks, depending on the complexity of the operation. For example, a multiply operation would take two clock cycles to execute, whereas, an alu or shift operation would take only one clock cycle to execute. Pipelined consecutive multiply accumulates would produce a result every clock cycle, but the execution latency would be two clock cycles. Three computational operations can be started every clock cycle. The multiplier latency is maintained by the assembler, in that a non-multiply operation using the multiplier may not be started in the instruction following a multiply. On the other hand, successive multiply-accumulate instructions are allowed.

2.7.1.1 Description of Phases
2.7.1.1.1 Instruction Fetch Phase (IF)

MPUs fetch two instructions in the same clock cycle (for a super-scalar two issue pipeline.) Both instructions are simultaneously dispatched for execution depending on the type of the instruction and availability of resources. Resources include execution units and memory access cycles. There can only be five local memory accesses in any one clock cycle. Four of these accesses are to the four port memory while the fifth one can be to either the local single port memory or to an external memory location. Most Branch instructions can be executed in parallel with computational instructions. Instructions that cannot be executed in parallel are held till the next decode phase. There is only a two instruction buffer in each MPU (for two issue super-scalar operation), i.e., the MPU can only look ahead two instructions. Speculative fetching of branch target instructions is also performed, which, as is shown in the section on branching, greatly improves processor performance. In the IF phase a preliminary decode of the instruction is done, such as determining the instruction type, ie computational or non-computational, etc.

2.7.1.1.2 Operand Fetch and Decode Phase (OF)

Data integrity over consecutive instruction writes and operand fetches from the same location is maintained by assembler or compiler (software) pipelining of the write-back data. Computational instructions can fetch up to four memory operands in each phase. Since only four memory accesses can be made by a computational instruction in one cycle, writes from previous instructions have priority over reads from the current instruction. When such a contention is encountered, the MPU is stalled until the the next cycle. Instruction decode is accomplished through direct decode of the opcode and type bits in the instruction word, and indirect decode through the dictionaries.

2.7.1.1.3 Execute Phase (EX)

During the execute phase, the address computations with the index registers and the execution unit operations are performed. Results from the current execute phase are available to the next instruction's execute phase through the alu, mau and bmu output registers and to the execute phase after that through the alureg, bmureg and maureg output registers.

2.7.1.1.4 Writeback Phase(WB)

In the writeback phase, the results of the operations are written to memory. Write memory accesses always have priority over reads.

2.7.1.2 Branch Instructions

In this section we will deal in detail with all the pipelining issues associated with program flow instructions. Each step of the pipeline alongwith all that is happening will be explained.

Note: What follows are details for a single issue pipeline only.

2.7.1.2.1 Unconditional Direct Branch
goto long__direct__address;

| Phase | Operations |
|---|---|
| IF | preliminary decode;<br>PC (15:0) = 16 bits of immediate long address in instruction; |
| OF | null; |
| EX | null; |
| WB | null; |

2.7.1.2.2 Conditional Direct Branch
if (condition) goto long__direct__address;

| Phase | Operations |
|---|---|
| IF | preliminary decode;<br>conditional__direct__goto__flag = .TRUE.;<br>if (prediction__bit)<br>  PC (15:0) = 16 bits of immediate long address in instruction;<br>  PC__Buffer = PC + 1;<br>else<br>  PC = PC + 1;<br>  PC__Buffer = 16 bits of immediate long address in instruction; |
| OF | if (conditional__direct__goto__flag)<br>  if (condition .xor.prediction)<br>    PC = PC__Buffer;<br>    IF = .NULL.; (nullify current (wrong) instruction fetch) |
| EX | null; |
| WB | null; |

2.7.1.2.3 Unconditional In-Direct Branch
goto @memn[five__bit__address]; // any of mem0,mem1, mem2,mem3 allowed
goto @mem[short__address];

| Phase | Operations |
|---|---|
| IF | preliminary decode;<br>indirect__goto__flag = .TRUE; |
| OF | if (indirect__goto__flag)<br>  fetch operand;<br>  PC = operand;<br>  IF = .NULL.; nullify current (wrong) instruction fetch) |
| EX | null; |
| WB | null; |

2.7.1.2.4 Conditional In-Direct Branch
if (condition) goto @memn[five__bit__address]; // mem0, mem1,mem2,mem3
if (condition) goto @mem[short__address];

| Phase | Operations |
|---|---|
| IF | preliminary decode;<br>conditional__indirect__goto__flag = .TRUE.;<br>PC = PC + 1; |
| OF | if (conditional__indirect__goto__flag)<br>  fetch operand;<br>  if (condition) then<br>    PC = operand;<br>    IF = .NULL.; |
| EX | null; |
| WB | null; |

2.7.1.2.5 Unconditional Direct Subroutine Branch
call long__direct__address;

| Phase | Operations |
|---|---|
| IF | preliminary decode;<br>if (count__valid__flag) // always valid except when immediately<br>  direct__call__flag = .TRUE.; // following an indirect "for" instruction<br>  if (for__count != 0)<br>    TOS (31) = .TRUE.;<br>  else<br>    TOS (31) = .FALSE.; |

-continued

| Phase | Operations |
|---|---|
| | if (for_loop_flag && (for_end_addr = = PC (6:0)) && (for_count != 0)) |
| |    TOS (30:0) = LNK; |
| | else |
| |    TOS (30:0) = PC + 1; |
| |    for_loop_flag = .FALSE.; |
| | PC = immediate long address in instruction; |
| | SP = SP − 1; |
| | tos_valid_flag = .TRUE. |
| | else               // previous instruction was an indirect "for" |
| | IF = .NULL;    // nullify instruction fetch |
| OF | if (direct_call_flag && IF != .NULL.) |
| | (SP) = TOS; // TOS is Top Of Stack cache register |
| EX | null; |
| WB | null; |

2.7.1.2.6 Conditional Direct Subroutine Branch
if (condition) call long_direct_address;

| Phase | Operations |
|---|---|
| IF | preliminary decode; |
| | if (count_valid_flag) |
| |   conditional_direct_call_flag = .TRUE.; |
| |   if (prediction_bit)             // branch likely |
| |     prediction_flag = .TRUE.; |
| |     if (for_loop_flag && (for_end_addr = = PC (6:0))) |
| |       if (for_count != 0) |
| |         TOS (31) = .TRUE.; |
| |         TOS (30:0) = LNK; |
| |         PC_Buffer (31) = .TRUE.; |
| |         PC_Buffer (30:0) = LNK; |
| |       else |
| |         TOS (31) = .FALSE.; |
| |         TOS (30:0) = PC + 1; |
| |         PC_Buffer (31) = .FALSE.; |
| |         PC_Buffer (30:0) = PC + 1; |
| |     else |
| |       TOS (31) = for_loop_flag; |
| |       TOS (30:0) = PC + 1; |
| |       PC_Buffer (31) = for_loop_flag; |
| |       PC_Buffer (30:0) = PC + 1; |
| |     PC = immediate long address in instruction; |
| |     SP = SP − 1; |
| |     tos_valid_flag = .TRUE. |
| |     for_loop_flag = .FALSE.; |
| |   else                 // branch unlikely |
| |     prediction_flag = .FALSE.; |
| |     if (for_loop_flag && (for_end_addr = = PC (6:0))) |
| |       if (for_count != 0) |
| |         PC (30:0) = LNK; |
| |       else |
| |         PC (30:0) = PC + 1; |
| |     else |
| |       PC (30:0) = PC + 1; |
| |     PC_Buffer (31) = .FALSE.; |
| |     PC_Buffer (30:0) = immediate long address in instruction; |
| | else IF = .NULL.; |
| OF | if (conditional_direct_call_flag && IF != .NULL.) |
| |   if (prediction_flag) |
| |     (SP) = TOS; |
| |     if (!condition) |
| |       pop_flag = .TRUE.; |
| |       SP = SP + 1; |
| |       tos_valid_flag = .FALSE.; |
| |   else |
| |     if (condition) |
| |       TOS (31) = for_loop_flag; |
| |       TOS (30:0) = PC; |
| |       push_flag = .TRUE.; |
| |       SP = SP − 1; |
| |       tos_valid_flag = .TRUE.; |
| | if (condition .xor.prediction_flag)    // incorrectly predicted |

-continued

| Phase | Operations |
|---|---|
| |     PC = PC_Buffer; |
| |     for_loop_flag = PC_Buffer (31); |
| |     IF = .NULL;    // nullify current (wrong) instruction fetch |
| EX | if (pop_flag) |
| |   TOS = (SP); |
| |   pop_flag = .FALSE.; |
| |   tos_valid_flag = .TRUE.; |
| | if (push_flag) |
| |   (SP) = TOS; |
| |   push flag = .FALSE.; |
| WB | null; |

2.7.1.2.7 Unconditional In-direct Subroutine Branch
call @memn[five_bit_address]; // any of mem0,mem1, mem2,mem3 allowed
call @mem[short_address];

| Phase | Operations |
|---|---|
| IF | preliminary decode; |
| | if (count_valid_flag) |
| |   in-direct_call_flag .TRUE.; |
| |   if (for_count != 0) |
| |     TOS (31) = .TRUE.; |
| |   else |
| |     TOS (31) = .FALSE.; |
| |   if (for_loop_flag && (for_end_addr = = PC (6:0)) && (for_count != 0)) |
| |     TOS (30:0) = LNK; |
| |   else |
| |     TOS (30:0) = PC + 1; |
| |     for_loop_flag = .FALSE.; |
| |   SP = SP − 1; |
| |   tos_valid_flag = .TRUE.; |
| | else |
| |   IF = .NULL.; |
| OF | if (indirect_call_flag && IF != .NULL.) |
| |   fetch operand; |
| |   (SP) = TOS; |
| |   PC = operand;    // operand has branch address |
| |   IF = .NULL.; (nullify current (wrong) instruction fetch) |
| EX | null; |
| WB | null; |

2.7.1.2.8 Conditional In-direct Subroutine Branch
if (condition) call @memn[five_bit_address]; // mem0, mem1,mem2,mem3
if (condition) call @mem[short_address];

| Phase | Operations |
|---|---|
| IF | preliminary decode; |
| | if (count_valid_flag) |
| |   conditional_indirect_call_flag = .TRUE.; |
| |   if (prediction_bit)             // branch likely |
| |     prediction_flag = .TRUE.; |
| |     if (for_loop_flag && (for_end_addr = = PC (6:0))) |
| |       if (for_count != 0) |
| |         TOS (31) = .TRUE.; |
| |         TOS (30:0) = LNK; |
| |         PC_Buffer (31) = .TRUE.; |
| |         PC = LNK; |
| |       else |
| |         TOS (31) = .FALSE.; |
| |         TOS (30:0) = PC + 1; |
| |         PC_Buffer (31) = .FALSE.; |
| |         PC = PC + 1; |

| Phase | Operations |
|---|---|
| | else |
| |     TOS (31) = for_loop_flag; |
| |     TOS (30:0) = PC + 1; |
| |     PC_Buffer (31) = for_loop_flag; |
| |     PC = PC + 1; |
| |     SP = SP − 1; |
| |     tos_valid_flag = .TRUE.; |
| |     for_loop_flag = .FALSE.; |
| | else    // branch unlikely |
| |     prediction_flag = .FALSE.; |
| |     if (for_loop_flag && (for_end_addr = = PC (6:0))) |
| |       if(for_count != 0) |
| |         PC (30:0) = LNK; |
| |       else |
| |         PC (30:0) = PC + 1; |
| |     else |
| |       PC (30:0) = PC + 1; |
| |     PC_Buffer (31) = .FALSE.; |
| | else |
| |     IF = .NULL.; |
| OF | if (conditional_indirect_call flag && IF != .NULL.) |
| |     fetch operand; |
| |     if (prediction_flag) |
| |       (SP) = TOS; |
| |       if (!condition) |
| |         pop_flag = .TRUE.; |
| |         SP = SP + 1; |
| |         tos_valid_flag = .FALSE.; |
| |     else |
| |       if (condition) |
| |         TOS (31) = for_loop_flag; |
| |         TOS (30:0) = PC (30:0); |
| |         push_flag = .TRUE.; |
| |         SP = SP − 1; |
| |         tos_valid_flag = .TRUE.; |
| |       if (condition) |
| |         PC = operand; |
| |       if (condition .xor.prediction_flag) |
| |         for_loop_flag = PC_Buffer (31); |
| |         IF = .NULL.;  // nullify current (wrong) instruction |
| |         fetch to fix TOS |
| EX | if (pop_flag) |
| |     TOS = (SP); |
| |     pop_flag = .FALSE.; |
| |     tos_valid_flag = .TRUE.; |
| | if (push_flag) |
| |     (SP) = TOS; |
| |     push_flag = .FALSE.; |
| WB | null; |

2.7.1.2.9 Unconditional Return return;

| Phase | Operations |
|---|---|
| IF | preliminary decode; |
| | return_flag = .TRUE. |
| | if (tos_valid_flag) |
| |     PC = TOS; |
| |     for_loop_flag = TOS (31); |
| | else |
| |     PC = operand;  // from stack |
| |     for_loop_flag = operand (31); |
| |     tos_valid_flag = .FALSE.; |
| |     SP = SP + 1; |
| OF | if (return_flag) |
| |     TOS = (SP); |
| |     tos_valid_flag = .TRUE.; |
| EX | null; |
| WB | null; |

2.7.1.2.10 Conditional Return if (condition) return;

| Phase | Operations |
|---|---|
| IF | preliminary decode; |
| | conditional_return_flag = .TRUE.; |
| | if (prediction_bit) |
| |     prediction_flag = .TRUE.; |
| |     PC_Buffer (31) = for_loop_flag; |
| |     PC_Buffer (30:0) = PC (30:0) + 1; |
| |     if (tos_valid_flag) |
| |       PC = TOS; |
| |       for_loop_flag = TOS (31); |
| |     else |
| |       PC = operand;  // from stack |
| |       for_loop_flag = operand (31); |
| |       tos_valid_flag = .FALSE.; |
| |       SP = SP + 1; |
| | else |
| |     prediction_flag = .FALSE.; |
| |     PC = PC + 1; |
| |     if (tos_valid_flag) |
| |       PC_Buffer = TOS; |
| |     else |
| |       PC_Buffer = operand;  // from stack |
| OF | if (conditional_return_flag) |
| |     if (condition .xor.prediction) |
| |       PC = PC_Buffer; |
| |       for_loop_flag = PC_Buffer (31); |
| |       IF = .NULL.;  // nullify current (wrong) instruction fetch |
| |     if (prediction_flag) |
| |       fetch (SP); |
| |       if (!condition) |
| |         SP = SP −1; |
| |         tos_valid_flag = .TRUE.; // always set true, although IF overrides setting |
| |       else |
| |         TOS = (SP); |
| |     else |
| |       if (condition) |
| |         SP = SP +1; |
| |         tos_valid_flag = .FALSE; |
| |         pop_flag = .TRUE.; |
| EX | if (pop_flag) |
| |     TOS = (SP); |
| |     tos_valid_flag = .TRUE.; |
| |     pop_flag = .FALSE; |
| WB | null; |

2.7.1.3 Loop Instructions
2.7.1.3.1 Direct Loop for (n) // where 0>n<=256

| Phase | Operations |
|---|---|
| IF | preliminary decode; |
| | for_direct_flag = .TRUE.; |
| | TOS (31) = for_loop_flag; |
| | TOS (30:24) = for_end_addr; |
| | if(!count_valid_flag) |
| |     TOS (23:16) = operand; //loop count from memory, previous loop is indirect |
| | else |
| |     TOS (23:16) = for_count; |
| | TOS (15:0) = LNK; |
| | tos_valid_flag = .TRUE. |
| | for_end_addr = 7 lsbs of immediate end address in instruction word; |
| | for_count = 8 bits of immediate (loop_count − 1) in instruction word; |
| | for_loop_flag = .TRUE.; |
| | count_valid_flag = .TRUE.; |
| | LNK = PC = PC + 1; |
| | SP = SP − 1; |

| Phase | Operations |
|---|---|
| OF | if (for_direct_flag)<br>  (SP) = TOS; |
| EX | null; |
| WB | null; |

2.7.1.3.2 Indirect Loop for @memn[five_bit_address]; // mem0,mem1,mem2, mem3
for @mem[short_address];

| Phase | Operations |
|---|---|
| IF | preliminary decode;<br>for_indirect_flag = .TRUE.,<br>TOS (31) = for_loop_flag;<br>TOS (30:24) = for_end_addr;<br>if (!count_valid_flag)<br>  TOS (23:16) = for_count_operand; // from memory, previous loop is indirect<br>else<br>  TOS (23:16) = for_count;<br>TOS (15:0) = LNK;<br>tos_valid_flag = .TRUE.<br>for_end_addr = 7 lsbs of immediate end address in instruction word;<br>for_loop_flag = .TRUE.;<br>count_valid_flag = .FALSE.;<br>LNK = PC = PC + 1;<br>SP = SP – 1; |
| OF | if (for_indirect_flag)<br>  fetch operand;<br>  for_count = 8 bits of immediate (loop_count - 1) in operand;<br>  count_valid_flag = .TRUE.;<br>  (SP) = TOS; |
| EX | null; |
| WB | null; |

2.7.1.3.3 Loop operation

The following loop pipeline is only a template of loop operation. Pipeline register assignments specifically described for various other instructions will always override the assignments shown below. In the case of the SP, assignments in the other instructions would nullify (if opposing) the ones below.

| Phase | Operations |
|---|---|
| IF | if (for_loop_flag)<br>  if (for_end_addr = = PC (6:0))<br>    if (count_valid_flag)<br>      if (for_count != 0)<br>        PC = LNK;<br>        for_count = for_count - 1;<br>        for_loop_flag = .TRUE.;<br>      else<br>        if (!tos_valid_flag)<br>          for_loop_flag = operand (31); // operand fetched from stack<br>          for_end_addr = operand (30:24);<br>          for_count = operand (23:16);<br>          LNK = operand (15:0);<br>        else<br>          for_loop_flag = TOS (31);<br>          for_end_addr = TOS (30:24);<br>          for_count = TOS (23:16);<br>          LNK = TOS (15:0);<br>        PC = PC + 1; |

| Phase | Operations |
|---|---|
| |     SP = SP + 1;<br>    pop_flag = .TRUE.<br>    tos_valid_flag = .FALSE.;<br>  else<br>    PC = PC;<br>    IF = .NULL.; // nullify current instruction fetch<br>    and repeat<br>  else<br>    PC = PC + 1;<br>else<br>  PC = PC + 1; |
| OF | if (pop_flag)<br>  TOS = (SP);<br>  pop_flag = .FALSE.;<br>  tos_valid_flag = .TRUE; |

2.7.1.4 Move Instructions

2.7.1.4.1 Immediate Data Move memn[five_bit_address].w=sixteen_bit_immediate_data; // n=0,1,2,3
mem[short_address].w=sixteen_bit_immediate_data; w=0,1

| Phase | Operations |
|---|---|
| IF | preliminary decode;<br>PC = PC + 1; |
| OF | if (INSTR (25:24) = 10)<br>  wr_flag = .FALSE.;<br>else<br>  wr_flag = .TRUE.;<br>if (INSTR (25:22) = 00x1)<br>  MV_Buffer (31:15) = INSTR (23); // sign bit<br>  MV_Buffer (14:0) = INSTR (14:0);<br>else if (INSTR (24) = 0)<br>  MV_Buffer (31:16) = MV_Buffer;<br>  MV_Buffer (15:0) = INSTR (23) (14:0);<br>else if (INSTR (24) = 1)<br>  MV_Buffer (31:16) = INSTR (23) (14:0);<br>  MV_Buffer (15:0) = MV_Buffer;<br>if (pointer_direct_write) // offset = 00h<br>  P3WR_ABuffer (7:0) = memη (7:0);<br>  if (post_index     // memη (30) = 1<br>    memη = memη + im; // offset = 1Ch (ηi0), 1Dh (ηi1), 1Eh (ηi2), 1Fh (ηi3)<br>else if (pointer_offset_write)<br>  P3WR_ABuffer (7:5) = memη (7:5);<br>  P3WR_ABuffer (4:0) = INSTR (19:15); // 5 LSB short address (offset)<br>else if (short_direct_write)<br>  P3WR_ABuffer (6:0) = INSTR (21:15);<br>  P3WR_ABuffer (7) = "0"; |
| EX | if (pointer_direct_write && wr_flag) // offset = 00h<br>  (memη (29:8) P3WR_ABuffer (7:0)) = MV_Buffer;<br>else if pointer_offset_write && wr_flag)<br>  (memη (29:8) P3WR_ABuffer (7:0)) = MV_Buffer;<br>else if (short_direct_write && wr_flag)<br>  (P3WR_ABuffer (7:0) + base = MV_Buffer. |
| WB | null; |

2.7.1.4.2 Direct Address Move with Immediate Burst Length memn[five_bit_address]=ten_bit_direct_address; // single transfer
ten_bit_direct_address=memn[five_bit_address], 27; // burst 27

| Phase | Operations |
|---|---|
| IF | preliminary decode;<br>if (dma_length = 0 \| (dma_length = 1 && dma_indirect_flag)<br>    dma_indirect_flag = .FALSE.;<br>    dma_rd_flag = .TRUE.;<br>    dma_length = INSTR (14:10); // immediate burst length<br>    from instruction<br>    length_valid_flag = .TRUE.;<br>    PC = PC + 1;<br>else<br>    IF = .NULL.; |
| OF | null; |
| EX | null; |
| WB | null; |

2.7.1.4.3 Direct Address Move with Indirect Burst Length memn[five_bit_address]=ten_bit_immediate_address, mem0[offset];
ten_bit_immediate_address=memn[five_bit_address], mem0[offset];

| Phase | Operations |
|---|---|
| IF | preliminary decode;<br>if (dma_length = 0 \| (dma_length = 1 && dma_indirect_flag))<br>    dma_rd_flag = .TRUE.;<br>    length_valid_flag = .FALSE.;<br>    PC = PC + 1;<br>else<br>    IF = .NULL.; |
| OF | fetch operand (burst length);<br>dma_indirect_flag = .TRUE.;<br>dma_length = operand (4:0); // burst_length - 1<br>length_valid_flag = .TRUE.; |
| EX | null; |
| WB | null; |

2.7.1.4.4 MPU DMA Operation

| Phase | Operations |
|---|---|
| OF | if (dma_rd_flag)<br>    if (dma_indirect_flag && (dma_length = 0 &&<br>    length_valid_flag))<br>        dma_wr_flag = .FALSE.;<br>    else<br>        if (long_direct_address to short_address) // direct or<br>        indirect short address<br>            Mv_Buffer = (ten_bit_long_direct_address + base);<br>        else<br>            MV_Buffer = (memη);<br>    if (pointer_direct_write) // offset = 00h, 1Ch, 1Dh,<br>    1Eh, 1Fh<br>        P3WR_ABuffer (7:0) = memη (7:0);   // offset = 00h<br>    else if (pointer_offset_write)<br>        P3WR_ABuffer (7:5) = memη (7:5);<br>        P3WR_ABuffer (4:0) = INSTR (19:15); // 5 LSB short<br>        address (offset)<br>    else if (short_direct_write)<br>        P3WR_ABuffer (6:0) = INSTR (21:15);<br>        P3WR_ABuffer (7) = "0";<br>    else if (long_direct_write)<br>        if (first_transfer)<br>            P3WR_ABuffer (7:0) = INSTR (7:0);<br>        else<br>            P3WR_ABuffer (7:0) =<br>            LADR_ABuffer (7:0);<br>    dma_wr_flag = .TRUE.;<br>    if (post_index)   // memη (30) = 1, offset = 1Ch (ηi0),<br>    1Dh (ηi1), |

| Phase | Operations |
|---|---|
| | memη = memη + im; //     1Eh (ηi2), 1Fh (ηi3)<br>if (first_transfer) then<br>    LADR_ABuffer (9:0) = ten_bit_long_direct_<br>    address + 1;<br>else<br>    LADR_ABuffer (9:0) = LADR_ABuffer (9:0) + 1;<br>if ((dma_length = 0 && (.NOT.dma_indirect_flag))\|<br>(dma_indirect_flag && dma_length = 1))<br>    dma_rd_flag = .FALSE.;<br>else<br>    dma_rd_flag = .TRUE.;<br>if (dma_length != 0)<br>    dma_length = dma_length - 1; // assignment is overridden<br>    by move instr. |
| EX | if(dma_wr_flag)<br>    if (pointer_direct_write) // offset = 00h<br>        (memη (29:8) P3WR_ABuffer (7:0)) = MV_Buffer;<br>    else if (pointer_offset_write)<br>        (memη (29:8) P3WR_ABuffer (7:0)) = MV_Buffer;<br>    else if (short_direct_write)<br>        (P3WR_ABuffer (7:0) + base) = MV_Buffer;<br>    else if (long_direct_write)<br>        (LADR_ABuffer (9:8) P3WR_ABuffer (7:0) + base)<br>        = MV_Buffer;<br>dma_wr_flag = .FALSE.; // always set false, although OF<br>overrides setting |

2.7.1.5 Miscellaneous Instructions
2.7.1.5.1 No-operation

;

| Phase | Operations |
|---|---|
| IF | preliminary decode; |
| OF | null; |
| EX | null; |
| WB | null; |

2.7.1.6 Computational Instructions
2.7.1.6.1 Non multiply instruction mem0 [0x23] = alu & mem0 [mask],
bmu = bmu << 16;

| Phase | Operations |
|---|---|
| IF | preliminary decode;<br>PC = PC + 1; |
| OF | fetch operands;<br>if (post_index_memη && read_from_memη &&<br>!immediate_value)<br>    memη = memη + im;<br>read dictionaries;<br>decode dictionary entries; |
| EX | perform computational operations;<br>if (mau_operation)<br>    MAU = result of operation;<br>if (alu_operation)<br>    ALU = result of operation;<br>if (bmu_operation)<br>    BMU = result of operation;<br>if (agu_operation)<br>    MEMη = MEMη + im; |
| WB | if (output != (MAU, ALU or BMU registers)<br>    write appropriate output register to memory; |

-continued

```
mem0 [0x23] = alu & mem0 [mask],
bmu = bmu << 16;
Phase      Operations if (post_index_memη && write_to_memη)
              memη = memη + im;
```

2.7.1.6.2 Multiply instruction

```
mau = alu * mem0 [mask];
Phase  Operations

IF     preliminary decode;
       PC = PC + 1;
OF     fetch operands;
       read dictionaries;
       decode dictionary entries;
EX1    perform carry-save addition of multiply operation;
       mau_carry = carry output of carry-save addition;
       mau_save = save output of carry-save addition;
EX2    if (mau_operation)
           MAU = mau_carry + mau_save; (carry propagate addition)
WB     if (output != (MAU, ALU or BMU registers)
           write appropriate output register to memory;
```

2.7.1.7 Interrupt Handling
2.7.2 Branching and Looping

Speculative fetching of branch target instructions allows zero-overhead unconditional branches and zero cycle or single cycle conditional branches (depending on whether the branch is taken or not). Static branch prediction is provided in the instruction word, which if used judiciously can consistently provide zero-overhead conditional branching. Static branch prediction is used to selectively fetch operands so that they are ready for the execution units.

Zero-overhead loops are implemented using an 8 bit Loop Count/Condition Register (LCR) and a 16 bit Link Register (LR). The LCR is used to maintain the current loop count or the loop termination condition code. Loops can have a maximum count of 256. The loop terminates when this count reaches zero or the termination condition is met. The LR contains the address of the first instruction of the current loop. The loop count can be an immediate value in the loop instruction or a value in a memory location. The last instruction in the loop is specified by its addresses' least significant byte, and is included in the loop instruction word.

2.7.3 Subroutines, Interrupts and Nested Loops

Subroutine calls, interrupts and nested loops all make use of a user definable stack. This stack can be defined anywhere in the memory space, preferably in local memory, and cannot be more than 256 locations deep. The Stack Pointer (SP) points to the top of this stack. When a subroutine call, interrupt or nested loop is encountered in the instruction stream, the return address is loaded into the Link Register (LR), and the address in the LR along with the value in the LCR is pushed onto the stack. The Stack Pointer is incremented. On encountering a return instruction, the current value in the LR is used as the target address, the stack is popped and that new address from the stack is loaded into the LR. This scheme delivers zero-overhead branches on unconditional subroutine calls, nested loops and interrupts.

2.7.4 Power-Up Sequence
2.8 Interrupts

On receiving an interrupt request, the MPU disables interrupts, loads the Link Register with the current value of the Program Counter, completes execution of all the instructions in the pipeline and branches to the interrupt target address. The interrupt target address is a fixed decode of the interrupt specification bits. The interrupt targets are mapped into the MPU memory space.

2.9 Interface

Data transfer into and out of the MPU is through the block communication protocol. The Block communication specification can be found in the chapter on UMP architecture. Block data transfers into and out of the MPU can proceed independent of MPU data path operation. That is, a burst move using a move instruction is basically a DMA transfer and can proceed in parallel with MPU instruction execution. Only one read or write DMA transfer operation can be going on at a time. If another move instruction follows, or the instruction cache makes a request to fill the cache, then the current transfer has to complete before the second one can proceed. While the second transfer is waiting the MPU will stall. During a DMA transfer, the MPU transfer bit in the PSW is set. There are two bits, one for the MPU as a master and the other for the MPU as a target. Once the transfer has been completed, the appropriate bit is reset.

3. Memory Management Unit
3.1 Overview

The Memory Management Unit (MMU) is responsible for all global data transfer operations. This includes inter-processor transfers, transfers to and from external memory, transfers between local memory units, etc. The MMU arbitrates multiple transfer requests and grants accesses to available parallel data transfer resources. For example, the MMU could be reading external memory for one MPU while it was coordinating and executing three other separate parallel memory data transfers between three MPU pairs. Internal or external memory transfers take place based on the memory address given by the requesting source. This is also true for direct memory to processor or processor to processor data transfers since every resource on chip is memory mapped.

3.2 MMU Operation
3.2.1 Arbitration

There are a total of 16 request ports to the MMU. These requests are serviced based on available communication resources, pre-assigned priorities, time of request and round robin schemes. In the current implementation of the UMP, there are direct data transfer paths to all the peripheral interface blocks. Each of these interfaces has a supervisor assigned priority level for data transfers. The MPUs also have priority levels assigned for a particular task running on them. Again, these priority levels are assigned by the supervisor. There are a total of eight priority levels. These priority levels range from 000 (lowest priority) to 111 (highest priority). For example, the CDI (CRT display interface) would generally be set to the highest priority level (111) since memory accesses to the frame buffer in local memory cannot be interrupted for too long without breaking up the display. The MPUs are assigned any of the lower four priority levels, ie, levels 0 to 3. This means that it is implied that the most significant bit of an MPU priority level is always 0. Therefore, only the two least significant bits of the priority are stored and transferred by the MPUs.

3.2.2 Privilege

Privilege levels (supervisor or user) are also transmitted with the transfer requests. As it stands writes to supervisory memory segments, words or bits by user transfer requests go through without the data being actually written. There is currently no trap generated on such access violations.

3.2.3 Resource Allocation

The MMU routes data transfer requests through it. It decodes the top bits of the transfer address and routes the data to the appropriate memory segment. If the segment is currently not in use than its lock bit is set and the transfer proceeds. If the lock bit is set, meaning that another transfer to the same memory segment is taking place, than the MMU does nothing, ie, RDY to the transfer initiator (master) remains deasserted. When the previous transfer completes, than the current transfer is forwarded, and the MMU waits for the RDY from the target, which it then passes back to the master. Communication between the MPUs and the MPUs and peripherals is through a four lane data highway. The lanes of the highway are basically data transfer resources. Lanes are assigned depending on availability. When only one lane is available for multiple transfer requests, than arbitration rules apply.

3.3 DMA Engine

The MMU includes a DMA engine that can be programmed to automatically transfer bursts of data between two memory locations. The DMA registers can be programmed to perform 2-D data transfers such as in BitBLT operations. Either the source or destination address can be designated to be outside the UMP address space, but not both. When one of the addresses is outside UMP memory space, then the DMA proceeds by concatenating the 26 bits of the external address with the 6 extension bits of the PCI External Address Pointer.

3.3.1 DMA Registers

3.3.1.1 Source Byte Address Register—SAR (R/W)

This address provides up to 64 MB addressing capability. Actual implementation may be less.
See FIG. 107.

3.3.1.2 Destination Byte Address Register—DAR (R/W)

This address provides up to 64 MB addressing capability. Actual implementation may be less.
See FIG. 108.

3.3.1.3 Transfer Size Register—TSR (R/W)

This register specifies the size of the data transfer in 2-D.
See FIG. 109.

3.3.1.4 Source and Destination 2-D Warp Factor Register—WARP (R/W)

This register specifies the size of the offset that must be added to the source and destination addresses to find the starting address at each new line for linear memory.
See FIG. 110.

3.3.1.5 DMA Command Register—DMAC (R/W)

This is the DMA command register. Writing this register initiates a DMA operation. therefore, it should be written last.
See FIG. 111.

3.4 Memory Map
See FIG. 112.

4. Event Timer Unit

4.1 Overview

The Event Timer Unit has been provided to allow synchronization between the various media streams. This unit has two 32 bit (pipelined) timers, each of which can be split into two 16 bit timers providing a total of up to four 16 bit timers that are independently addressable and settable. The timers are key in maintaining, transporting and processing various media stream packets so that they keep in lock step with their time stamps and each other. All MPU's, regardless of the type of media stream they are processing, be they audio, video, graphics, etc., refer to the Event Timer Unit (ETU) to control their processing rate, data fetches, data writes, etc. This can be done by directly accessing the memory site of the ETU or through a system of interrupts and interrupt handling routines.

4.1.1 Detailed Description

The four timers are specified as timers 0, 1, 2 and 3. All four timers are essentially 16 bit down counters. When used in 32 bit mode, the least significant 16 bits of the timer (timers 0 or 2 as the case may be) is used as a scaling counter. The process of specifying timers 0 or 2 as scaling counters, will set the respective timers to operate in 32 bit mode. There are interrupt bits for each of the timers to specify whether they should generate an interrupt or not when they have counted down to zero. The timers can be programmed to work in start-stop mode or continuous-loop mode. In the start-stop mode of operation the value from the period register is loaded into the counter and the counter counts down to zero and stops. It generates an interrupt if the respective interrupt bit is set. It then stays at zero indefinitely or until another start command is given. In the continuous-loop mode, the counter re-loads itself from its own period register when the count reaches zero and starts all over again. This goes on indefinitely, until the stop command is given through the control register.

4.1.2 Register Descriptions

4.1.2.1 Timer Status and Control Register—TSCR (R/W)
See FIG. 113.

4.1.2.2 Timer Period/Scale Registers—TPS0, TP1, TPS2, TP3 (R/W)
See FIG. 114.

4.1.2.3 Timer Counters—TC0, TC1, TC2, TC3 (R/W)
See FIG. 115.

4.1.3 Memory Map
See FIG. 116.

5. Miscellaneous

5.1 Peripheral connectivity

The peripheral interface units are the media links of the Unified Media Processor. They input and output various media types to the UMP for processing. These units have very specific definitions as to the format and synchronization of the various media types. The units that have been provided cover most current popular media interfaces. These include the PCI and AGP local bus interfaces for communicating with the host CPU in a PC based system. The Video Capture interface is provided for use in video capture and video telephony applications, while the Auxilliary Serial/Parallel interface may be used for capturing and playing back telephone conversations or providing CD quality surround sound for games, movies and music. It can also be used for telecommunications, as in video and audio telephony, by connecting with an Audio/Modem codec. In this case, the UMP, concurrently with other types of processing, also performs the modem function. Finally, the CRT Display interface provides the sync and video signals for displaying true-color gamma-corrected 24 bit RGB images on a high resolution computer monitor or television set.

The Unified Media Architecture introduces the concept that media streams can be dealt with in a homogeneous and consistent manner without the need for specialized architectures. The underlying principle is one of high speed compute intensive data processing. By dealing with these various simultaneous media streams in a homogeneous manner, synchronization and interactivity issues are greatly simplified, thereby leading to a simple architecture that can operate at a very high speed.

The underlying principle behind the media interfaces is that the nature of the interface and its peculiarities is hidden from software running on the MPUs. All communication between the MMU and the Interfaces is at the system clock. The interfaces fifo the data internally and process the data at their own clock speeds. All communication between the interfaces and the MMU is through memory reads and writes. This is possible since all peripherals are memory mapped.

5.2 Event Timing

The Event Timer Unit has been provided to allow synchronization between the various media streams. This unit has two 32 bit (pipelined) timers, each of which can be split into two 16 bit timers providing a total of up to four 16 bit timers that are independently addressable and settable. The timers are key in maintaining, transporting and processing various media stream packets so that they keep in lock step with their time stamps and each other. All MPU's, regardless of the type of media stream they are processing, be they audio, video, graphics, etc., refer to the Event Timer Unit (ETU) to control their processing rate, data fetches, data writes, etc. This can be done by directly accessing the memory site of the ETU or through a system of interrupts and interrupt handling routines.

I claim:

1. An apparatus for processing data, comprising:

an addressable memory for storing the data, and a plurality of instructions, and having a plurality of input/outputs, each said input/output for providing and receiving at least one selected from the data and the instructions;

a plurality of media processing units, each media processing unit having an input/output coupled to at least one of the addressable memory input/outputs and comprising:

a multiplier having a data input coupled to the media processing unit input/output, an instruction input coupled to the media processing unit input/output, and a data output coupled to the media processing unit input/output;

an arithmetic unit having a data input coupled to the media processing unit input/output, an instruction input coupled to the media processing unit input/output, and a data output coupled to the media processing unit input/output;

an arithmetic logic unit having a data input coupled to the media processing unit input/output, an instruction input coupled to the media processing unit input/output, and a data output coupled to the media processing unit input/output, capable of operating concurrently with at least one selected from the multiplier and arithmetic unit; and a bit manipulation unit having a data input coupled to the media processing unit input/output, an instruction input coupled to the media processing unit input/output, and a data output coupled to the media processing unit input/output, capable of operating concurrently with the arithmetic logic unit and at least one selected from the multiplier and arithmetic unit;

each of the plurality of media processors for performing at least one operation, simultaneously with the performance of other operations by other media processing units, each operation comprising:

receiving at the media processor input/output an instruction from the memory;

receiving at the media processor input/output data from the memory;

processing the data responsive to the instruction received to produce at least one result; and providing at least one of the at least one result at the media processor input/output.

\* \* \* \* \*